(12) United States Patent
Murdoch et al.

(10) Patent No.: US 11,386,243 B2
(45) Date of Patent: Jul. 12, 2022

(54) PROCESS FOR GUIDING RAPID DEVELOPMENT OF NOVEL CERMETS

(71) Applicant: U.S. Army Research Laboratory, Adelphi, MD (US)

(72) Inventors: Heather A. Murdoch, Baltimore, MD (US); Kristopher A. Darling, Harve De Grace, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 502 days.

(21) Appl. No.: 16/299,261

(22) Filed: Mar. 12, 2019

(65) Prior Publication Data

US 2020/0293624 A1  Sep. 17, 2020

(51) Int. Cl.
| | |
|---|---|
| *G06T 11/20* | (2006.01) |
| *C22C 1/05* | (2006.01) |
| *G01N 11/02* | (2006.01) |
| *G06F 30/00* | (2020.01) |
| *C22C 29/08* | (2006.01) |
| *C22C 1/10* | (2006.01) |
| *G01N 13/02* | (2006.01) |

(Continued)

(52) U.S. Cl.
CPC .............. *G06F 30/00* (2020.01); *C22C 1/05* (2013.01); *C22C 1/1068* (2013.01); *C22C 29/08* (2013.01); *G01N 11/02* (2013.01); *G01N 13/02* (2013.01); *G06T 11/206* (2013.01); *G01N 2011/0093* (2013.01); *G01N 2013/0225* (2013.01); *G06F 2113/26* (2020.01); *G06F 2119/08* (2020.01); *G06F 2119/18* (2020.01)

(58) Field of Classification Search
None
See application file for complete search history.

(56) References Cited

U.S. PATENT DOCUMENTS

| | | |
|---|---|---|
| 5,841,045 A | 11/1998 | McCandlish et al. |
| 7,163,657 B2 | 1/2007 | Heinrich et al. |

(Continued)

OTHER PUBLICATIONS

Murdoch, Heather A. and Kristopher A. Darling, "Metric mapping: A color coded atlas for guiding rapid development of novel cermets and its application to "green" WC binder," Apr. 2018, Materials and Design 150, 64-74. (Year: 2018).*

(Continued)

*Primary Examiner* — Joni Hsu
(74) *Attorney, Agent, or Firm* — Christos S. Kyriakou

(57) ABSTRACT

A method for screening a large design space of compositions with possible application as binders in cermet and powder metallurgy applications allows rapid elimination of large portions of the design space from contention so that resource intensive procedures, such as computationally intensive modeling techniques and experimental testing, can be focused on potential binder compositions with a high likelihood of being used successfully. The method relies on parameters such as surface tension, contact angle, viscosity, a special capillary metric that is used to characterize capillary behavior, and melting point, which are relatively easy to calculate or determine, to screen out large portions of the design space. Exemplary binder compositions are obtained using the method.

20 Claims, 32 Drawing Sheets
(17 of 32 Drawing Sheet(s) Filed in Color)

(51) Int. Cl.
*G01N 11/00* (2006.01)
*G06F 113/26* (2020.01)
*G06F 119/08* (2020.01)
*G06F 119/18* (2020.01)

(56) References Cited

U.S. PATENT DOCUMENTS

| | | | |
|---|---|---|---|
| 8,323,790 B2 | 12/2012 | Chun et al. | |
| 9,388,482 B2 | 7/2016 | Fang et al. | |
| 2019/0032173 A1* | 1/2019 | Sherman | C22C 1/0491 |

OTHER PUBLICATIONS

Murdoch, Heather A. and Kristopher A. Darling, "Metric mapping: A color coded atlas for guiding rapid development of novel cermets and its application to "green" WC binder," Materials and Design 150 (2018) 64-74. Apr. 5, 2018.

Paradis, P., "Non-Contact Measurements of Surface Tension and Viscosity of Niobium, Zirconium, and Titanium Using an Electrostatic Levitation Furnace," International Journal of Thermophysics, vol. 23, No. 3, May 2002, pp. 825-842.

Okada, J., et al., "Surface tension and viscosity of molten vanadium measured with an electrostatic levitation furnace," J. Chem. Thermodynamics, 42, 2010, pp. 856-859.

Bratberg, J., et al., "Thermodynamic Evaluation of the C—Co—W—Hf—Zr System for Cemented Carbides Applications," Journal of Phase Equilibria and Diffusion, vol. 27, Issue 3, Jun. 2006, pp. 213-219.

Guillermet, A., "Analysis of thermochemical properties and phase stability in the zirconium-carbon system," Journal of Alloys and Compounds, vol. 217, Issue 1, Jan. 15, 1995, pp. 69-89.

Li, X., et al., "Influence of NbC and VC on microstructures and mechanical properties of WC—Co functionally graded cemented carbides," Materials and Design 90, 2016, pp. 562-567.

Lay, S., et al., "Location of VC in VC, Cr3C2 codoped WC—Co cermets by HREM and EELS," International Journal of Refractory Metals & Hard Materials 20, 2002, pp. 61-69.

Nieto, A., et al., "Synthesis and Multi Scale Tribological Behavior of WC—Co/Nanodiamond Nanocomposites," Scientific Reports, vol. 7, Issue 1, Aug. 1, 2017, pp. 1-11.

Yin, S., et al., "Cold spraying of WC—Co—Ni coatings using porous WC—17Co powders: Formation mechanism, microstructure characterization and tribological performance," Materials & Design 126, 2017, pp. 305-313.

Rajabi, A., et al., "Chemical composition, microstructure and sintering temperature modifications on mechanical properties of TiC-based cermet—A review," Materials & Design 67, 2015, pp. 95-106.

Leyssens, L., et al., "Cobalt toxicity in humans. A review of the potential sources and systemic health effects," Toxicology, vol. 387, 2017, pp. 1-55. Jul. 2017.

Report on Carcinogens. Fourteenth Edition, U.S. Department of Health and Human Services, Public Health Service, Research Triangle Park, NC, 2016, pp. 1-13. Nov. 2016.

European Chemicals Agency (ECHA), Substance Information: Cobalt, https://echa.europa.eu/substance-information/-/substanceinfo/100.028.325, Mar. 10, 2019, 5 pages.

"Proposed cobalt reclassification raises concerns for metal powder users," METAL AM, https://www.metal-am.com/proposed-cobalt-reclassification-raises-concerns-metal-powder-users/, Oct. 18, 2017, 3 pages.

Hanyaloglu, C., et al., "Production and indentation analysis of WC/Fe—Mn as an alternative to cobalt-bonded hardmetals," Materials Characterization 47, 2001, pp. 315-322.

Fernandes, C., et al., "Mechanical characterization of composites prepared from WC powders coated with Ni rich binders," vol. 26, Issue 5, Sep. 2008, pp. 491-498.

Fernandes, C., et al., "Versatility of the sputtering technique in the processing of WC—Fe—Ni—Cr composites," Surface & Coatings Technology 206, 2012, pp. 4915-4921. Jul. 2012.

Guillermet, A., et al., "Thermodynamic Properties of the Co—W—C System," Metallurgical Transactions A, vol. 20A, May 1989, pp. 935-956.

Guillermet, A., et al., "An Assessment of the Fe—Ni—W—C Phase Diagram," Zeitschrift für Metallkunde, 78(3), Mar. 1987, pp. 165-171.

Fernandes, C., et al., "Cemented carbide phase diagrams: A review," Int. Journal of Refractory Metals and Hard Materials, 29, 2011, pp. 405-418. Jul. 2011.

Subramanian, R., et al., "FeAl—TiC and FeAl—WC composites—melt infiltration processing, microstructure and mechanical properties," Materials Science and Engineering A244, 1998, pp. 103-112.

Huang, S., et al., "Pulsed electric current sintered Fe3Al bonded WC composites," Int. Journal of Refractory Metals and Hard Materials, 27, 2009, pp. 1019-1023. Jul. 2009.

Alvaredo, P., et al., "Influence of carbon content on the sinterability of an FeCr matrix cermet reinforced with TiCN," Int. Journal of Refractory Metals and Hard Materials, 36, 2013, pp. 283-288.

Zhou, P., et al., "Experimental investigation and thermodynamic assessment of the C—Co—Fe—Ni—W system," Int. Journal of Refractory Metals and Hard Materials, 54, 2016, pp. 60-69.

Schubert, W., et al., "Aspects of sintering of cemented carbides with Fe-based binders," Int. Journal of Refractory Metals and Hard Materials, 49, 2015, pp. 110-123. Mar. 2015.

Silva, V., et al., "Copper wettability on tungsten carbide surfaces," ScienceDirect, Ceramics International, 42, 2016, pp. 1191-1196.

Zhou, R., et al., "The effect of volume fraction of WC particles on erosion resistance of WC reinforced iron matrix surface composites," Wear, 255, 2003, pp. 134-138.

De Macedo, H., et al., "The spreading of cobalt, nickel and iron on tungsten carbide and the first stage of hard metal sintering," Materials Letters 57, 2003, pp. 3924-3932.

Washburn, E., "The Dynamics of Capillary Flow," The Physical Review, Second Series, vol. XVII, No. 3, Mar. 1921, pp. 273-283.

Kaptay, G., "Modelling Interfacial Energies in Metallic Systems," Materials Science Forum, vols. 473-474, 2005, pp. 1-10. Jan. 2005.

Lu, H., et al., "Surface Tension and Its Temperature Coefficient for Liquid Metals," J. Phys. Chem. B 2005, 109, pp. 15463-15468.

Butler, J., "The Thermodynamics of the Surfaces of Solutions," Mathematical, Physical and Engineering Sciences, Mar. 1, 1932, pp. 348-375.

Brillo, J., et al., "Surface tension of nickel, copper, iron and their binary alloys," Journal of Materials Science, 40, 2005, pp. 2213-2216. May 2005.

Liu, X., et al., "Experimental Determination and Thermodynamic Calculation of the Phase Equilibria and Surface Tension in the Sn—Ag—In System," Journal of Electronic Materials, vol. 31, No. 11, 2002, pp. 1139-1151. Nov. 2002.

Budai, I., et al., "Comparison of Different Theoretical Models to Experimental Data on Viscosity of Binary Liquid Alloys," Materials Science Forum vols. 537-538, 2007, pp. 489-496.

Chen, W., et al., "Viscosity and diffusivity in melts: from unary to multicomponent systems," Philosophical Magazine, Apr. 7, 2014, vol. 94, No. 14, pp. 1552-1577.

Kaufman, L., et al., "CALPHAD, first and second generation—Birth of the materials genome," Scripta Materialia 70, 2014, pp. 3-6. Jan. 2014.

Andersson, J., et al., "Thermo-Calc & Dictra, Computational Tools For Materials Science," Calphad, vol. 26, No. 2, 2002, pp. 273-312. Jun. 2002.

Johansson, S., et al., "First-principles derived complexion diagrams for phase boundaries in doped cemented carbides," Current Opinion in Solid State and Materials Science, 20, 2016, pp. 299-307. Jan. 2016.

Wittmann, B., et al., "WC grain growth and grain growth inhibition in nickel and iron binder hardmetals," Int. Journal of Refractory Metals and Hard Materials, 20, 2002, pp. 51-60.

Wan, L., et al., "Synthesis of Cr-doped APT in the evaporation and crystallization process and its effect on properties of WC—Co cemented carbide alloy," Int. Journal of Refractory Metals and Hard Materials, 64, 2017, pp. 248-254. Jun. 2017.

(56) References Cited

OTHER PUBLICATIONS

Furushima, R., et al., "Control of WC grain sizes and mechanical properties in WC—FeAl composite fabricated from vacuum sintering technique," Int. Journal of Refractory Metals and Hard Materials, 50, 2015, pp. 16-22.

Reeber, R., et al., "Thermophysical Properties of α-Tungsten Carbide," J. Am. Ceram. Soc., 82 (1), 1999, pp. 129-135.

Markström, A., et al., "A Revised Thermodynamic Description of the Co—W—C System," Journal of Phase Equilibria and Diffusion, vol. 26, No. 2, Apr. 2005, pp. 152-160.

Ohtani, H., et al., "Thermodynamic analysis of the Co—Al—C and Ni—Al—C systems by incorporating ab initio energetic calculations into the CALPHAD approach," Computer Coupling of Phase Diagrams and Thermochemistry, 28, 2004, pp. 177-190. Jun. 2004.

Iida, T., et al., "Performance of a Modified Skapski Model for the Surface Tension of Liquid Metallic Elements at Their Melting-Point Temperatures," Metallurgical and Materials Transactions B, vol. 40B, Dec. 2009, pp. 967-978.

Iida, T., et al., "Accurate Predictions for the Viscosities of Several Liquid Transition Metals, Plus Barium and Strontium," Metallurgical and Materials Transactions B, vol. 37B, Jun. 2006, pp. 403-412.

Cui, Y., et al., "Thermodynamic assessment of Co—Al—W system and solidification of Co-enriched ternary alloys," J. Mater. Sci., vol. 46, 2011, pp. 2611-2621.

Kaufman, L., et al., "Thermodynamics of the Cr—Ta—W system by combining the Ab Initio and CALPHAD methods," Calphad, vol. 25, Issue 3, Sep. 2001, pp. 419-433.

Khvan, A., et al., "Thermodynamic assessment of Cr—Nb—C and Mn—Nb—C systems," Calphad: Computer Coupling of Phase Diagrams and Thermochemistry, vol. 39, 2012, pp. 54-61. Dec. 2012.

Djurovic, D., et al., "Thermodynamic assessment of the Fe—Mn—C system," Calphad: Computer Coupling of Phase Diagrams and Thermochemistry, vol. 35, 2011, pp. 479-491.

Bratberg, J., et al., "A Thermodynamic Analysis of the Mo—V and Mo—V—C Systems," Calphad, vol. 26, No. 3, 2002, pp. 459-476.

Paradis, P., et al., "Non-contact measurements of the surface tension and viscosity of molybdenum using an electrostatic levitation furnace," Int. Journal of Refractory Metals and Hard Materials, 25, 2007, pp. 95-100.

Lee, B., et al., "Thermodynamic Assessment of the Fe—Nb—Ti—C—N System," Metallurgical and Materials Transactions A, vol. 32A, Oct. 2001, pp. 2423-2439.

Frisk, K., et al., "Gibbs energy coupling of the phase diagram and thermochemistry in the tantalum-carbon system," Journal of Alloys and Compounds, vol. 238, Issues 1-2, May 1, 1996, pp. 167-179.

\* cited by examiner

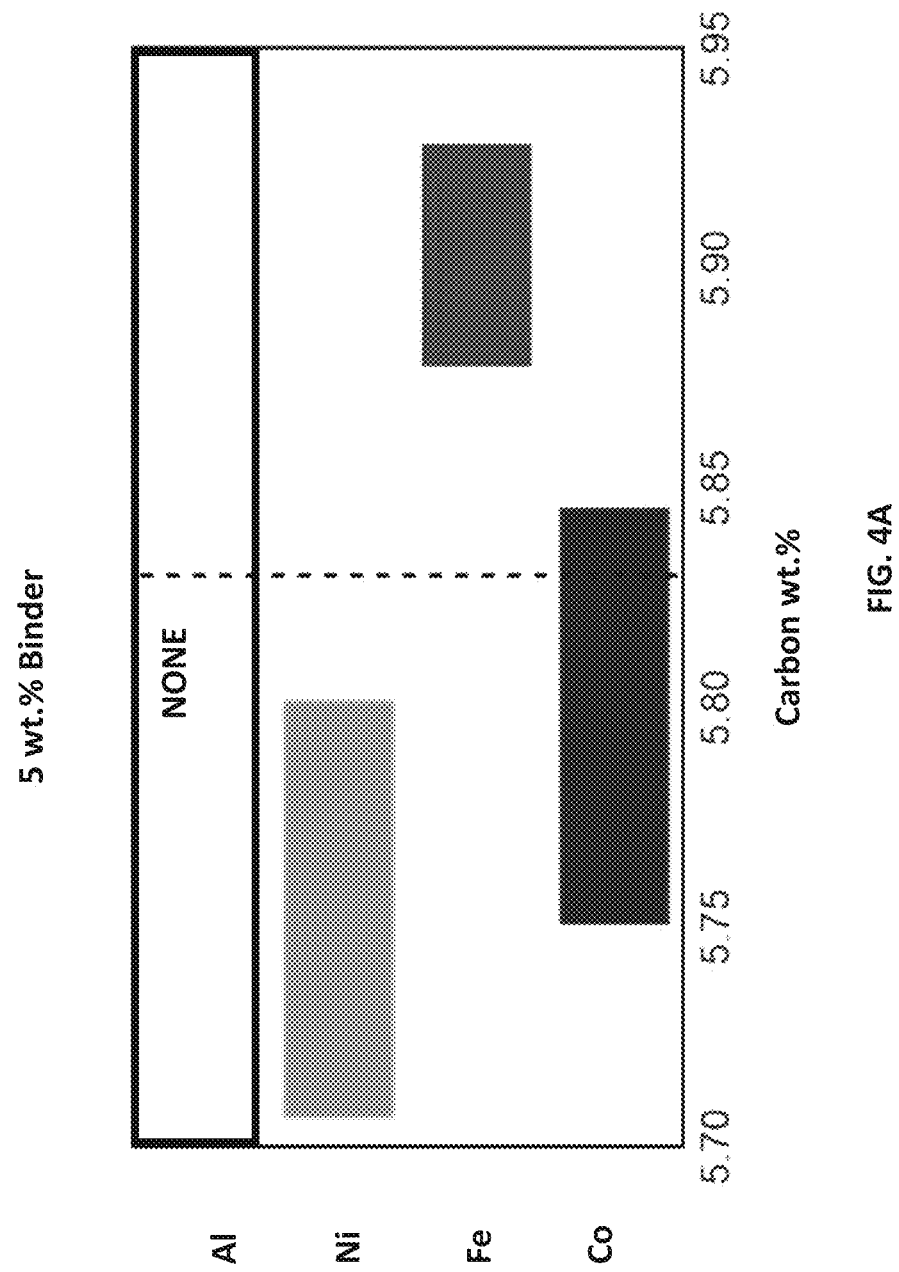

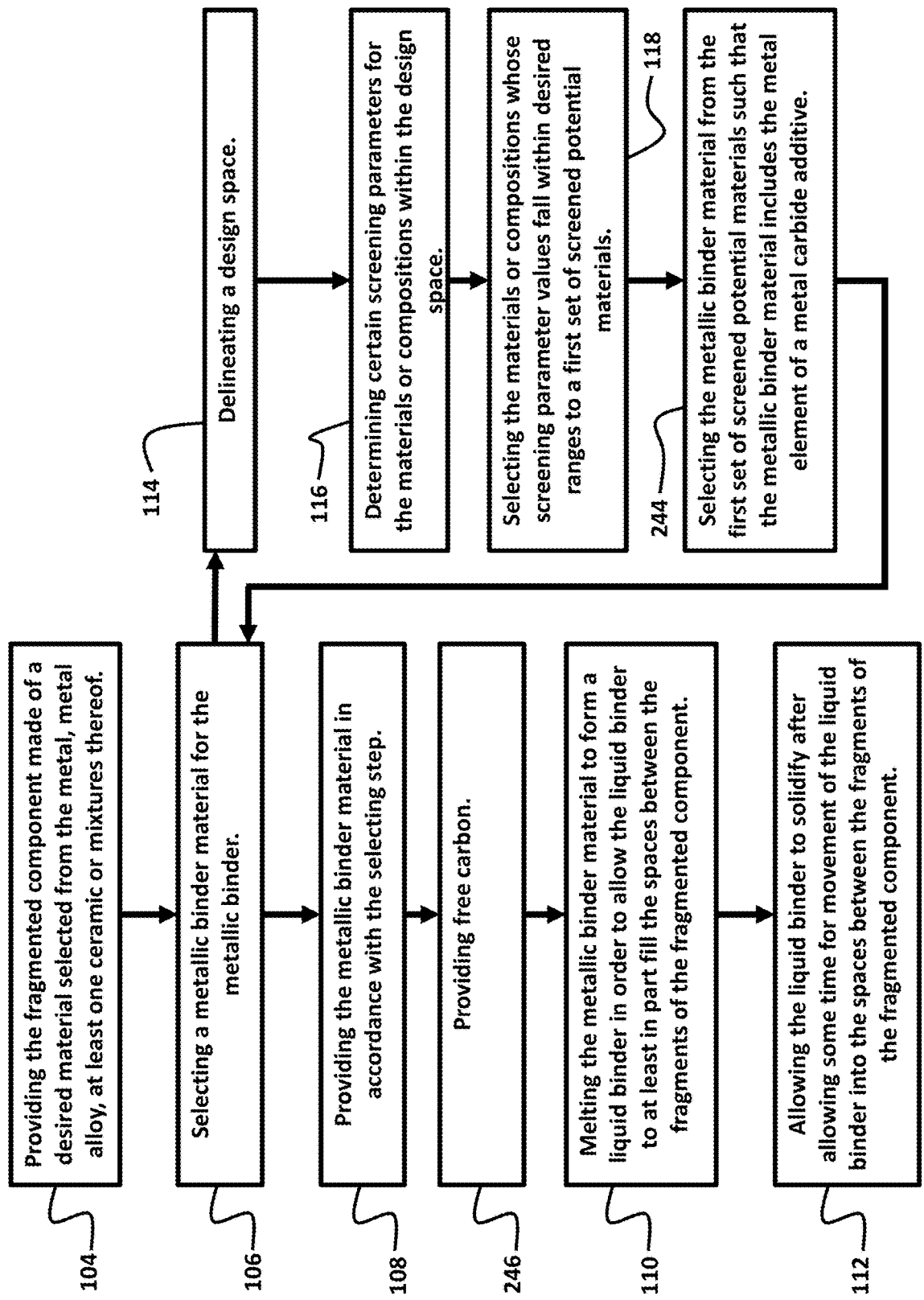

PROCESS FOR GUIDING RAPID DEVELOPMENT OF NOVEL CERMETS

GOVERNMENT INTEREST

The embodiments herein may be manufactured, used, and/or licensed by or for the United States Government without the payment of royalties thereon.

BACKGROUND

Technical Field

The embodiments herein generally relate to a method for screening candidates for the design of novel binder alloys in liquid phase sintered cermets and/or powdered metals using a combination of thermodynamic and analytical models for composition dependence and using heretofore unexamined criteria including capillary flow, viscosity, and surface tension.

Description of the Related Art

Cermets are composite materials comprised of ceramics and metals that ideally combine the hardness (and temperature resistance) of a ceramic phase with the toughness (and plasticity) of a metallic phase. These materials are commonly produced via liquid phase sintering, wherein the liquid metal provides a pathway for rapid densification and upon cooling binds the ceramic particles together. However, these binder phases are typically the weak link in the structural integrity of the composite structure. This is especially true when used in applications such as high speed machining and cutting, where tool stress and temperature are high, thus placing tremendous demands on developing higher performing metal binders.

Generally liquid phase binders have been comprised of commercially pure elemental metals—cobalt, in the case of WC; Co or Ni in the case of Ti(C,N), and so on. Additives to the cermet system largely take the form of additional carbides; in the case of WC—Co, VC (or $Cr_3C_2$) is often added in small quantities (<1 wt %) as a potential grain refiner which sits at the WC/Co interfaces [1,2] or hard particles within the binder to improve wear [3]. However, as demands for higher performing cermets keep increasing, the conventional mono element binder may need to be replaced by stronger, more ductile [4], and heat resistant alloys [5]. Additionally, the most common/industry standard binder—cobalt—has recently been identified as an environmental and health hazard [6-8] and is undergoing reclassification as a carcinogen, mutagen and reproductive toxicant. It is anticipated that this reclassification will have significant ramifications for the metals powder processing industry [9]. While one solution is to improve engineering and environmental controls during the process to reduce exposure to Co powder, there continues to be a need for finding improved, and preferably non-toxic, binder materials.

SUMMARY

In view of the foregoing, the embodiments herein provide methods for improving and accelerating the design of new multi-phase systems in which processing relies on liquid metal flow around a solid metal or ceramic component. Examples of such systems include cermet processing (liquid metal binder sintered around a carbide phase) or metallic melt infiltration. The method includes a combination of the alloy properties of viscosity, capillarity (as represented by a capillary metric described below), contact angle or surface tension to the ceramic, and melt temperature to identify an optimally processable metal binder in cermets. Additionally, these methods enable the visual combination of several metrics as a novel representation of the alloy design space. Further embodiments herein also provide novel binder alloys as substitutes for the cobalt binder in the tungsten carbide/cobalt cermet system (WC—Co cermet system).

Traditionally, proposals for new alloys for the cermet binder has focused on (1) wetting behavior and (2) phase diagram and undesired additional phase formation in the binder. For example, in the WC—Co cermet system, (1) liquid Co perfectly wets WC and (2) Co does not form deleterious additional phases with the C or W in the system in the composition range of stoichiometric WC/Co. In contrast, for the WC—Fe cermet (1) liquid Fe perfectly wets WC; however, (2) free carbon needs to be added to the system in order to avoid formation of deleterious $Fe_3W_3C$ phase. This latter determination requires the calculation of a pseudo-binary phase diagram in a system with up to five elements, a nontrivial modeling task, and one not suited to high throughput alloy design. As a consequence, development of alternative binders (e.g. to cobalt in the WC—Co cermet system) is scattershot. Additionally, literature reports also roughly estimate the wetting behavior of the alloy to be that of the primary element in the alloy; however, in contradistinction to this conventional approach, alloying elements, even in small quantities, can have a significant effect on the surface energy and thus the contact angle/wetting behavior and are taken into account in the embodiments herein. Another key criteria that can vary significantly with alloying is the melting temperature—the processing conditions to achieve fully liquid binder are dependent on this characteristic, but the temperature used is again most often assuming melting temperature of the primary component. Alloying with particular elements can lower or raise the melting temperature by several hundred degrees.

The basic processing condition desired by liquid phase sintering of cermets is that the liquid metal binder completely flow around the ceramic grains; contact angle is considered a good metric of this behavior as, if the liquid metal perfectly wets the ceramic, it will spread out across the surface of the ceramic instead of beading up. Additional considerations that have not heretofore been taken into account are: the viscosity of the liquid metal (not just the ability to spread on one ceramic particle, but its ability to flow around multiple particles) and the capillary behavior (capillarity—ability to flow between particles, the channels of which are likely to be of small dimensionality).

Given appropriate materials data, these two new criteria—viscosity and capillarity—and the original criteria of wetting are quick to calculate, unlike the multi-component phase diagram. The melting temperature, while still requiring thermodynamic information, is only calculated for a single phase region, rather than multiple phase boundaries and is therefore relatively quick. The four metrics: viscosity, capillarity, contact angle (or surface tension, which is sometimes used as an alternative metric), and melting temperature are then combined in alloy space to define binder alloys that meet the criteria set forth by a desired cermet system. For example, if the goal is to replace cobalt in the WC—Co system, the binder alloy conditions searched for are: viscosity lower than or equal to cobalt, capillary metric higher than or equal to cobalt, contact angle of or near zero, and melting temperature lower than or equal to cobalt. In some examples, such as protective ceramic coatings, the design goal may be to not have the liquid metal interact well with the ceramic, e.g. a large contact angle instead of a small one and a low capillary metric, wherein the metal will not infiltrate the ceramic well. The method further provides visualization of whether all of the criteria are met for a given alloy composition, and if all four are not met, it also visually shows which criteria are met.

The visual maps presented here are for up to two alloying elements into a base metal (e.g. a ternary system) but the criteria are applicable to systems including additional components.

An embodiment herein makes use of viscosity and capillary flow/infiltration as a metric for selecting liquid metal binder. Some embodiments herein use a combination of multiple metrics (melting temperature, viscosity, contact angle, capillarity) to determine optimum binder alloys and compositions. Various embodiments herein advantageously allow high throughput calculations of alternative binder systems, are applicable to many liquid metal/ceramic systems, and facilitate the use of alloy additions to thermodynamically alter/tune selected binder metrics e.g. melting temperature, viscosity, contact angle and capillarity. Some embodiments herein provide an atlas of visual key indicator maps to facilitate binder alloy selection of which the atlas for finding a suitable alloy for replacing cobalt in the WC—Co cermet is given as one example of many potential systems that may be suitably explored using the atlases provided by some of the embodiments herein.

The embodiments herein have applications in the development of the core material in armor-piercing projectiles used in numerous military weapon systems, the control and prediction of amorphous metallic grain boundary phases in boron carbide and silicon carbide for tougher armor ceramics, and improving the resistance of ceramic thermal barrier coatings to erosion due to interaction of the coatings with erosive materials (e.g. in rotor blades)—by designing coatings that are not wetted by the erosive material. Further applications of the embodiments herein include improving cutting tools for the cutting and/or machining of steels, hard metals, metal alloys and abrasion resistant materials, and improving inserts in the mining and drilling of rock and earthen material in, for example, the coal, oil, and gas industries.

The embodiments herein can provide improved cermets with applications in wear applications such as the paper and textile industries, knives and hammers, road scarfing inserts for the patching and replacement of asphalt and concrete roadways, bearing and seal applications, and designing a new iron-based binder for WC cermet system. The embodiments herein are applicable to nearly any cermet system to design the ideal metal matrix to minimize void formation and thereby reduce porosity, increase strength, and reduce processing time.

While the focus of some examples herein has been a cermet system, the design criteria, process, and visual representation are applicable for any material system whose processing condition is that of a liquid metal flowing around a solid metal or ceramic phase.

BRIEF DESCRIPTION OF THE DRAWINGS

The patent or patent application file contains at least one drawing executed in color. Copies of this patent or patent application publication with color drawings will be provided by the Office upon request and payment of the necessary fee.

The embodiments herein will be better understood from the following detailed description with reference to the appended drawings.

FIGS. 4A-4C show bar plots showing the carbon window in which liquid binder can solidify to solid without formation of carbides for differing binder weight percentages; dashed line indicates carbon content inherent in the WC percentage. Aluminum has no range in which carbides do not form, cobalt encompasses the stoichiometric carbon content, nickel is too low, and iron is too high.

FIG. 21 is a flow diagram illustrating yet another embodiment of the method herein for fabricating dual-phase systems in which processing relies on liquid metal flow around a solid metal or ceramic component.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. "Metal" or "metallic" as used herein should be understood to encompass both metal elements and metal alloys unless otherwise specified.

Figure 1:
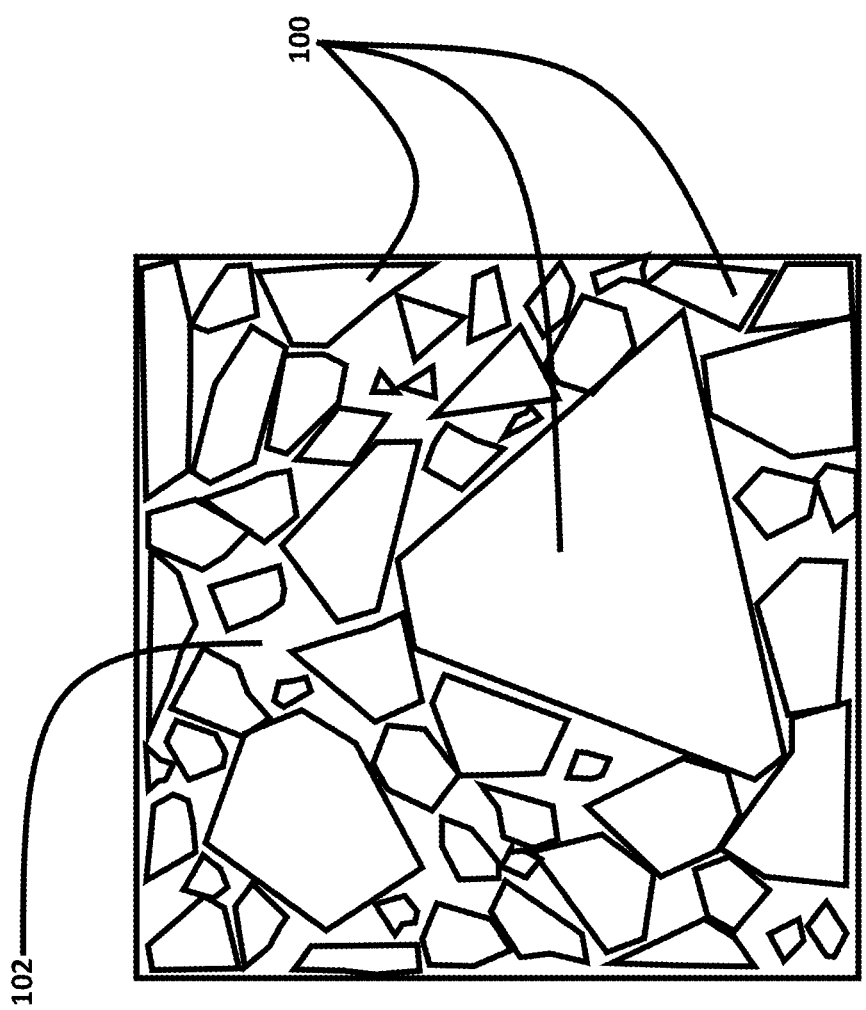
FIG. 1 schematically illustrates the microstructure of a WC-binder cermet system.

Embodiments herein provide improved cermet and powder metal compositions. Referring to FIG. 1, embodiments disclosed herein provide compositions comprising a second phase 100 and a first phase comprising a binder matrix of a metallic binder 102. The second phase 100 comprises a non-continuous spatial arrangement wherein there are spaces interspersed among spatial regions occupied by the second phase 100. The binder 102 fills the spaces at least to such an extent as to form, together with the second phase 100, a body that maintains its shape without a container. The binder 102 is a solid solidified from an earlier liquid form in which the binder existed in the spaces among the second phase 100. The binder 102 includes at least one metal element, and the binder may have a carbon content. In some examples where the second phase 100 contains carbon, the source of the carbon in the binder may be, in whole or in part, carbon diffusing into the binder material from the second phase 100. In some examples, the carbon content of the binder may be, in whole or in part, the result of the addition of free carbon to the binder material. Preferably, the carbon content of the binder is selected, whether as a result of diffusion, free carbon addition, carbon removal, or any combination thereof, such that no deleterious phases are formed as the binder solidifies. Carbon diffusion from the second phase 100 can be controlled by controlling the binder composition and/or process conditions such as time and temperature for a given carbon containing second phase 100. Preferably, the binder 102 fills the spaces among the second phase 100 at least to such an extent as to maintain the spatial arrangement of the second phase 100. Additionally, in certain desirable embodiments the present invention provides a binder 102 that has low toxicity or is non-toxic.

Desirable embodiments herein provide binders that exclude cobalt as a constituent, except possibly to the extent that cobalt may be present as a contaminant. The binder 102 may be made of a metal having a single metal element or of a metal that is an alloy. In some embodiments, the binder 102 is made of a binary metal alloy. In other embodiments, the binder 102 is a ternary metal alloy. In some embodiments, the binder 102 is made of a metal that includes at least one element selected from the group consisting of Fe, Al, Cr, Cu, Mn, Mo, Nb, Ni, Ta, Ti, V, and Zr.

In the embodiments herein, the second phase 100 is formed from particles of a metal, metal alloy, at least one ceramic or mixtures thereof. In some embodiments, the second phase 100 is made from particles of a ceramic. In other embodiments, the second phase 100 is made from particles of a composition selected from tungsten carbide, silicon carbide, silicon nitride, titanium oxide, titanium carbide, titanium nitride, and mixtures thereof. In some examples, the second phase 100 is formed from particles of tungsten carbide, and the binder 102 is an iron-based ternary alloy. In some examples, the binder 102 may be selected from Fe—Cu—V and Fe—Ni—Zr. In some embodiments herein, the second phase 100 is a composition including carbon, the binder 102 has a carbon content range within which no deleterious phases are formed as the binder solidifies, and the carbon content of the second phase 100 falls within the carbon content range for the binder 102.

The binary combinations of the metal elements are formed of a primary metal element and a secondary metal element. In some examples, the content of the secondary metal element in the binary combinations of the metal elements or in the binary alloy or binder composition relative to the primary metal element ranges from greater than zero to about 50 at. % in the initial design space. The ternary combinations of the metal elements are formed of a primary metal element, a secondary metal element, and a tertiary metal element. In some examples, the total or sum of the contents of the secondary and tertiary metal elements relative to the primary metal element ranges from greater than zero to about 50 at. % in the initial design space. In other examples, the content of the secondary metal element in the ternary combinations of the metal elements or in the ternary alloy or binder composition relative to the primary metal element ranges from greater than zero to about 25 at. % in the initial design space. The content of the tertiary metal element in the ternary combinations of the metal elements or in the ternary alloy or binder composition relative to the primary metal element ranges from greater than zero to about 25 at. % in the initial design space.

Figure 10:
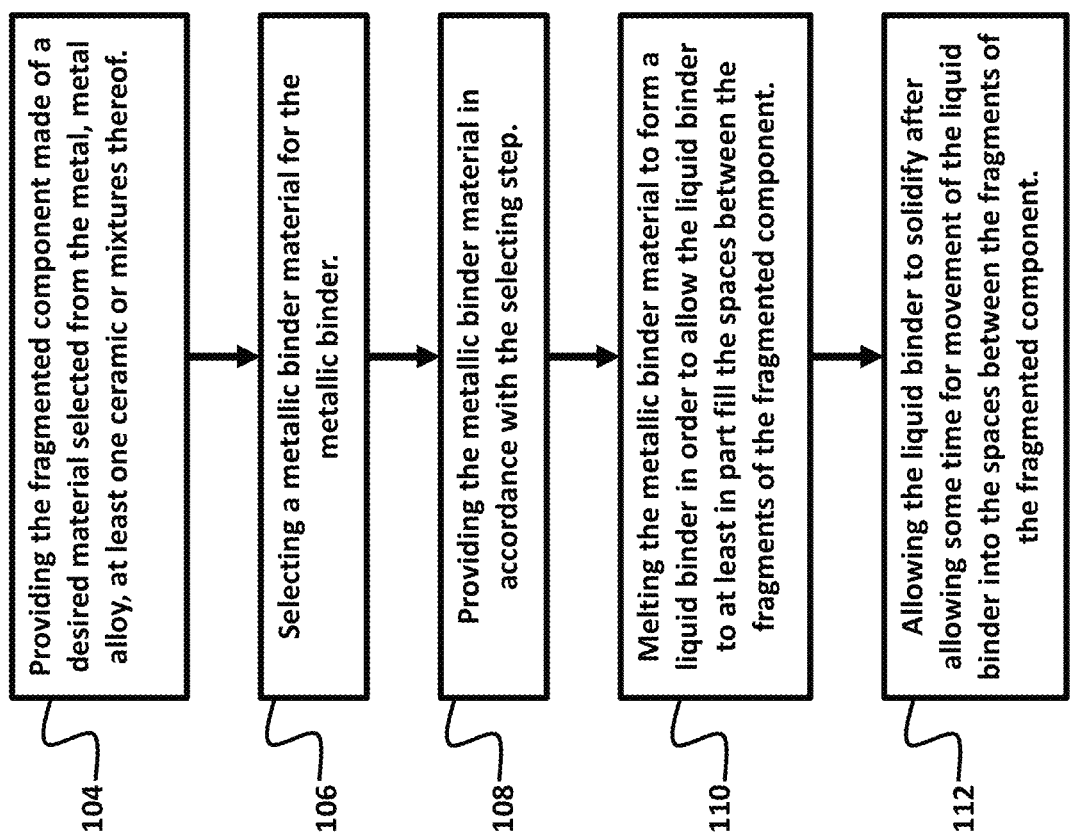
FIG. 10 is a flow diagram illustrating an example of the method herein for fabricating dual-phase systems in which processing relies on liquid metal flow around a solid metal or ceramic component.

Another embodiment herein provides a method for forming a composition comprising a second phase 100 of a metal, metal alloy, at least one ceramic or mixtures thereof in a binder matrix of a metallic binder 102. The second phase 100 is in the form of particles or other non-continuous arrangement having spaces or interstices wherein the binder matrix can infiltrate. Referring to FIG. 10, more particularly, the method comprises the steps of providing (104) the second phase 100 made of a desired material selected from the metal, metal alloy, at least one ceramic or mixtures thereof; selecting (106) a metallic binder material for the metallic binder 102; providing (108) the metallic binder material in accordance with the selecting step; melting (110) the metallic binder material to form a liquid binder in order to allow the liquid binder to at least in part fill the spaces or interstices provided by the spatial arrangement of the second phase 100; and allowing (112) the liquid binder to solidify after allowing some time for movement of the liquid binder into the spaces within that spatial arrangement of the second phase 100.

Figure 11A:
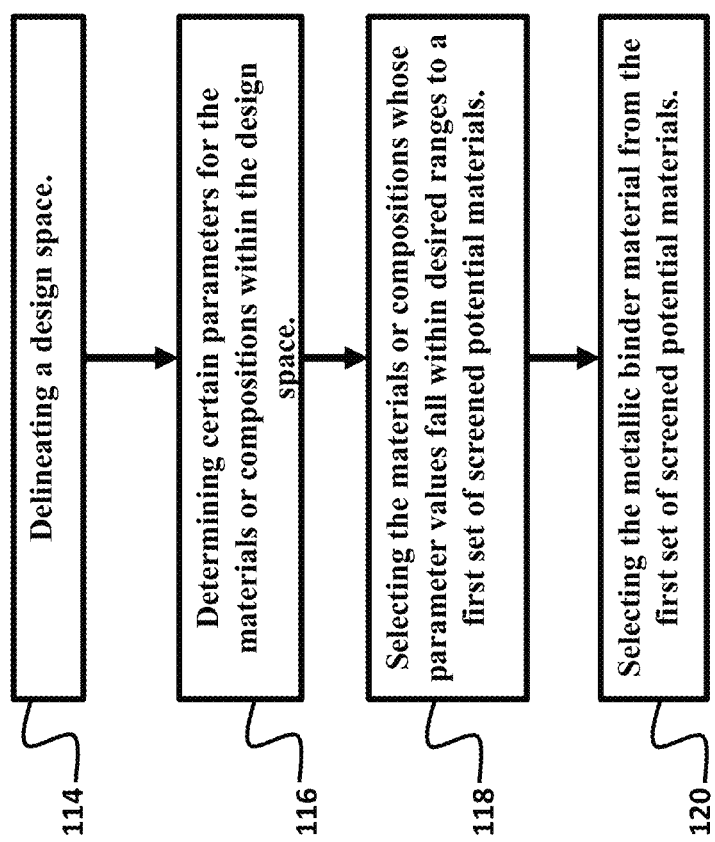
FIGS. 11A-11B are flow diagrams illustrating further embodiments of the selection process for the binder alloy in the method herein for fabricating dual-phase systems in which processing relies on liquid metal flow around a solid metal or ceramic component.
Figure 11B:
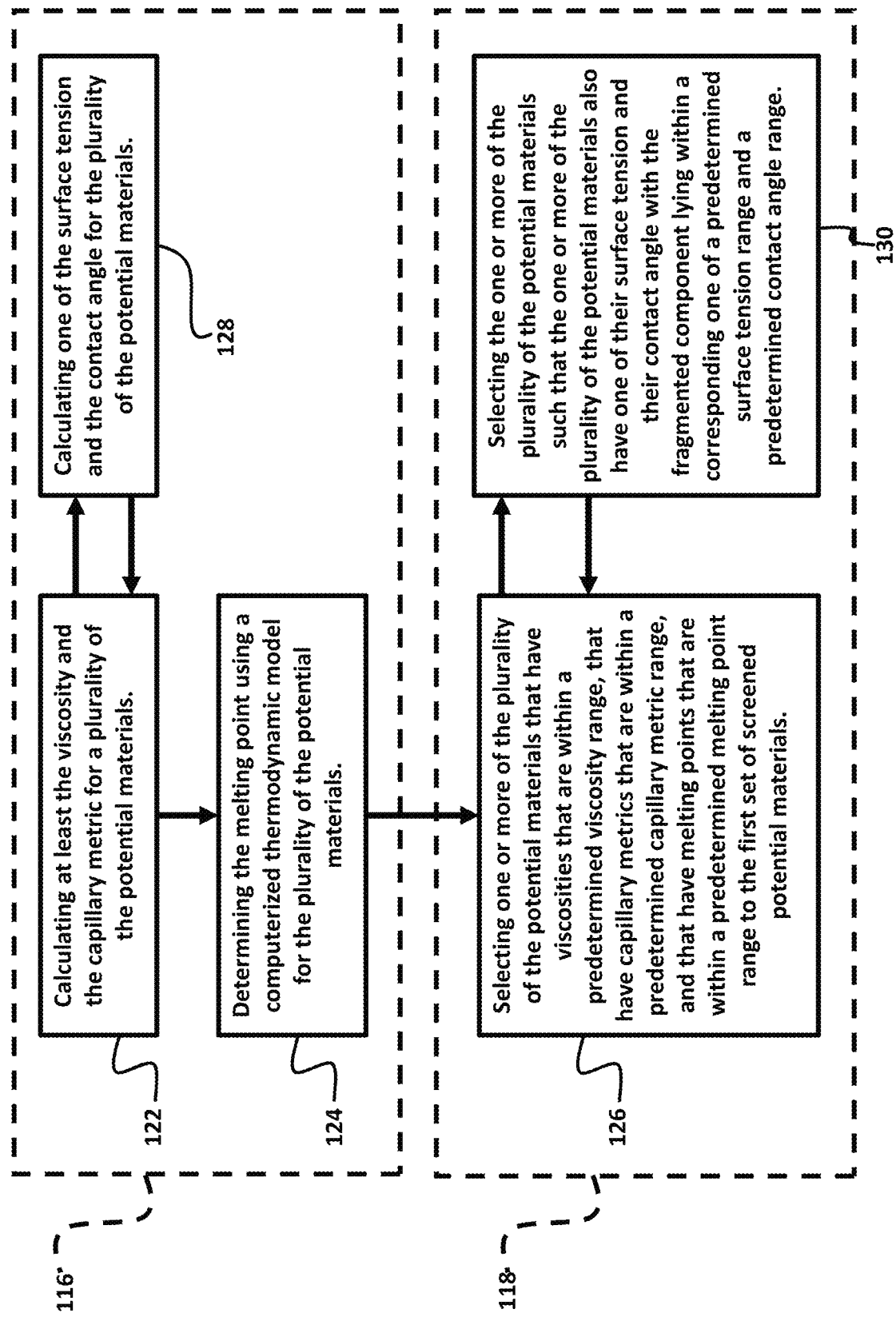

Referring to FIGS. 11A-11B, the step of selecting a metallic binder material for the metallic binder 102 further comprises the steps of delineating (114) a design space, calculating or determining (116) certain parameters for the materials or compositions within the design space, selecting (118) the materials or compositions whose parameter values fall within desired ranges to a first set of screened potential materials, and selecting (120) the metallic binder material from the first set of screened potential materials. The design space comprises at least one of a list of elements and a list of element combinations and the ranges for proportions of the elements in each combination that are potential materials for use in the metallic binder. Each potential material at least has a capillary metric and a viscosity in the liquid state, and each potential material has a melting temperature. These are some of the parameters used for screening the potential materials.

The step of calculating or determining certain parameters comprises calculating (122) at least the viscosity, the capillary metric, and determining (124) the melting point using a computerized thermodynamic model for a plurality of the potential materials. The step of selecting materials or compositions to the first set of screened potential materials comprises selecting (126) one or more of the plurality of the potential materials that have viscosities that are within a predetermined viscosity range, that have capillary metrics that are within a predetermined capillary metric range, and that have melting points that are within a predetermined melting point range to the first set of screened potential materials.

In another embodiment, additional parameters are considered in the screening process. Each potential material also has a contact angle with respect to the second phase 100 and a surface tension. The screening process further comprises the step of calculating (128) one of the surface tension and the contact angle to determine the wetting characteristics with respect to the second phase for the plurality of the potential materials. The one or more of the plurality of the potential materials selected to the first set of screened potential materials are also selected (130) such that each has one of its surface tension and its contact angle with the second phase lying within a corresponding one of a predetermined surface tension range and a predetermined contact angle range.

Figure 12:
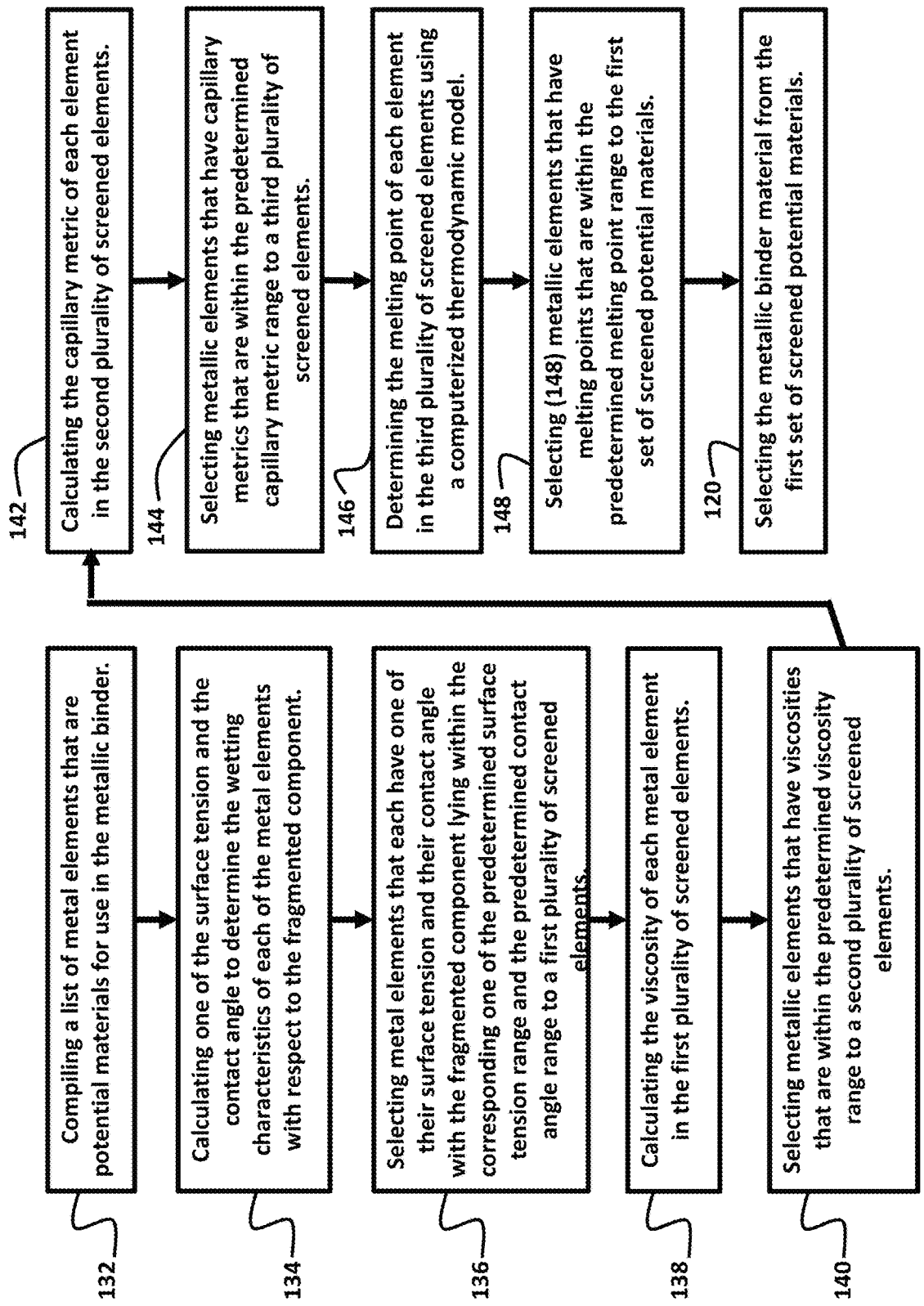
FIG. 12 is a flow diagram illustrating another embodiment of the selection process for the binder alloy in the method herein for fabricating dual-phase systems in which processing relies on liquid metal flow around a solid metal or ceramic component.

In an embodiment (FIG. 12), the screening process comprises the steps for screening binder material including a single metal element. The screening process for single element material comprises the step of compiling (132) a list of metal elements that are potential materials for use in the metallic binder. Each of the metal elements has a contact angle with respect to the second phase, a surface tension, a capillary metric, and a viscosity in the liquid state, and each of the metal elements has a melting temperature. The screening process for single element material further comprises the step of calculating (134) one of the surface tension and the contact angle to determine the wetting characteristics of each of the metal elements with respect to the second phase. The next step is selecting (136) metal elements that each have one of their surface tension and their contact angle with the second phase lying within the corresponding one of the predetermined surface tension range and the predetermined contact angle range to a first plurality of screened elements.

A further step in the process is calculating (138) the viscosity of each metal element in the first plurality of screened elements, followed by selecting (140) metallic elements that have viscosities that are within the predetermined viscosity range to a second plurality of screened elements. Another step in the process is calculating (142) the capillary metric of each element in the second plurality of screened elements, followed by selecting (144) metallic elements that have capillary metrics that are within the predetermined capillary metric range to a third plurality of screened elements. Yet a further step is determining (146) the melting point of each element in the third plurality of screened elements using a computerized thermodynamic model, followed by selecting (148) metallic elements that have melting points that are within the predetermined melting point range to the first set of screened potential materials. Accordingly, the first set of screened potential materials includes the single metal element binders that have calculated or determined parameters that all fall in the desired ranges. A further step is selecting (120) the metallic binder material from among the first set of screened potential materials.

It should be noted that "calculating" as used herein may involve evaluation of any parameters that may be needed for the calculation. The terms "determine" or "determining" as used herein encompasses calculating as well as other techniques such as, for example, looking up values stored in tables. It should be noted that the parameters used for the screening process can be evaluated in any order, except when the value of one parameter is needed for the evaluation of another parameter. For example, the contact angle, surface tension, and viscosity are needed for the evaluation of the capillary metric, as is described later, and therefore need to be evaluated before the capillary metric. Also, both the contact angle and the surface tension do not always have to be used for screening as at times the value of only one of these may be sufficient for screening purposes. In the above screening process for single metal element binder materials, each time a parameter is evaluated, it is used immediately to eliminate some materials from contention and to select some materials for further consideration.

Figure 13:
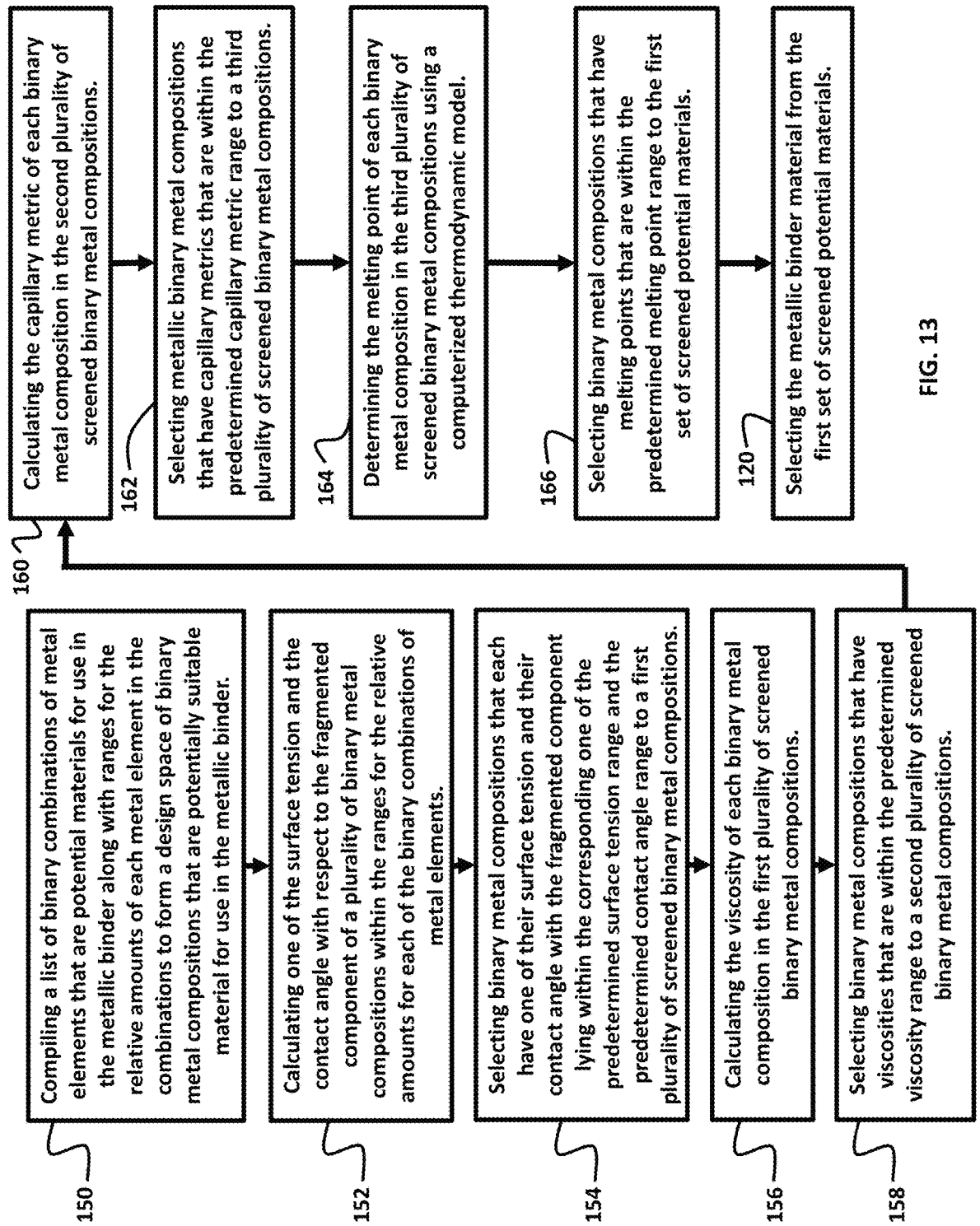
FIG. 13 is a flow diagram illustrating yet another embodiment of the selection process for the binder alloy in the method herein for fabricating dual-phase systems in which processing relies on liquid metal flow around a solid metal or ceramic component.

In another embodiment (FIG. 13), the screening process comprises the steps for screening binder material including a binary combination of metal elements. The screening process for binary metal element material comprises the step of compiling (150) a list of binary combinations of metal elements that are potential materials for use in the metallic binder along with ranges for the relative amounts of each metal element in the combinations to form a design space of binary metal compositions that are potentially suitable material for use in the metallic binder. Each binary metal composition has a contact angle with respect to the second phase, a surface tension, a capillary metric, and a viscosity in the liquid state, and each binary metal composition has a melting temperature. The screening process for binary metal element material further comprises the step of calculating (152) one of the surface tension and the contact angle with respect to the second phase of a plurality of binary metal compositions within the ranges for the relative amounts for each of the binary combinations of metal elements to determine the wetting characteristics thereof. The following step is selecting (154) binary metal compositions that each have one of their surface tension and their contact angle with the second phase lying within the corresponding one of the predetermined surface tension range and the predetermined contact angle range to a first plurality of screened binary metal compositions.

A further step is calculating (156) the viscosity of each binary metal composition in the first plurality of screened binary metal compositions, followed by selecting (158) binary metal compositions that have viscosities that are within the predetermined viscosity range to a second plurality of screened binary metal compositions. Another step is calculating (160) the capillary metric of each binary metal composition in the second plurality of screened binary metal compositions, followed by selecting (162) metallic binary metal compositions that have capillary metrics that are within the predetermined capillary metric range to a third plurality of screened binary metal compositions. Yet a further step is determining (164) the melting point of each binary metal composition in the third plurality of screened binary metal compositions using a computerized thermodynamic model, followed by selecting (166) binary metal compositions that have melting points that are within the predetermined melting point range to the first set of screened potential materials. The following step is then selecting (120) the metallic binder material from among the first set of screened potential materials.

It should be noted that "combination" as used herein refer to the identity of the elements in the combination, while "composition" refers to the combination of element in specific relative proportions of the elements. The relative proportions of metal elements in a composition, usually expressed in at. % (atomic percent) are based on the relative proportions of the metal elements in the composition relative to each other and does not include non-metal, such as carbon that may be present in the compositions. The carbon content of the composition is given in wt. % based on the total weight of the composition. In the above screening process for binary metal element binder materials, each time a parameter is evaluated, it is used immediately to eliminate some materials from contention and to select some materials for further consideration.

Figure 14:
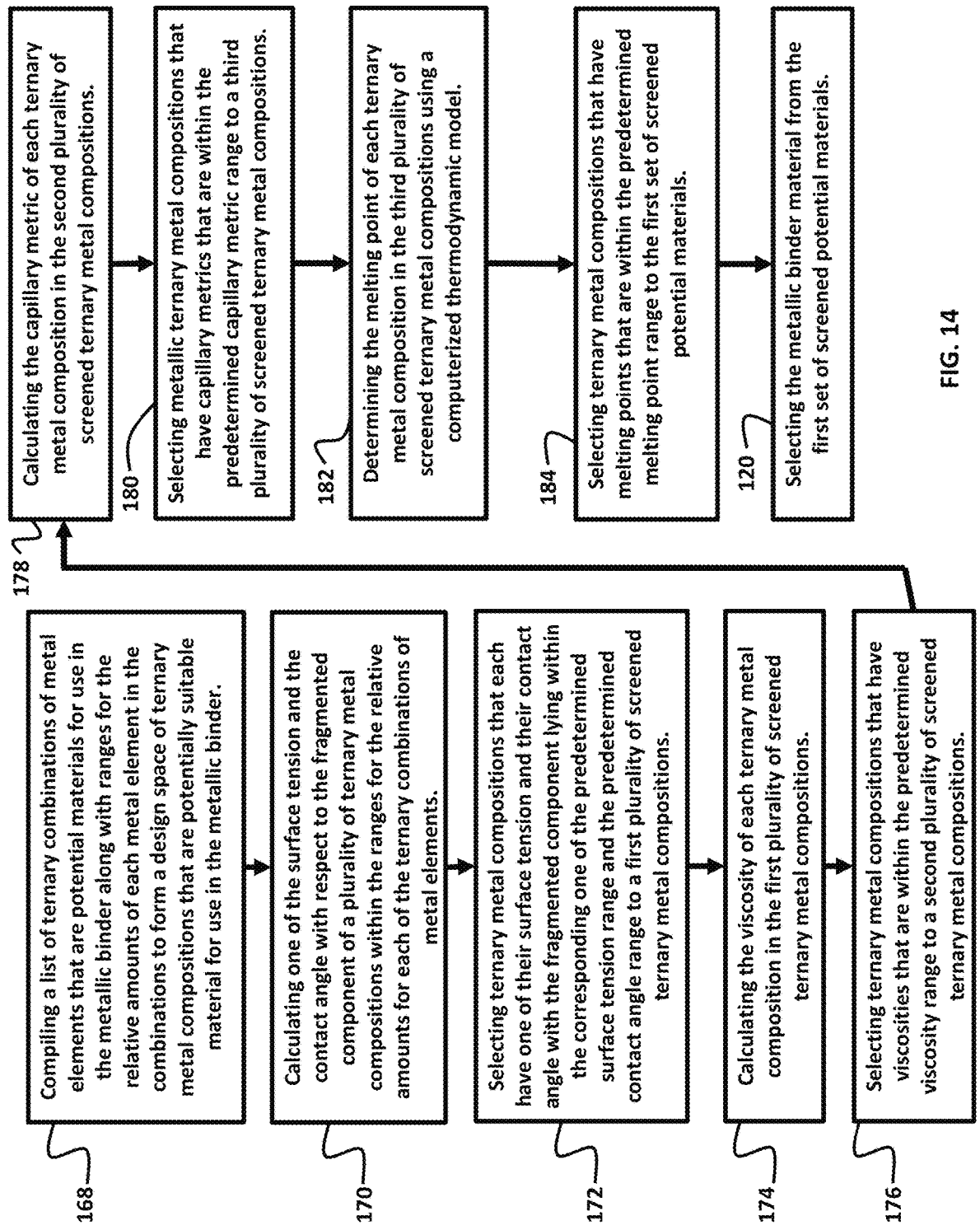
FIG. 14 is a flow diagram illustrating yet another embodiment of the selection process for the binder alloy in the method herein for fabricating dual-phase systems in which processing relies on liquid metal flow around a solid metal or ceramic component.

In a further embodiment (FIG. 14), the screening process comprises the steps for screening binder material including a ternary combination of metal elements. The screening process for ternary metal element material comprises the step of compiling (168) a list of ternary combinations of metal elements that are potential materials for use in the metallic binder along with ranges for the relative amounts of each metal element in the combinations to form a design space of ternary metal compositions that are potentially suitable material for use in the metallic binder. Each ternary metal composition has a contact angle with respect to the second phase, a surface tension, a capillary metric, and a viscosity in the liquid state, and each ternary metal composition has a melting temperature. The screening process for binary metal element material further comprises the step of calculating (170) one of the surface tension and the contact angle with respect to the second phase of a plurality of ternary metal compositions within the ranges for the relative amounts for each of the ternary combinations of metal elements to determine the wetting characteristics thereof. The next step is selecting (172) ternary metal compositions that each have one of their surface tension and their contact angle with the second phase lying within the corresponding one of the predetermined surface tension range and the predetermined contact angle range to a first plurality of screened ternary metal compositions.

A further step is calculating (174) the viscosity of each ternary metal composition in the first plurality of screened ternary metal compositions, followed by selecting (176) ternary metal compositions that have viscosities that are within the predetermined viscosity range to a second plurality of screened ternary metal compositions. Another step is calculating (178) the capillary metric of each ternary metal composition in the second plurality of screened ternary metal compositions, followed by selecting (180) metallic ternary metal compositions that have capillary metrics that are within the predetermined capillary metric range to a third plurality of screened ternary metal compositions. Yet another step is determining (182) the melting point of each ternary metal composition in the third plurality of screened ternary metal compositions using a computerized thermodynamic model, followed by selecting (184) ternary metal compositions that have melting points that are within the predetermined melting point range to the first set of screened potential materials, and then selecting (120) the metallic binder material from among the first set of screened potential materials.

In the above screening process for ternary metal element binder materials, each time a parameter is evaluated, it is used immediately to eliminate some materials from contention and to select some materials for further consideration.

Figure 15:
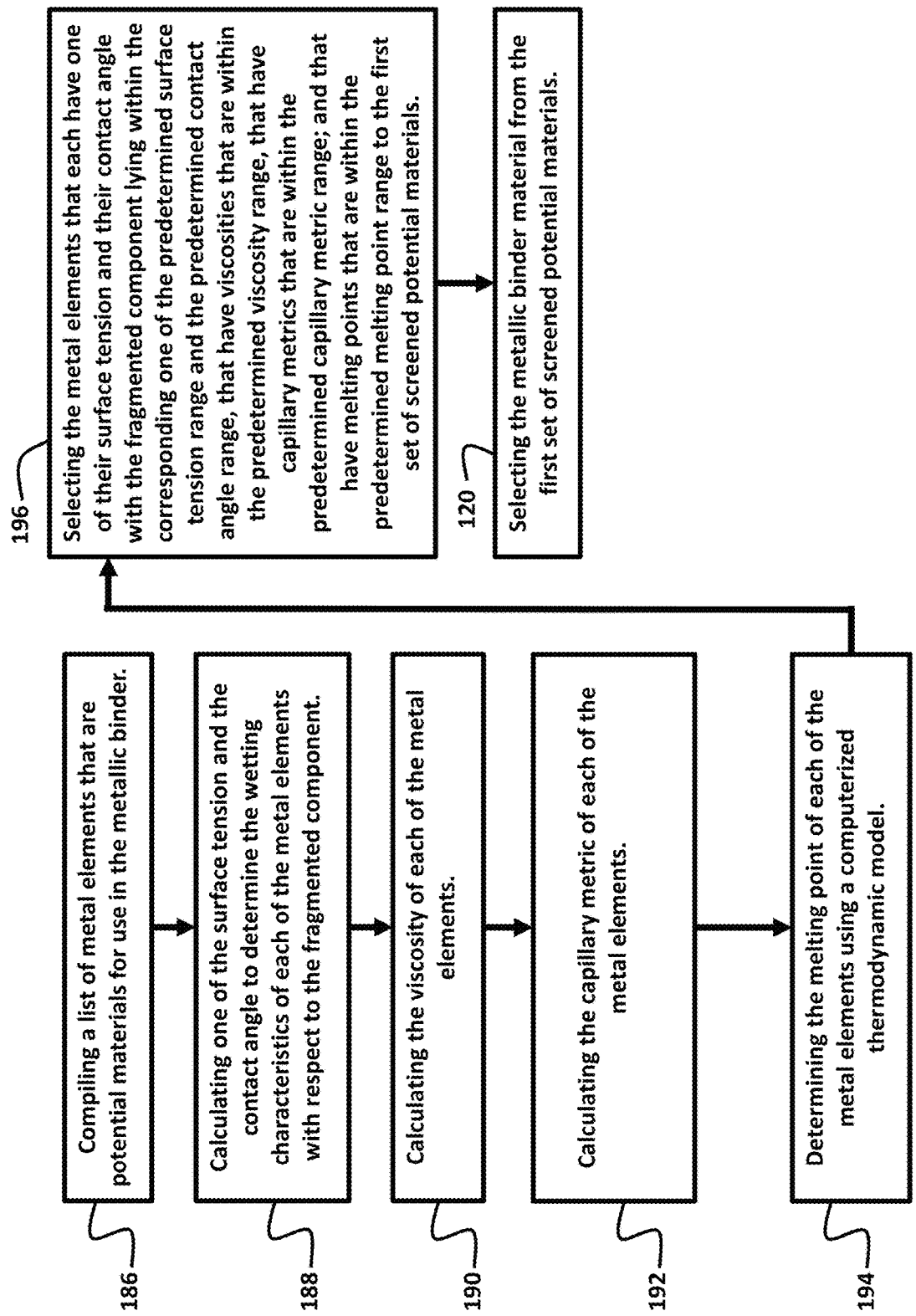
FIG. 15 is a flow diagram illustrating yet another embodiment of the selection process for the binder alloy in the method herein for fabricating dual-phase systems in which processing relies on liquid metal flow around a solid metal or ceramic component.

In yet another embodiment (FIG. 15), the screening process comprises the steps for screening binder material including a single metal element. This screening process for single element material comprises the step of compiling (186) a list of metal elements that are potential materials for use in the metallic binder, wherein each of the metal elements has a contact angle with respect to the second phase, a surface tension, a capillary metric, and a viscosity in the liquid state, and each of the metal elements has a melting temperature. This step is followed by calculating (188) one of the surface tension and the contact angle to determine the wetting characteristics of each of the metal elements with respect to the second phase, calculating (190) the viscosity of each of the metal elements, calculating (192) the capillary metric of each of the metal elements, and determining (194) the melting point of each of the metal elements using a computerized thermodynamic model. These steps are followed by selecting (196) the metal elements that each have one of their surface tension and their contact angle with the second phase lying within the corresponding one of the predetermined surface tension range and the predetermined contact angle range, that have viscosities that are within the predetermined viscosity range, that have capillary metrics that are within the predetermined capillary metric range; and that have melting points that are within the predetermined melting point range to the first set of screened potential materials. Another step in the process is selecting (120) the metallic binder material from among the first set of screened potential materials.

In the above screening process for single metal element binder materials, all the parameters used for the screening process are evaluated for all the metal elements in the design space before the parameters are used to eliminate some materials from contention and to select some other materials for further consideration through, for example, experimental testing or computationally more intensive thermodynamic computer modeling.

Figure 16:
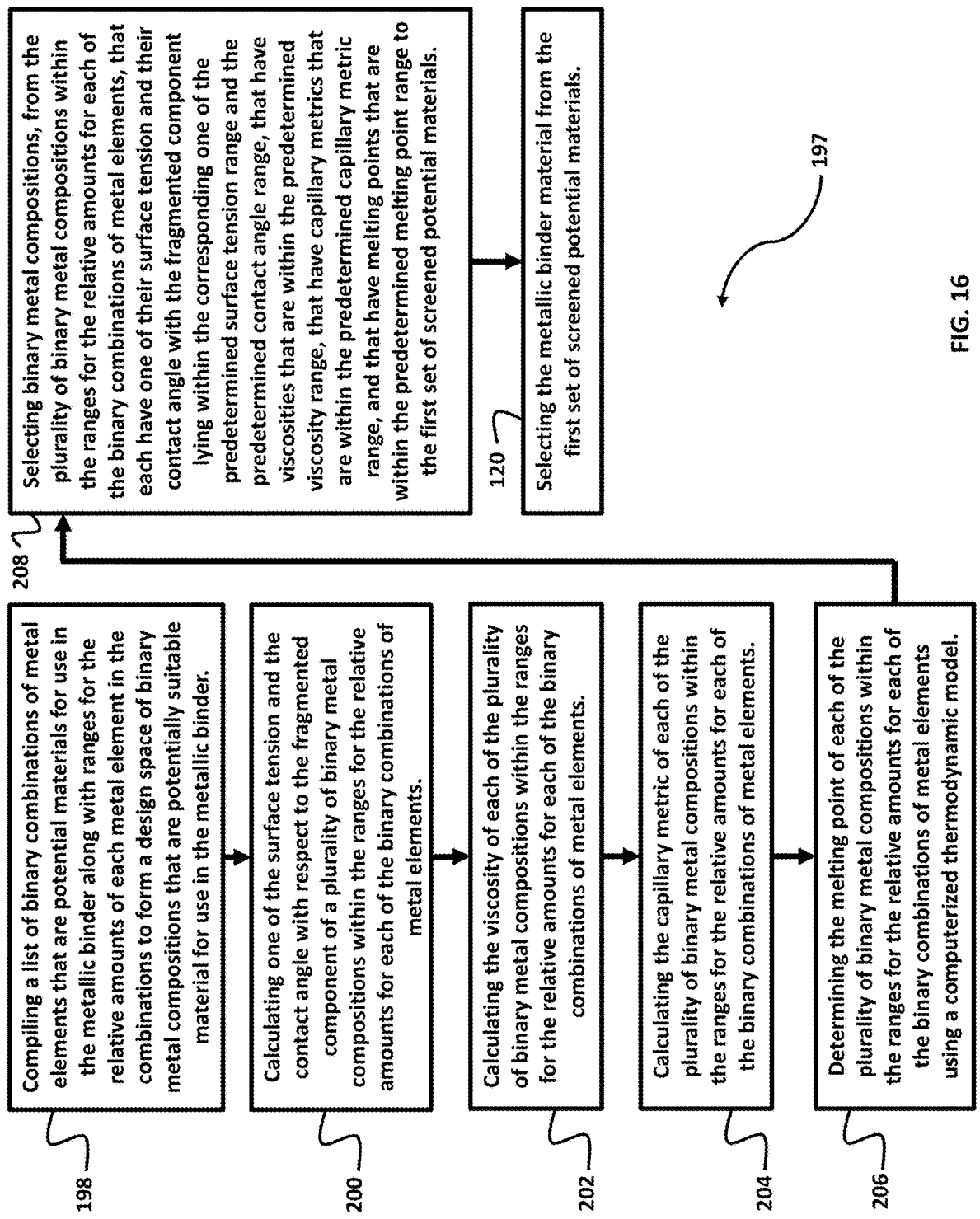
FIG. 16 is a flow diagram illustrating yet another embodiment of the selection process for the binder alloy in the method herein for fabricating dual-phase systems in which processing relies on liquid metal flow around a solid metal or ceramic component.

In yet another embodiment (FIG. 16), the screening process (197) comprises the steps for screening binder material including a binary combination of metal elements. The screening process for binary metal element material comprises the step of compiling (198) a list of binary combinations of metal elements that are potential materials for use in the metallic binder along with ranges for the relative amounts of each metal element in the combinations to form a design space of binary metal compositions that are potentially suitable material for use in the metallic binder. Each binary metal composition has a contact angle with respect to the second phase, a surface tension, a capillary metric, and a viscosity in the liquid state, and each binary metal composition has a melting temperature. This step is followed by calculating (200) one of the surface tension and the contact angle with respect to the second phase of a plurality of binary metal compositions within the ranges for the relative amounts for each of the binary combinations of metal elements to determine the wetting characteristics thereof, calculating (202) the viscosity of each of the plurality of binary metal compositions within the ranges for the relative amounts for each of the binary combinations of metal elements, calculating (204) the capillary metric of each of the plurality of binary metal compositions within the ranges for the relative amounts for each of the binary combinations of metal elements, and determining (206) the melting point of each of the plurality of binary metal compositions within the ranges for the relative amounts for each of the binary combinations of metal elements using a computerized thermodynamic model. These steps are followed by the step of selecting (208) binary metal compositions, from the plurality of binary metal compositions within the ranges for the relative amounts for each of the binary combinations of metal elements, that each have one of their surface tension and their contact angle with the second phase lying within the corresponding one of the predetermined surface tension range and the predetermined contact angle range, that have viscosities that are within the predetermined viscosity range, that have capillary metrics that are within the predetermined capillary metric range, and that have melting points that are within the predetermined melting point range to the first set of screened potential materials. Another step in the process is selecting (120) the metallic binder material from among the first set of screened potential materials.

In the above screening process for binary metal element binder materials, all the parameters used for the screening process are evaluated for a sufficiently large representative number of the binary element compositions in the design space before the parameters are used to eliminate some compositions from contention and to select some other compositions for further consideration through, for example, experimental testing or computationally more intensive thermodynamic computer modeling.

Figure 17:
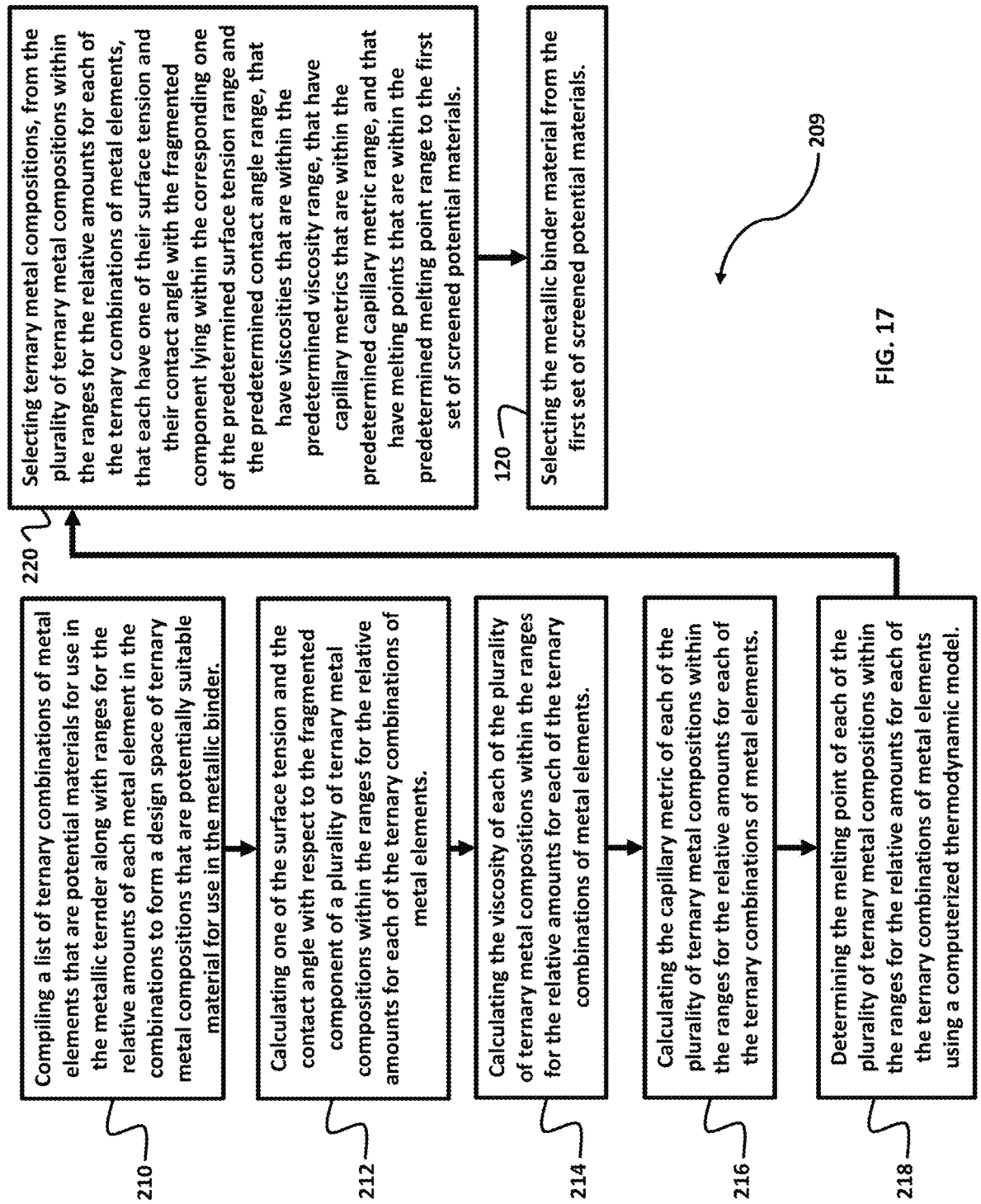
FIG. 17 is a flow diagram illustrating yet another embodiment of the selection process for the binder alloy in the method herein for fabricating dual-phase systems in which processing relies on liquid metal flow around a solid metal or ceramic component.

In yet another embodiment (FIG. 17), the screening process (209) comprises the steps for screening binder material including a ternary combination of metal elements. The screening process for ternary metal element material comprises the step of compiling (210) a list of ternary combinations of metal elements that are potential materials for use in the metallic binder along with ranges for the relative amounts of each metal element in the combinations to form a design space of ternary metal compositions that are potentially suitable material for use in the metallic binder, wherein each ternary metal composition has a contact angle with respect to the second phase, a surface tension, a capillary metric, and a viscosity in the liquid state, and each ternary metal composition has a melting temperature. This step is followed by the steps of calculating (212) one of the surface tension and the contact angle with respect to the second phase of a plurality of ternary metal compositions within the ranges for the relative amounts for each of the ternary combinations of metal elements to determine the wetting characteristics thereof, calculating (214) the viscosity of each of the plurality of ternary metal compositions within the ranges for the relative amounts for each of the ternary combinations of metal elements, calculating (216) the capillary metric of each of the plurality of ternary metal compositions within the ranges for the relative amounts for each of the ternary combinations of metal elements, and determining (218) the melting point of each of the plurality of ternary metal compositions within the ranges for the relative amounts for each of the ternary combinations of metal elements using a computerized thermodynamic model. These steps are followed by the step of selecting (220) ternary metal compositions, from the plurality of ternary metal compositions within the ranges for the relative amounts for each of the ternary combinations of metal elements, that each have one of their surface tension and their contact angle with the second phase lying within the corresponding one of the predetermined surface tension range and the predetermined contact angle range, that have viscosities that are within the predetermined viscosity range, that have capillary metrics that are within the predetermined capillary metric range, and that have melting points that are within the predetermined melting point range to the first set of screened potential materials. Another step in the process is selecting (120) the metallic binder material from among the first set of screened potential materials.

In the above screening process for ternary metal element binder materials, all the parameters used for the screening process are evaluated for a sufficiently large representative number of the ternary element compositions in the design space before the parameters are used to eliminate some compositions from contention and to select some other compositions for further consideration through, for example, experimental testing or computationally more intensive thermodynamic computer modeling. The screening process for single metal element material, the screening process for binary metal element material, and the screening process for ternary metal element material can be combined to screen an entire design space of single metal element, binary metal element, and ternary metal element materials.

Figure 18:
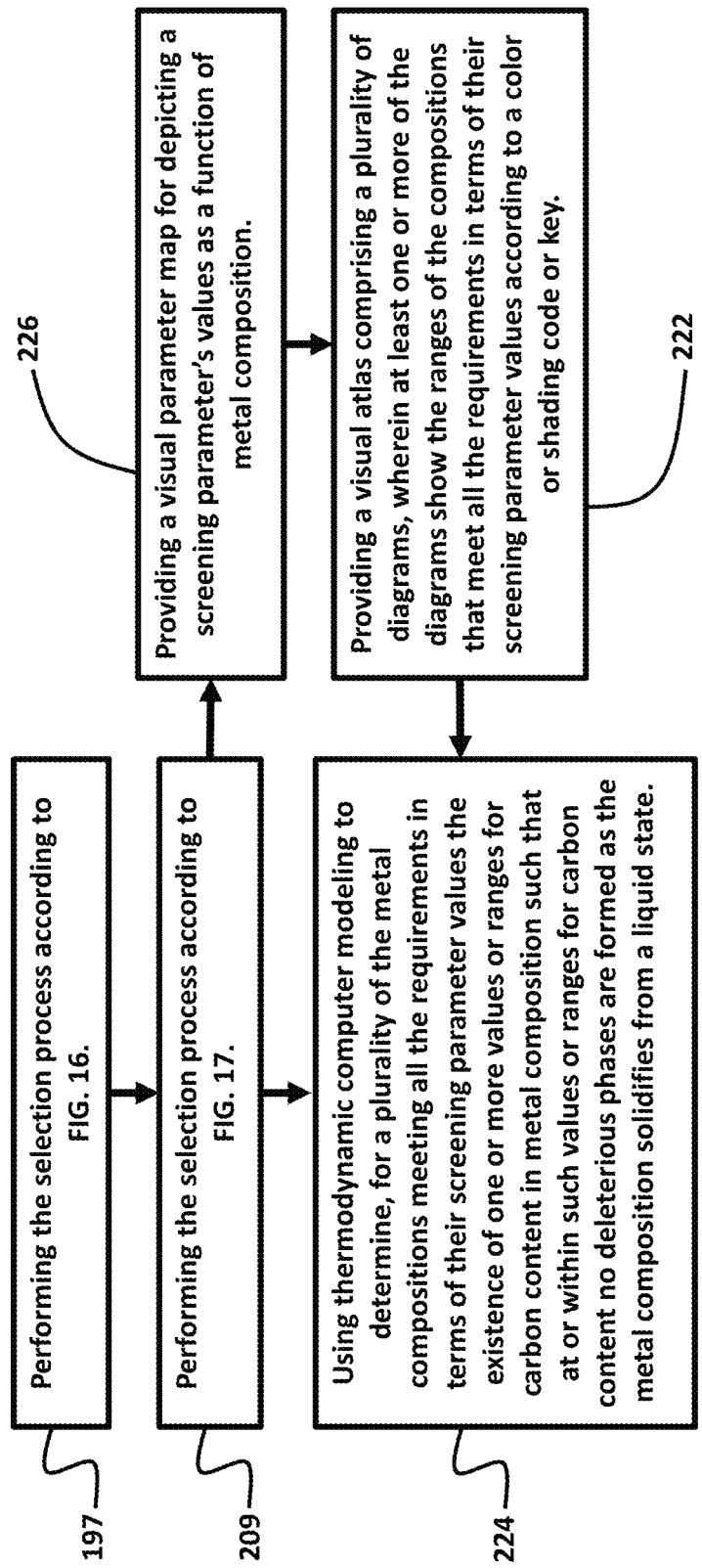
FIG. 18 is a flow diagram illustrating yet another embodiment of the selection process for the binder alloy that employs a visual atlas in the method herein for fabricating dual-phase systems in which processing relies on liquid metal flow around a solid metal or ceramic component.

Referring to FIG. 18, in the processes for screening binary or ternary metal element binder materials or their combinations, it is useful to provide a visual atlas (see FIGS. 9A-9C) to facilitate the selection process. Each binary metal composition comprises a primary metal element and a secondary metal element; and each ternary metal composition comprises a primary metal element, a secondary metal element, and a tertiary metal element. Accordingly, the processes for screening binary or ternary metal element binder materials or their combination can include the step of providing (222) a visual atlas comprising a plurality of diagrams, each of the plurality of diagrams being a graph, a first subset of the plurality of diagrams being directed to the binary metal compositions, and a second subset of the plurality of diagrams being directed to the ternary metal compositions. Each diagram in the first subset corresponds to a corresponding binary combination of metal elements and has an axis, which is horizontal in the illustrated example, with indicia indicating the proportion of the secondary metal element in the binary metal compositions of the corresponding binary combination of metal elements, the balance comprising the primary metal element. Also, each diagram in the first subset will have at least one colored or shaded area in the form of an area, which is a vertical rectangular area in the illustrated example, colored or shaded according to a color or shading key or code to indicate the range of the proportion of the secondary metal element for which the binary metal compositions of the corresponding binary combination of metal elements at least have viscosities that are within the predetermined viscosity range, have capillary metrics that are within the predetermined capillary metric range, and have melting points that are within the predetermined melting point range when at least some of the binary metal compositions of the corresponding binary combination of metal elements of a particular diagram in fact at least have viscosities that are within the predetermined viscosity range, have capillary metrics that are within the predetermined capillary metric range, and have melting points that are within the predetermined melting point range.

Each diagram in the second subset corresponds to a corresponding ternary combination of metal elements and has a first axis, which is horizontal in the illustrated example, with indicia indicating the proportion of the secondary metal element in the ternary metal compositions of the corresponding ternary combination of metal elements and has a second axis, which is horizontal in the illustrated example, with indicia indicating the proportion of the tertiary metal element in the ternary metal compositions of the corresponding ternary combination of metal elements, the balance of the total of the proportions of the secondary and tertiary metal elements comprising the primary metal element. Also, each diagram in the second subset will have at least one colored or shaded area in the form of an area colored or shaded according to a color or shading key or code to indicate the range of the proportions of the secondary metal element and the tertiary metal element for which the ternary metal compositions of the corresponding ternary combination of metal elements at least have viscosities that are within the predetermined viscosity range, have capillary metrics that are within the predetermined capillary metric range, and have melting points that are within the predetermined melting point range when at least some of the ternary metal compositions of the corresponding ternary combination of metal elements of a particular diagram in fact at least have viscosities that are within the predetermined viscosity range, have capillary metrics that are within the predetermined capillary metric range, and have melting points that are within the predetermined melting point range. Another step in the process is then selecting the metallic binder material from among the binary metal compositions and the ternary metal compositions falling within the areas of diagrams colored or shaded according to the code or key indicative of the compositions meeting all the parameter requirements for selection as binder material candidates in the first subset of the plurality of diagrams and the second subset of the plurality of diagrams, respectively.

In some embodiments, the binary metal compositions and the ternary metal compositions falling within the colored or shaded areas of diagrams in the first subset of the plurality of diagrams and the second subset of the plurality of diagrams also have one of their surface tension and their contact angle with the second phase lying within the corresponding one of the predetermined surface tension range and the predetermined contact angle range.

In some of the embodiments disclosed herein, the screening process further comprises the step of using (224) thermodynamic computer modeling to determine, for a plurality of the binary metal compositions and the ternary metal compositions falling within the colored or shaded areas of diagrams in the first subset of the plurality of diagrams and the second subset of the plurality of diagrams, the existence of one or more values or ranges for carbon content in the binary metal composition or the ternary metal composition such that at or within such values or ranges for carbon content no deleterious phases are formed as the binary metal composition or the ternary metal composition solidifies from a liquid state. These embodiments preferably also include the step of selecting the metallic binder material from among the binary metal compositions and the ternary metal compositions that have values or ranges for carbon content such that no deleterious phases are formed as the binary metal composition or the ternary metal composition solidifies from a liquid state.

In yet another embodiment, each binary metal composition comprises a primary metal element and a secondary metal element; each ternary metal composition comprises a primary metal element, a secondary metal element, and a tertiary metal element; and the method further comprises the step of providing (226) a visual parameter map for depicting a parameter (i.e. the parameter's values) as a function of metal composition. The visual parameter map comprising a plurality of diagrams, each of the plurality of diagrams being a graph, a first subset of the plurality of diagrams being directed to the binary metal compositions, and a second subset of the plurality of diagrams being directed to the ternary metal compositions. The visual parameter map provides a visual display of the binary metal compositions and the ternary metal compositions that have values for the depicted parameter that fall within a predetermined range of acceptable values for the depicted parameter.

Each diagram in the first subset corresponds to a corresponding binary combination of metal elements and has an axis, which is horizontal in the illustrated example, with indicia indicating the proportion of the secondary metal element in the binary metal compositions of the corresponding binary combination of metal elements, the balance comprising the primary metal element. Each diagram in the first subset has a plurality of regions in the form of areas, which are vertical rectangular areas in the illustrated example, that are each colored or shaded with a unique corresponding color or shading according to a color or shading key or code such that the areas are distinguished from one another by their unique color or shading. Each color or shading corresponds to a range of values of the parameter depicted by the map in accordance with the color or shading key or code such that the range of values corresponding to each color does not overlap any of the ranges for the other colors in the color or shading key or code.

Each diagram in the second subset corresponds to a corresponding ternary combination of metal elements and has a first axis, which is horizontal in the illustrated example, with indicia indicating the proportion of the secondary metal element in the ternary metal compositions of the corresponding ternary combination of metal elements and has a second axis, which is vertical in the illustrated example, with indicia indicating the proportion of the tertiary metal element in the ternary metal compositions of the corresponding ternary combination of metal elements, the balance of the total of the proportions of the secondary and tertiary metal elements comprising the primary metal element. Each diagram in the second subset has a plurality of regions in the form of areas that are each colored or shaded with a unique corresponding color or shading according to the color or shading key or code such that the areas are distinguished from one another by their unique color or shading, each color or shading corresponding to a range of values of the parameter depicted by the map in accordance with the color or shading key or code such that the range of values corresponding to each color does not overlap any of the ranges for the other colors in the key or code.

The parameter depicted by the parameter map is selected from group consisting of the contact angle with the second phase, the surface tension, the viscosity, the capillary metric, and the melting point. In some embodiments, the plurality of diagrams in the visual atlas or in the parameter map are arranged in a rectangular or triangular array. The element symbols W, C, Co, Fe, Al, Cr, Cu, Mn, Mo, Nb, Ni, Ta, Ti, V, and Zr, stand for the elements tungsten, carbon, cobalt, iron, aluminum, chromium, copper, manganese, molybdenum, niobium, nickel, tantalum, titanium, vanadium, and zirconium, respectively, herein.

In an example herein, the predetermined range for acceptable contact angles is from zero to about five degrees. More preferably, the predetermined range for acceptable contact angles is from zero to about three degrees. In one example herein, the predetermined range for acceptable surface tension values is less than or equal to about 1.97 J/m$^2$. In an example herein, the predetermined range for acceptable viscosity is less than or equal to about 6 mPa·s. In an example herein, the predetermined range for acceptable capillary metrics is greater than or equal to about 0.36 √m/s. In an example herein, the predetermined range for acceptable melting points is less than or equal to about 1650° C.

The embodiments herein also include the screening methods or processes for screening candidates for the design of novel binder alloys and the visual atlases and parameter maps as described above and implemented using a computer or computer system, and data storage devices, including memory and computer-readable media, and computers containing code that is executed to implement the methods herein. Data storage devices, including memory and computer-readable media, include without limitation RAM, DRAM, SRAM, ROM, PROM, EPROM, EEPROM, flash drives, solid state drives, hard disk drives, floppy disks, and optical discs.

Figure 19:
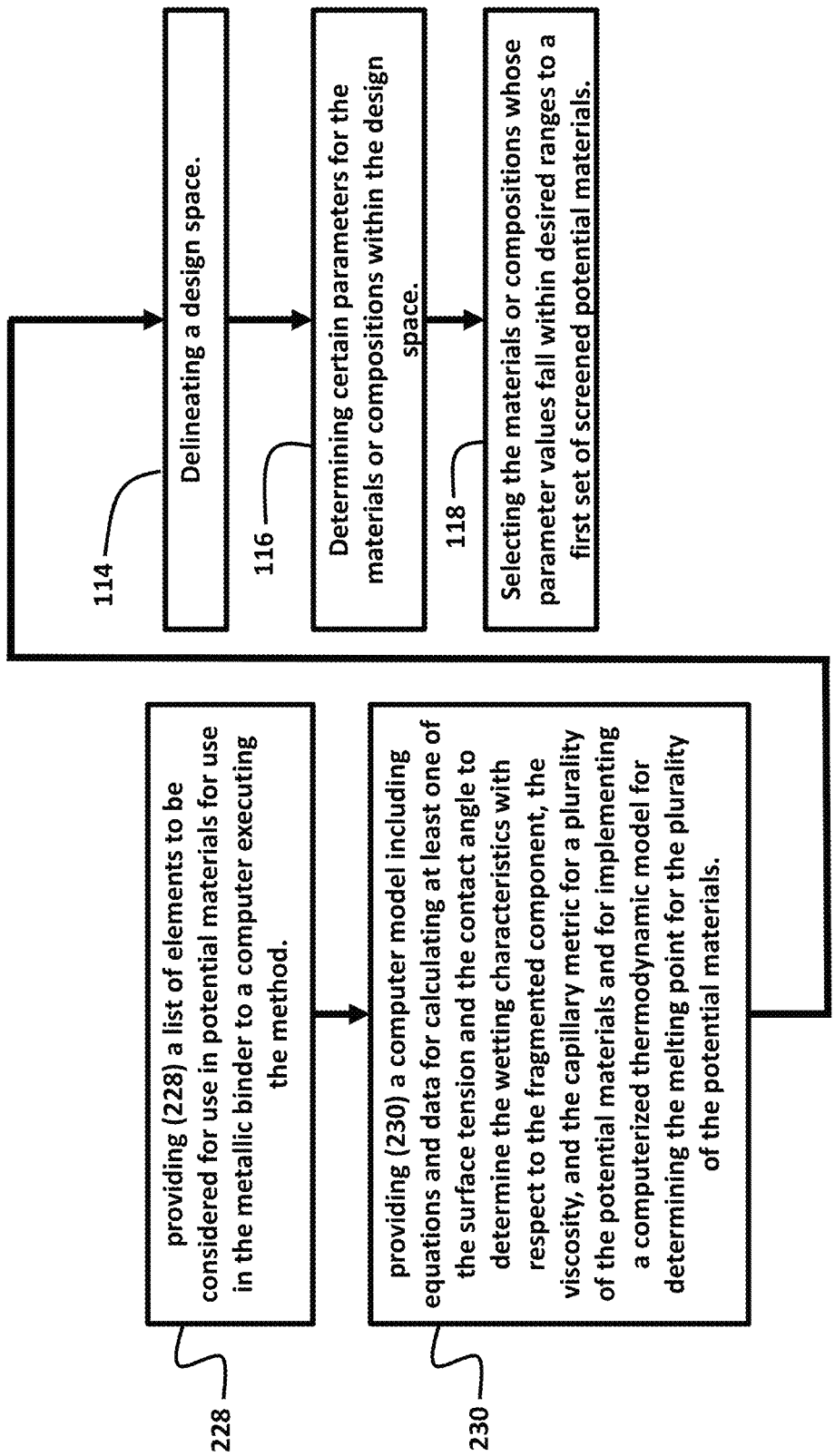
FIG. 19 is a flow diagram illustrating yet another embodiment of the selection process for the binder alloy in the method herein for fabricating dual-phase systems in which processing relies on liquid metal flow around a solid metal or ceramic component.

Accordingly, some embodiments herein encompass the selection processes disclosed herein executed by a computer or computer system or stored as code or data in an apparatus selected from a computer, a computer system, and a data storage device. Embodiments herein provide a computer-implemented, rapid method for screening candidate metallic material for use as a binder in a sintering process for manufacturing articles including material comprising a second phase of a metal, metal alloy, at least one ceramic or mixtures thereof in a binder matrix of a metallic binder. These embodiments, for example as shown in FIG. 19, encompass any of the screening/selection methods disclosed herein with the possible exception of the step of selecting (120) the metallic binder material from the first set of screened potential materials, which may be performed by a user based on results provided by the computer, and include the additional step of providing (228) a list of elements to be considered for use in potential materials for use in the metallic binder to a computer executing the method. These embodiments also include the step of providing (230) a computer model including equations and data for calculating at least one of the surface tension and the contact angle to determine the wetting characteristics with respect to the second phase, the viscosity, and the capillary metric for a plurality of the potential materials and for implementing a computerized thermodynamic model for determining the melting point for the plurality of the potential materials. The example of FIG. 19 is based on the process of FIGS. 11A-11B.

Figure 20:
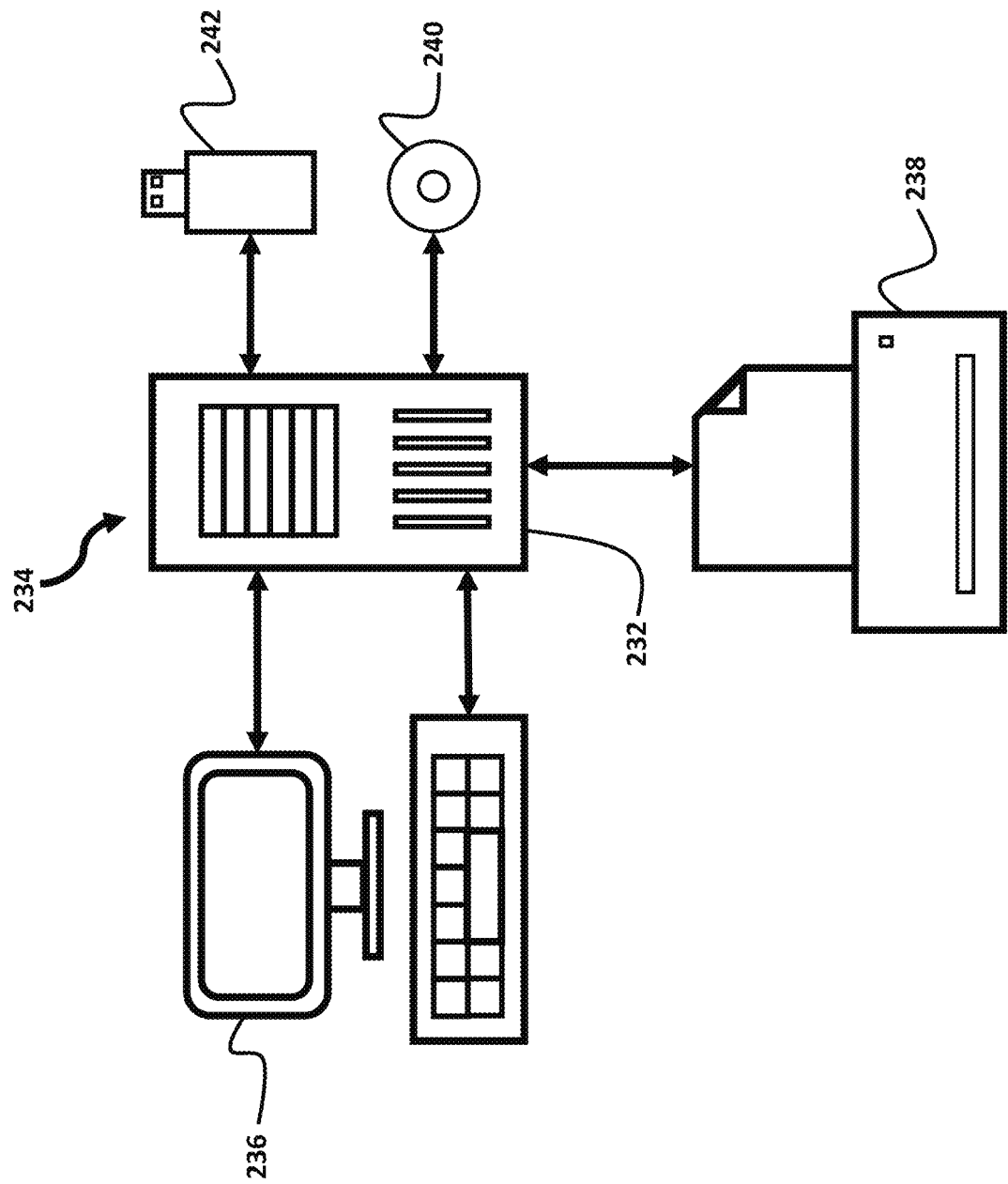
FIG. 20 is a schematic diagram illustrating a computer system for implementing the embodiments herein of the selection process for the binder alloy in the method herein for fabricating dual-phase systems in which processing relies on liquid metal flow around a solid metal or ceramic component.
Figure 22C:
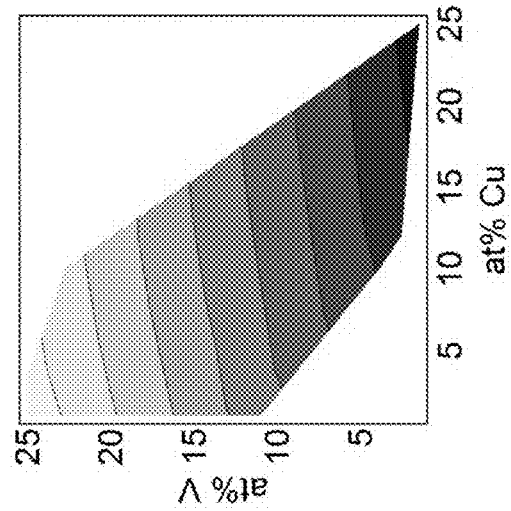
FIGS. 22A-22C show a mesh for exploring down selected region of interest in the Fe—Cu—V system through thermodynamic modeling (FIG. 22A); a contour plot of the carbon range width with lighter color indicating a wider processing window (FIG. 22B); and a contour plot depicting how far the beginning of the carbon window is off the stoichiometric ratio for 90/10 (FIG. 22C). Lighter colors indicate farther away, necessitating adding more free carbon to the system.
Figure 22B:
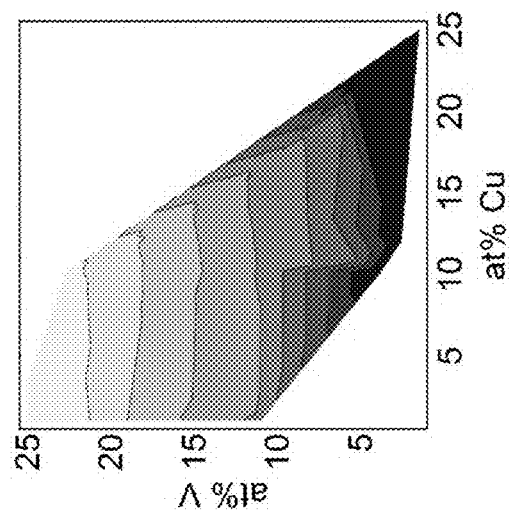
Figure 22A:
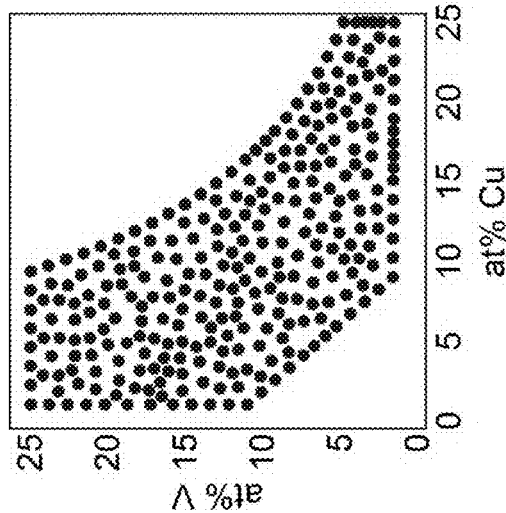

Referring to FIG. 20, the execution of the code at least results in the generation of the first set of screened potential materials so that a user can select the metallic binder material from the first set of screened potential materials. The computer 232, which may be part of the computer system 234, can display the first set of screened potential materials in the form of a table listing all the single element, binary, ternary or higher combinations of metal elements along with their compositional ranges or proportions that yield compositions that meet all the screening parameter requirements on the display 236 or in hard copy using the printer 238. FIG. 20 also shows examples of storage devices such as optical disk 240 and flash drive 242.

Figure 9A:
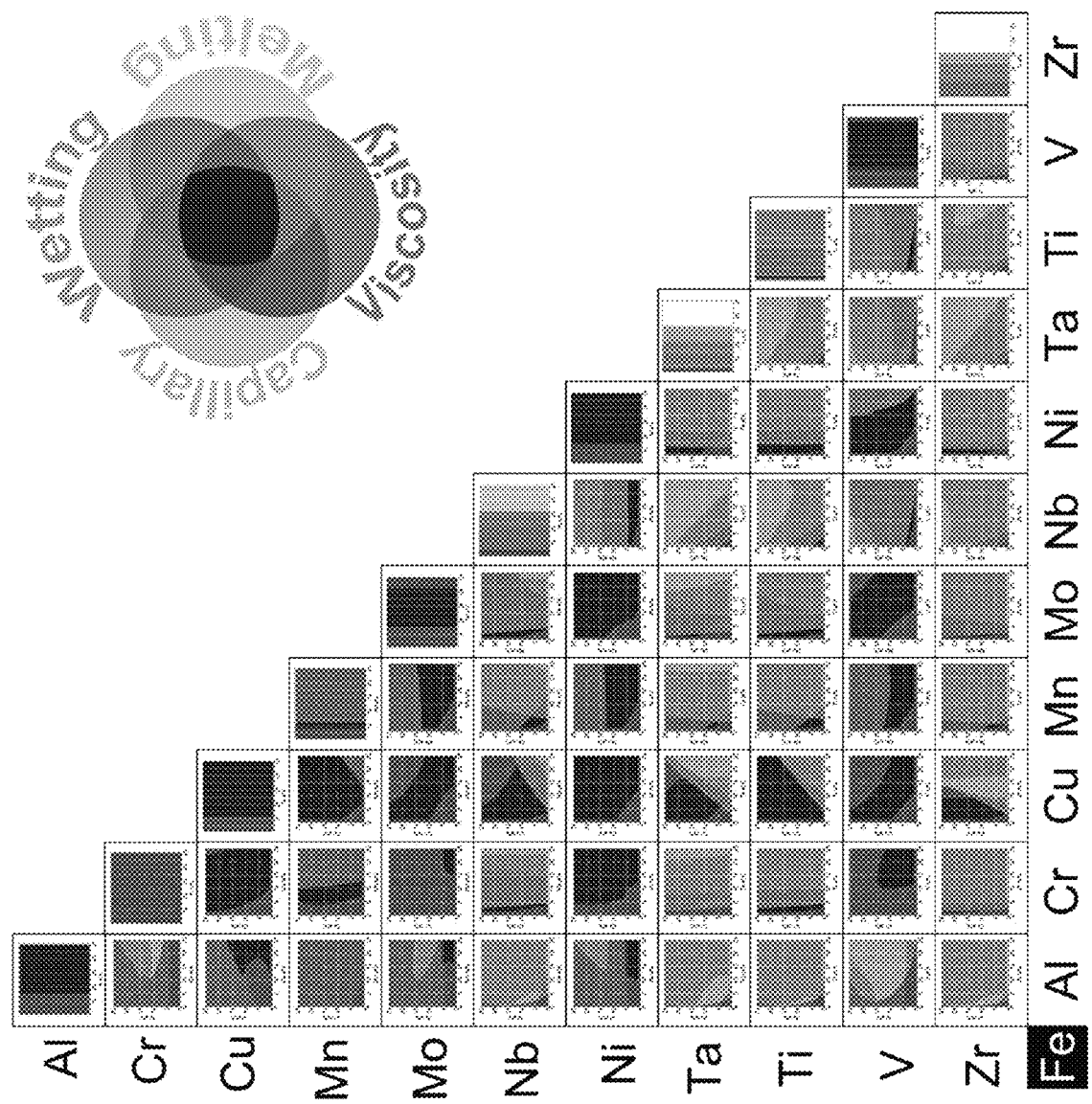
FIG. 9A shows the atlas of the binder alloys that meet the binder criteria for being viable binder candidates as a function of alloying content for binary (up to 50 at. %) and ternary (up to 25 at. % for both additions) iron alloys. Legend indicates the color values for meeting each of the four criteria and the colors of meeting multiple criteria. The darkest shaded regions correspond to alloy compositions that meet all the requirements in terms of the values of the screening parameters for an alloy composition to not be eliminated as a potentially viable binder for the WC/binder cermet system.
Figure 9C:
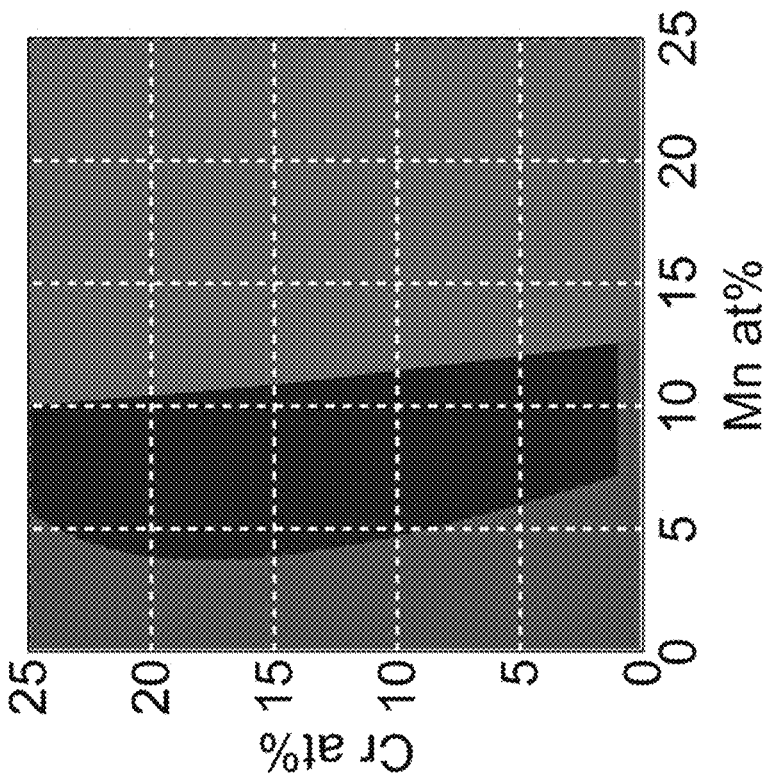
FIGS. 9B-9C show enlarged examples of the binary and ternary alloy plots shown in the atlas of FIG. 9A.
Figure 9B:
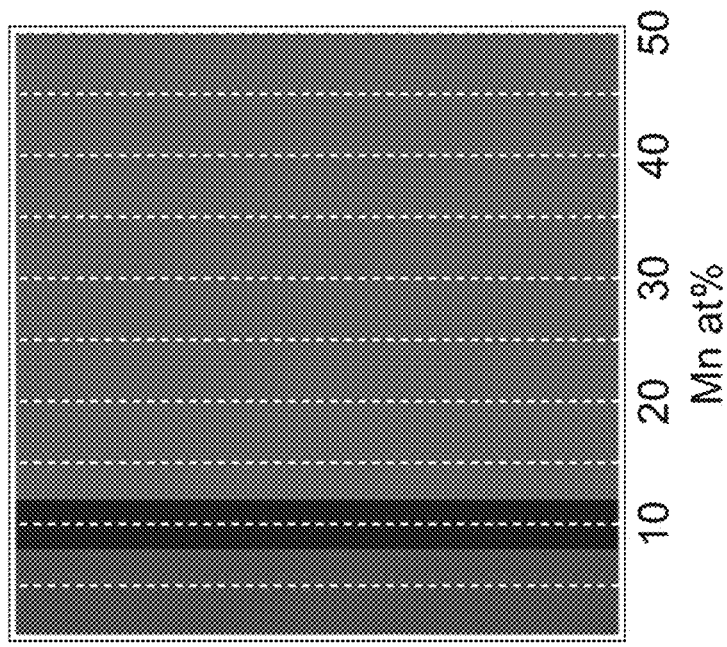

Alternatively or in combination the computer may generate and display or print the visual atlas, as in FIGS. 9A-9B, so that the user is able to select the metallic binder material from among the binary metal compositions and the ternary metal compositions falling within the colored or shaded areas of diagrams in the first subset of the plurality of diagrams and the second subset of the plurality of diagrams, respectively, that correspond to the compositional ranges of metal element combinations that yield compositions that meet all the screening parameter requirements.

The computer may also generate and display or print the visual parameter maps, as in FIGS. 5A-8C, so that the user is able to visually identify binary metal compositions and ternary metal compositions that have values for the depicted parameter that fall within a predetermined range of acceptable values for the depicted parameter for potential candidate compositions for the metallic binder material. The parameter depicted by the parameter map may be selected from group consisting of the contact angle with the second phase, the surface tension, the viscosity, the capillary metric, and the melting point.

In another embodiment herein (FIG. 21), the composition comprising the second phase in the binder matrix of a metallic binder also includes a beneficial, supplementary metal carbide, also sometimes referred to as a metal carbide additive, that is a carbide of a metal element. The metal carbide additive is different from the second phase, and the step of selecting (120) the metallic binder material from the first set of screened potential materials comprises selecting (244) the metallic binder material such that the metallic binder material includes the metal element of the metal carbide additive. In some examples, the liquid binder may contain an amount of carbon. In some other examples, the mixture formed at least in part from the second phase and the liquid binder, which is being processed according to some embodiments of the method herein to form the composition comprising the second phase in the binder matrix of the metallic binder, contains an amount of carbon either from adding free carbon or from the second phase if it is a carbide. At least some of the carbon together form an amount of the metal carbide additive such that addition of the metal carbide additive as a separate component is not required.

In some embodiments, the second phase is a ceramic and the supplementary metal carbide formed, which is categorized as a beneficial additive, is selected from the group consisting of vanadium carbide (VC), zirconium carbide (ZrC), and chrome carbide. In some examples, the second phase is tungsten carbide (WC). Some further examples further comprise the step of providing (246) free carbon as a component of a mixture including the second phase and the metallic binder material.

In an example, an embodiment herein is applied to finding a replacement for cobalt as the binder for tungsten carbide particles that is non-toxic. Furthermore, the embodiments described herein are also extendable and applicable to the design of other cermet systems.

Aspects concerning the embodiments herein are also included in the paper by the inventors Heather A. Murdoch and Kristopher A. Darling, titled "Metric mapping: A color coded atlas for guiding rapid development of novel cermets and its application to "green" WC binder," Materials and Design 150 (2018) 64-74, and which is incorporated by reference herein in its entirety including all references cited therein.

1. Design of Binder

Figure 2:
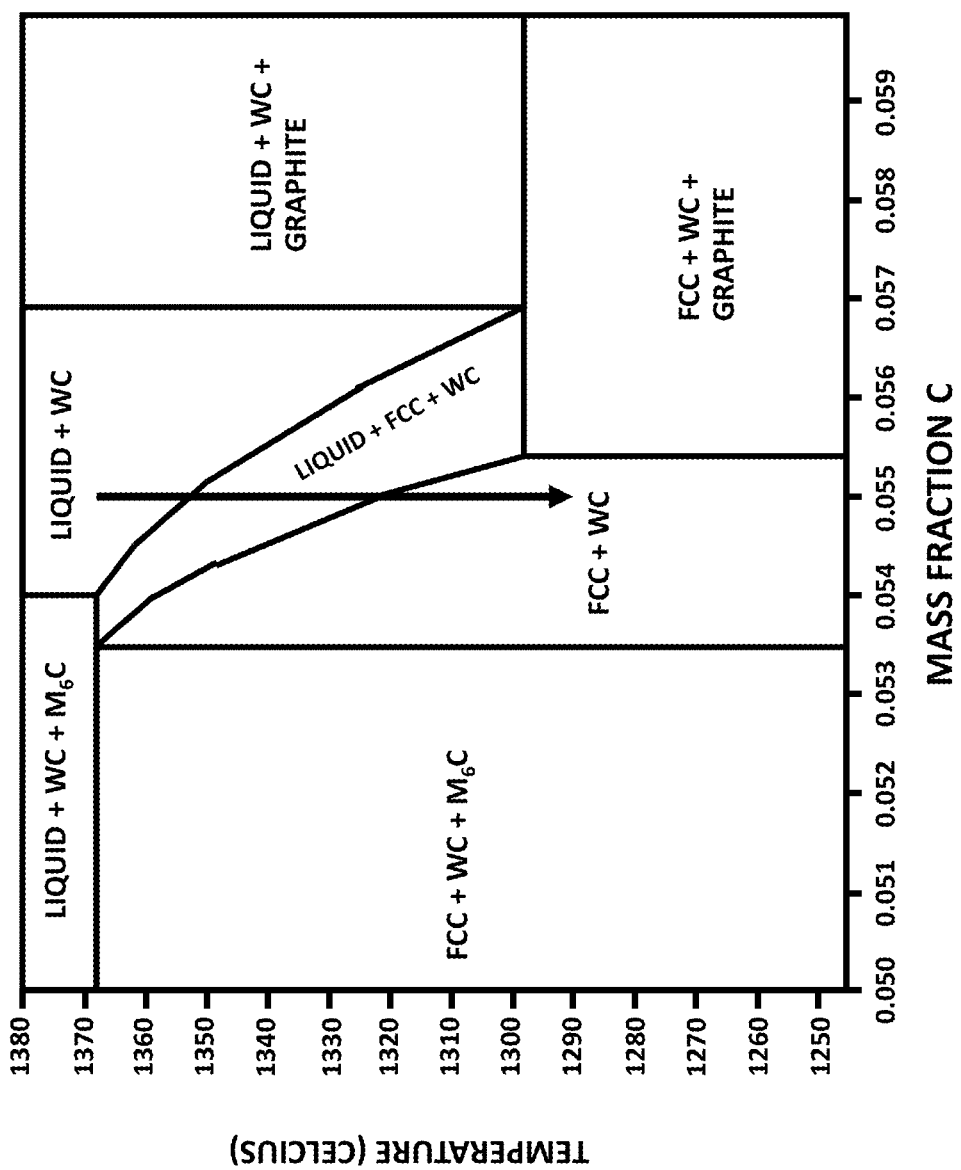
FIG. 2 is a pseudo-binary phase diagram for a WC/binder system showing the acceptable carbon region for solidification of binder while avoiding deleterious carbide phases.

In addition to the property demands of the cermet part, the selection criteria for a suitable binder (either pure metal or alloy) must meet several practical industrial criteria for processing parts, which are: (1) reasonably low melting (and therefore processing) temperature, (2) good wettability of the liquid metal binder on the ceramic particles, and (3) a compositional range (e.g. carbon range) within which the liquid solidifies to solid phase without precipitating additional phases—often additional metal carbides that are deleterious to the mechanical properties (see FIG. 2). The thermodynamic calculations to predict the available carbon range can also describe the solubility of tungsten (W) and carbon (C) in the liquid binder and the precipitation reactions which may occur.

However, the detailed thermodynamic modeling to determine and model the carbon range within which the liquid solidifies to solid phase without precipitating deleterious phases is very computationally intensive and requires a robust thermodynamic database and a restricted/reduced scope in terms of compositional variation and binder content, as it is often modeling up to a five component system. In play are both the composition of the binder and the ratio of ceramic phase to metal binder. For example, in the experimentally explored Iron-Manganese (Fe—Mn) binder system, the range in which no carbide formation occurs may or may not exist depending on the ratio of ceramic to binder: a non-systematic experimental approach found a carbon addition that avoided carbide formation for 15 and 25% binder using Fe-13.5 wt % Mn [10] whereas, in a 20% binder system with Fe-22 mass % Mn, thermodynamic modeling and experiment found no natural carbon window [21]. This brief example demonstrates that a thorough survey of both binder composition and binder ratio is necessary to identify viable cermet systems in terms of the multi-component phase diagram; however, such a survey is prohibitively time consuming given the extensive design space.

In addition to being computationally intensive, thermodynamic calculations of the WC/binder interactions neglect the other two criteria which currently bolster the use of cobalt (Co) as a binder. First, the wetting behavior of the liquid binder on the cermet is often reported as a defining characteristic of cobalt binder due to its perfect wetting on WC. Very few studies have looked at wetting of WC with alternative metals; copper (Cu) does not wet WC well [22] but iron and nickel wet WC well in both liquid [23, 24] and solid state [25]. Secondly, successful liquid phase sintering requires complete melting of the binder phase which should then flow around the ceramic particles.

While the melting/processing temperature is one of the current practical criteria, consideration of this flow seems to have been neglected to date. The interconnected porosity between the ceramic particles 100 forms a series of narrow, continuously branching, capillaries with small diameters (see FIG. 1) which meander along tortuous paths though the bulk of the material. The uniform infiltration of these capillary spaces by the liquid metal binder in order to properly bind them is essential for a fully dense part and may be straightforwardly described by the viscosity and capillarity of the liquid binder system. A classical metric for infiltration of liquids in a capillary [26] is $$\frac{\gamma \cos \theta}{2\eta},$$

referred to herein as the capillary metric, where γ is the surface tension, η viscosity, and θ the contact angle; the higher the value, the faster the rate of permeation. [26] E. W. Washburn, The dynamics of capillary flow, Phys. Rev. 17 (1921) 273-283, is incorporated herein by reference in its entirety.

Viscosity and capillarity are therefore added to the list of practical criteria, in addition to wetting and melting temperature. These four key parameters are significantly faster and easier to calculate than the traditional thermodynamic considerations. While the melting temperature of the binder also requires thermodynamic models, it is far more easily calculated than the carbon range as it does not require knowledge of the phase stability of, and with, W and C. These criteria establish a rapid screening process for novel binder alloys in liquid phase sintered cermets that also has the benefit of being binder/ceramic ratio independent, cutting down on the available composition space of the binder first, before tackling the ratio design space. Such a method would dramatically accelerate scientific discovery and reduce the time for transition.

2. New Criteria

The ability to design a liquid metal alloy for cermet systems requires taking into account a series of complex physical phenomena including surface tensions, cohesion energy, viscosity, heats of formation, and the dependency of these parameters on composition and temperature. While the current/traditional binder(s) are mono-elemental, it is likely that next generation binders will need to be multi-component systems. Alloy chemistry is known to dramatically alter aspects of the required figures of merit, and the alloy identification process is compounded by the sheer number of potential interactions in binary, ternary and higher order systems comprising modern-day alloys. The models and materials data used to undertake this problem are as follows.

2.1. Wetting

The contact angle, θ, can be found through a relation of the interfacial energies of the solid/vapor, solid/liquid, and liquid/vapor via Young's equation:

$$\sigma_{SV}=\sigma_{SL}+\sigma_{LV}\cos\theta \quad (1)$$

In a cermet system, here focusing on WC, the relation is below:

$$\sigma_{WC/V}=\sigma_{WC/lB}+\sigma_{lB/V}\cos\theta \quad (2)$$

The surface energy of the tungsten carbide (WC) (or other ceramic) has been both experimentally measured and modeled [27]. Here we use the equation from [27] G. Kaptay, Modelling interfacial energies in metallic systems, Materials Science Forum, Trans Tech Publ. 2005, pp. 1-10, which is incorporated herein by reference in its entirety; the terms and necessary values for WC are shown in Tables 1 and 2:

$$\sigma_{WC/V} = \sigma_{sM/g,298K}\left(\frac{V_{sM,298K}}{V_{sMC,298K}}\right) \times \left(1 - \frac{\Delta_f H_{MC,298K}}{\Delta U_{sM,298K}}\right) - \frac{2(T-298) + \alpha_s \int_{298}^{T}\frac{c_{p,MC}}{2}dT}{f_s \times V_{sMC}^{1/3} \times N_{av}^{1/3}} \quad (3)$$

The surface energy of the solid/liquid interface [27], in this case the WC/liquid metal binder, is:

$$\sigma_{WC/lB} = \frac{0.310 f_M^{\frac{1}{3}}\frac{(\Delta mH_M + \Delta mH_C)}{2} + \frac{0343}{2}(\Omega_{lM-lB} + \Omega_{lC-lB-\Delta_f H_{MC}}) + 3.3T}{0.794 \times V_{sMC}^{\frac{1}{3}} \times V_{lB}^{\frac{1}{3}} \times N_{av}^{\frac{1}{3}}} \quad (4)$$

where the terms and the property values are again shown in Tables 1 and 2 and the coefficients are semi-empirical and are described in the derivation in reference [27].

TABLE 1

Terms used for Eqs. (3) and (4).

| | |
|---|---|
| $\sigma_{sM/g}$ | surface tension of solid W |
| $f_s$ | surface packing factor |
| $f_m$ | bulk packing factor of the metal in the carbide, e.g. W in WC |
| $V_{sM}$ | volume of metal in carbide, e.g. W |
| $V_{sMC}$ | volume of carbide |
| $V_{lB}$ | volume of liquid binder |
| $\Delta U_{sM}$ | cohesion energy of W $\Delta U_{sM, 298K} = -qRT_m - \Delta_m H_M - \int_T^{T_m} C_{p, MC} dT$ |
| $T_m$ | melting temperature W |
| $\Delta_f H_{MC}$ | heat of formation of carbide |
| $\Delta_m H_M$ | melting enthalpy of metal in carbide, e.g. W in WC |
| $\Delta_m H_C$ | melting enthalpy of carbon |
| $\alpha_s$ | ratio of broken bonds on the surface as compared to bulk |
| $C_{p, MC}$ | heat capacity of carbide |
| $\Omega_{lM-lB}$ | interaction parameter from heat of mixing of liquid metal in carbide (W) and binder liquid |
| $\Omega_{lC-lB}$ | interaction parameter from heat of mixing of carbon and binder liquid |
| $N_{av}$ | Avogadro's number |

TABLE 2

Values used for Eqs. (3) and (4).

| | |
|---|---|
| $\sigma_{sM/g}$ | $2.676-2.3*10^{-4}*(T-T_m)$ |
| $f_s$ | 1.1 |
| $f_m$ | 0.7 |
| $V_{sM}$ | $9.5501*10^{-6}$ |
| $V_{sMC}$ | $12.5545*10^{-6}$ |
| $V_{lB}$ | $V_{solid}$ (Table 3)/0.96 |
| $\Delta U_{sM}$ | q: 25.4 |
| $T_m$ | 3680K |
| $\Delta_f H_{MC}$ | −38000 J/mol |
| $\Delta_m H_M$ | 1.06*R*TmM (3680K) |
| $\Delta_m H_C$ | 1.06*R*TmC (4823K) |
| $\alpha_s$ | 0.2 |
| $C_{p, MC}$ | See Reeber [45] |
| $\Omega_{lM-lB}$ | See Table 3; −57700 + 22.8*T |
| $\Omega_{lC-lB}$ | See Table 3; −107940.6 + 24.956*T |
| $N_{av}$ | $6.02*10^{23}$ |

The surface tension of the binder liquid for pure metals generally follows the form eq. (5) [28] where $T_m$ is the melting temperature of the metal and $\sigma_{lB}(@T_m)$ and $\sigma_{lB}^0$ are the temperature independent and dependent coefficients, respectively:

$$\sigma_{lB}(@T)=\sigma_{lB}(@T_m)+\sigma_{lB}^0(T-T_m) \quad (5)$$

Accordingly, $\sigma_{lB}(@T)$ is the surface tension of the liquid binder at temperature T and $\sigma_{lB}(@T_m)$ is the surface tension of the liquid binder at its melting temperature $T_m$. The necessary materials property values are in Table 3.

TABLE 3

Property table for pure elements

| | $\sigma_{lB}$(@$T_m$) mJ/m² [28] | $\sigma_{lB}{}^0$ mJ/m² [28] | $T_m$ [K] [28] | $H_{vap}$ kJ/mol [28] | Vol [48] |
|---|---|---|---|---|---|
| Al | 1031 | 0.19 | 933 | 283 | 11.31 |
| Co | 1779 | 0.3 | 1768 | 375 | 7.59 |
| Cr | 1582 | 0.19 | 2180 | 339 | 8.27 |
| Cu | 1352 | 0.21 | 1358 | 300 | 7.943 |
| Fe | 1650 | 0.26 | 1811 | 355 | 7.94 |
| Mn | 986 | 0.21 | 1519 | 226 | 9.54 |
| Mo | 2110 | 0.21 | 2896 | 600 | 10.3 |
| Nb | 2335 | 0.27 | 2750 | 690 | 11.9 |
| Ni | 1810 | 0.33 | 1728 | 378 | 7.425 |
| Ta | 2467 | 0.22 | 3290 | 735 | 12.1 |
| Ti | 1520 | 0.27 | 1941 | 425 | 11.6 |
| V | 1902 | 0.23 | 2175 | 453 | 9.5 |
| W | 2676 | 0.23 | 3680 | 800 | 10.4 |
| Zr | 1669 | 0.14 | 2128 | 580 | 16 |

| | $\Omega_{IM-IB}$ J/mol | $\Omega_{IC-IB}$ J/mol | $\eta$ mPa·s [49] |
|---|---|---|---|
| Al | −37130.7 [50] | 6038 [47] | 1.38 |
| Co | −17389.6 [46] | −63818.4 [47] | 5.4 |
| Cr | 5000 [51] | −132974 [52] | 5.7 |
| Cu | 80000 [36] | 26385.1 [53] | 4.38 |
| Fe | 6625.15 [14] | −70584.9 [14] | 5.6 |
| Mn | 23000 [36] | −109257 [54] | 5 |
| Mo | −1000 [36] | −93933.3 [55] | 5.6 [56] |
| Nb | −34000 [36] | −200905 [57] | 4.5 |
| Ni | −1422 [14] | −50371.2 [14] | 4.7 |
| Ta | −49567.4 [51] | −197055 [58] | 8.6 |
| Ti | 36640.5 [59] | −211589 [57] | 4.42 [60] |
| V | −3000 [36] | −184897 [55] | 4.32 [61] |
| W | | | 7.0 |
| Zr | −36000 [62] | −264194 [63] | 4.74 [60] |

The addition of alloying elements will alter the surface tension of the liquid binder, $\sigma_{lB}$, and by extension the wetting behavior. The binder alloy surface tension can be modeled by solving the system of equations by Butler [29] where subscripts A and B are the alloying elements and superscripts S and B are the surface and bulk layers respectively:

$$\sigma_{lB-alloyAB} = \sigma_A + \frac{RT}{S_A}\ln\left(\frac{1-c_B^S}{1-c_B^B}\right) + \frac{1}{S_A}\{\Delta G_A^S - \Delta G_A^B\} = \sigma_B + \frac{RT}{S_B}\ln\left(\frac{c_B^S}{c_B^B}\right) + \frac{1}{S_B}\{\Delta G_B^S - \Delta G_B^B\} \quad (6)$$

where S is the surface area of a monolayer of pure liquid (calculated from molar volume as in [30]), c is the mole fraction of the alloying element in either the surface or bulk phase and the ΔG terms are partial excess free energy. An extension to ternary binary alloys simply entails the inclusion and simultaneous solving of a third equation with element C, e.g. [31]. The Butler model has shown good/excellent agreement with experiment in a variety of liquid metal systems, including iron based binaries [30] and lead free solder ternaries [31]. Qualitative agreement also exists with limited available experimental data for binary iron alloys in narrow composition ranges, e.g. lowering of surface tension in Fe—Al, Fe—Cu, and Fe—Mn [32].

2.2. Viscosity

Viscosity changes as a function of alloying can be calculated using the Kozlov-Romanov-Petrov equation [33], chosen from a comparison of several alloy models [34, 35] due to its accuracy (w.r.t. experimental data) and ease of obtaining necessary materials properties:

$$\mathrm{Ln}[\eta] = \sum_{i=1}^{n} x_i \mathrm{Ln}[\eta_i] - \frac{\Delta H}{3RT} \quad (7)$$

Viscosity, η, as a function of composition, x, and enthalpy of mixing, ΔH. Enthalpies of mixing are calculated using the Miedema model [36] and are in J/mol as listed in Table 4. Other sources of enthalpies exist (e.g. CALPHAD [37]), but this is the highest throughput method. Pure component viscosities are in Table 3 and are taken at the melting temperature for use in Eq. (7); if an alloy proves interesting, a more thorough calculation can be done with viscosity as a function of temperature as the melting temperature changes with alloying element composition.

TABLE 4

Enthalpy of mixing of liquid Fe binary alloys

| Fe—X | Miedema $\Delta H^{int}$ [kJ/mol] |
|---|---|
| Al | −91 |
| Cr | −6 |
| Cu | 50 |
| Mn | 1 |
| Mo | −9 |
| Nb | −70 |
| Ni | −6 |
| Ta | −67 |
| Ti | −74 |
| V | −29 |
| Zr | −118 |

2.3. Capillary Metric

If we consider the liquid binder movement through/between WC or other ceramic particles as a capillary system, the infiltration or capillary metric, $$\frac{\gamma \cos\theta}{2\eta}$$

[26] can provide a brief description of this flow. A prospective binder system that may not have perfect wetting on the ceramic may have a viscosity low enough to counter this drawback and have comparable or better flow to a perfect wetting binder with higher viscosity. The surface tension, γ, contact angle, θ, and viscosity, η, as a function of alloying content are calculated from the preceding equations.

2.4. Thermodynamics

The first three of the four values above—contact angle or surface tension, viscosity, and capillary metric—can be rapidly calculated given readily available literature data, much of which is now tabulated herein. Inherent in the preceding treatment of the binder alloy is that the binder is completely liquid phase; therefore, the effect of alloying elements on the melting point must also be quantified. From a processing standpoint, elements that form eutectics with significant melting point depressions would enable processing at lower temperatures (with lower energy costs). The estimation of melting temperature as a function of composition requires free energy equations for the possible phases in the system which is mostly readily available through CALPHAD-style modeling [37]. In this work, the Thermo- Calc TC-Toolbox for Matlab was used to rapidly iterate through binder compositions and systems and calculate the melting temperature variations.

Calculating the acceptable carbon range (to avoid deleterious carbide phases) for the binder-WC system is the most computationally intensive criteria for a new binder system, as including the W and C in addition to the binder elements dramatically increases the number of possible phases and conditions. It should also be noted that the solubility and diffusion of W and C with respect to the liquid binder are an important components to successful cermet densification. Similar to calculation of the carbon range, the evaluation of these properties requires a robust thermodynamic database or extensive experimental evaluation. The solubility of tungsten in several liquid iron systems was found to be on the same order as solubility in cobalt [38], thus we may consider the solubility conditions after the primary screening parameters.

The previous four criteria above (contact angle or surface tension, viscosity, capillary metric, and melting temperature) are used to screen for both possible binder systems and for optimum composition ranges within those systems in order to significantly decrease the design space for the detailed thermodynamic calculations such as solubility and carbon range. A pseudo-binary phase diagram represents the region in which liquid binder and WC solidify into solid solution binder and WC, surrounded by deleterious phases, such as the $M_6C$ carbide or graphite; for an example, see FIG. 2. The calculation of such diagrams is part of the secondary screening approach that considers the liquid binder interaction with W and C, while the primary screening focuses on the selection of the binder alloy.

The combined criteria provide a systematic approach by which the complex binder alloy problem can be reduced to a series of visual color coded maps which take into consideration ternary alloy effects on wetting, melting, viscosity and capillary filling. Collectively the maps guide the development of an environmentally friendly Fe based binders for replacing Co in conventional WC—Co cermets by identifying effective compositional ranges over 66 ternary alloy combinations.

3. Results

We first illustrate the model with mono-component binder options and then move onto alloy systems, working through the criteria of (1) wetting, (2) viscosity, (3) capillary, and (4) melting temperature.

3.1. Single Component Binder Systems

The standard WC cermet system includes a cobalt binder: it evinces perfect wetting—both from calculations, e.g. Eqs. (3) through (6) in the methods, and experimentally; however, calculated contact angles for many metals are also ~0 as seen in FIG. 3A, including Al, Cr, Fe, Hf, Mn, Nb, Ni, Ti, V, and Zr. The commonly tried alternative binders Fe and Ni both are calculated to have perfect wetting, born out by experiment [23, 24]. Copper has a high contact angle of the liquid metals on WC of ~30°, which matches well with experimental observations [22].

Figure 3B:
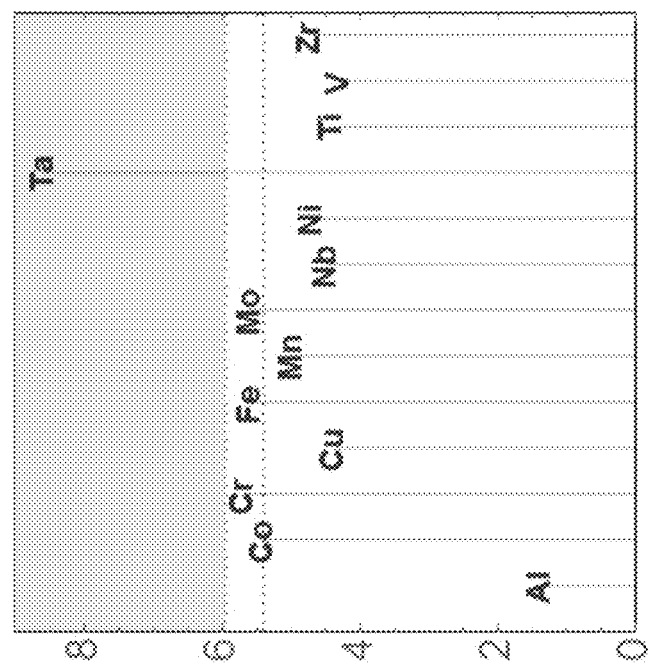
FIG. 3B shows a graph of the viscosity for single elements proposed as binders in a WC cermet. The upper horizontal dashed line indicates cutoff values for consideration as replacement binder. The lower horizontal dashed line is the value of cobalt (existing binder).
Figure 3A:
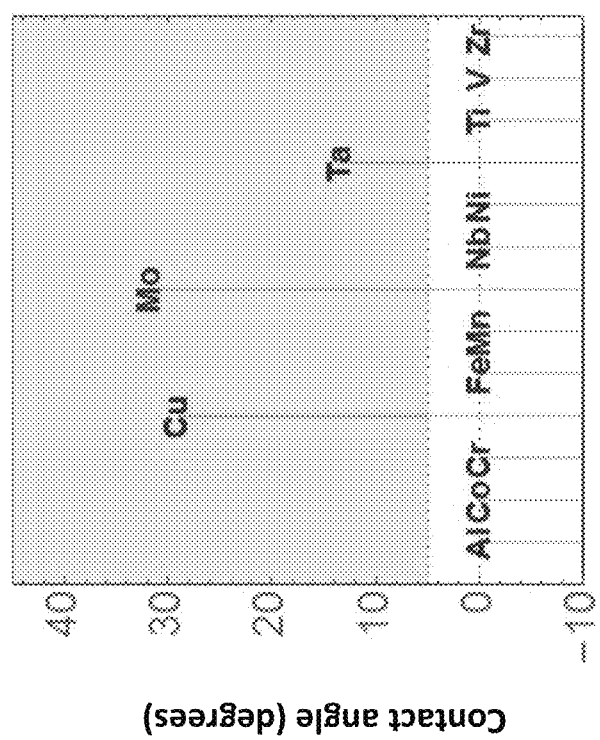
FIG. 3A shows a graph of the contact angle on WC for single elements proposed as binders in a WC cermet. The upper horizontal dashed line indicates cutoff values for consideration as replacement binder. The lower horizontal dashed line is the value of cobalt (existing binder).
Figure 3D:
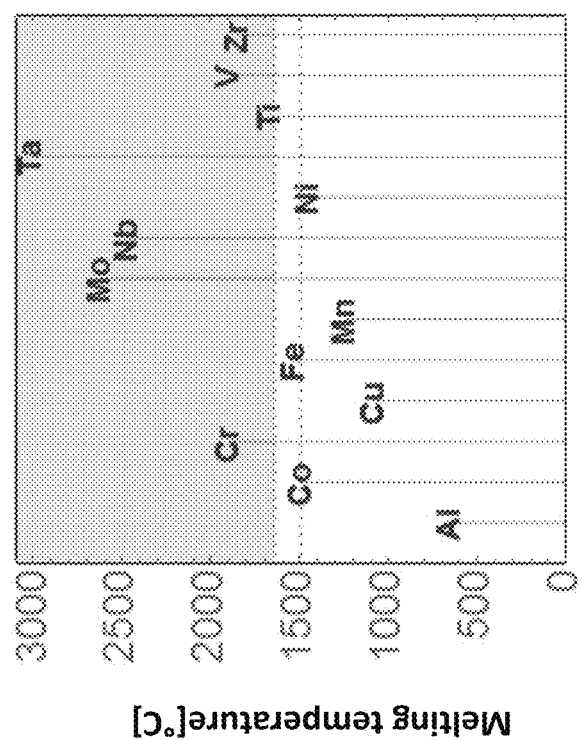
FIG. 3D shows a graph of the melting temperature for single elements proposed as binders in a WC cermet. The upper horizontal dashed line indicates cutoff values for consideration as replacement binder. The lower horizontal dashed line is the value of cobalt (existing binder).
Figure 3C:
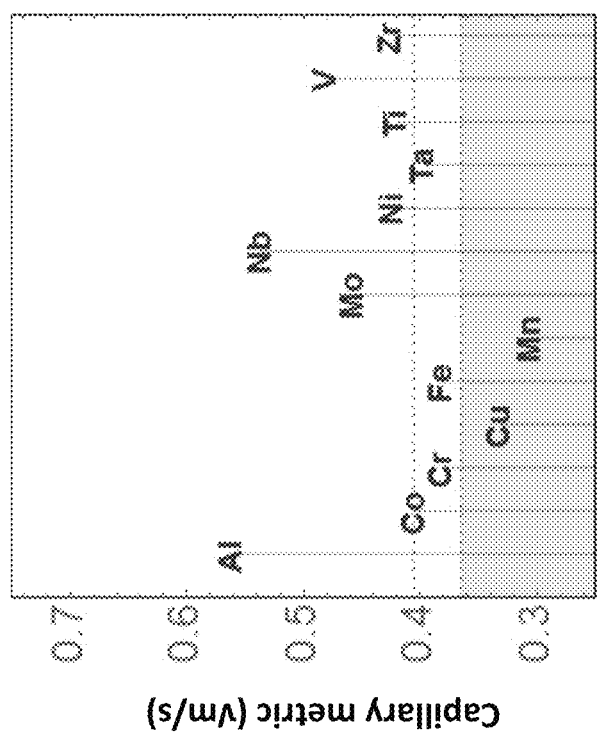
FIG. 3C shows a graph of the capillary metric for single elements proposed as binders in a WC cermet. The lower horizontal dashed line indicates cutoff values for consideration as replacement binder. The upper horizontal dashed line is the value of cobalt (existing binder).

The viscosity of pure metals at melting is plotted in FIG. 3B, followed by the capillary infiltration metric in FIG. 3C. The baseline value of cobalt is indicated by a black dotted line; values that are >10% inferior to the cobalt baseline are indicated with red dotted lines and the unfavorable region indicated in light red. In the case of viscosity or melting temperature, higher than 10% above the baseline cobalt is considered to not pass and in terms of the capillary metric, higher values indicate faster infiltration, so a number 10% lower than cobalt is the cutoff and excess of cobalt would be desirable. The traditional alternative binders such as Fe and Ni are within the acceptable range in both viscosity and capillary flow.

The wetting and capillary behaviors are calculated at the melting temperature of the pure metal—despite exhibiting attractive liquid metal behavior, the processing temperatures required for many binder candidates, such as V, are too high. FIG. 3D plots the melting temperatures of the pure liquid metal, again with the 10% deviation from cobalt indicated. Combing wetting, capillary, and melting temperature, only Al, Fe, and Ni are reasonable single component candidates for replacing cobalt. The down selection means we now only have to perform the multicomponent phase diagram/thermodynamic analysis on three systems instead of 12.

Figure 4B:
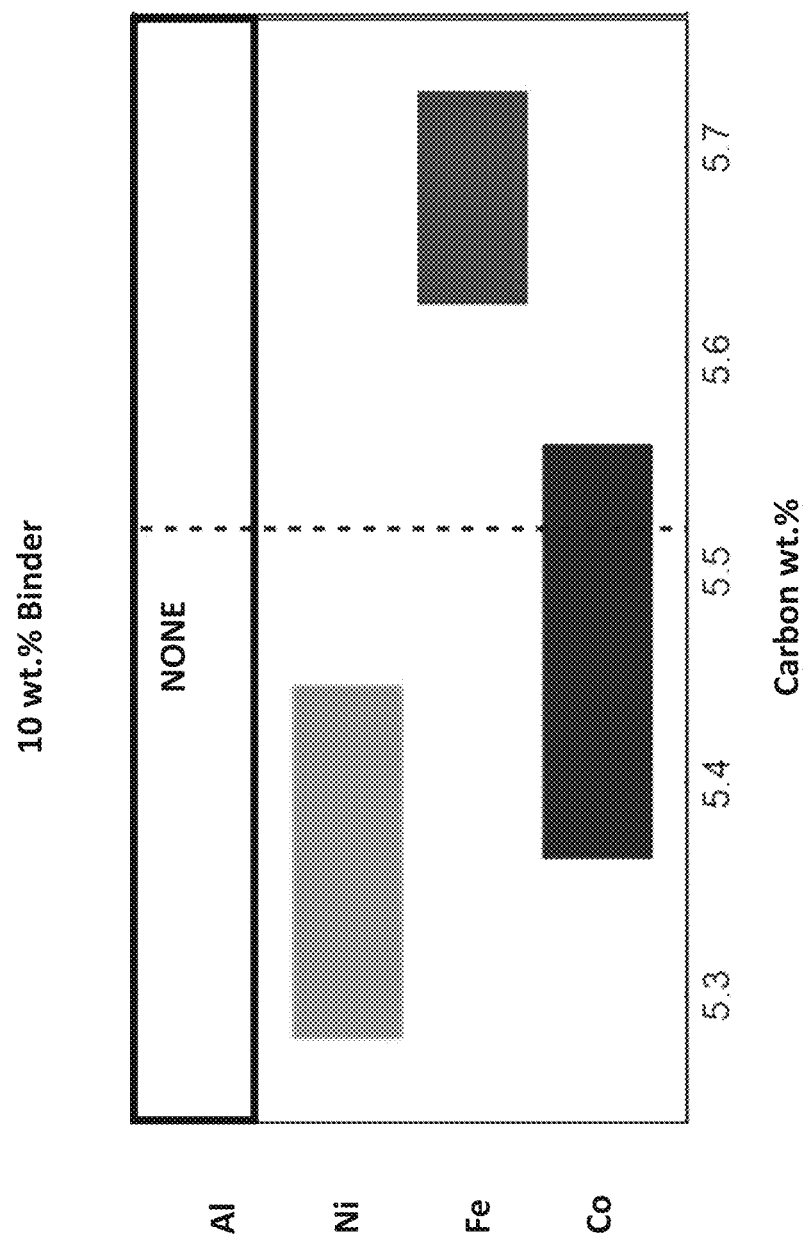
Figure 4C:
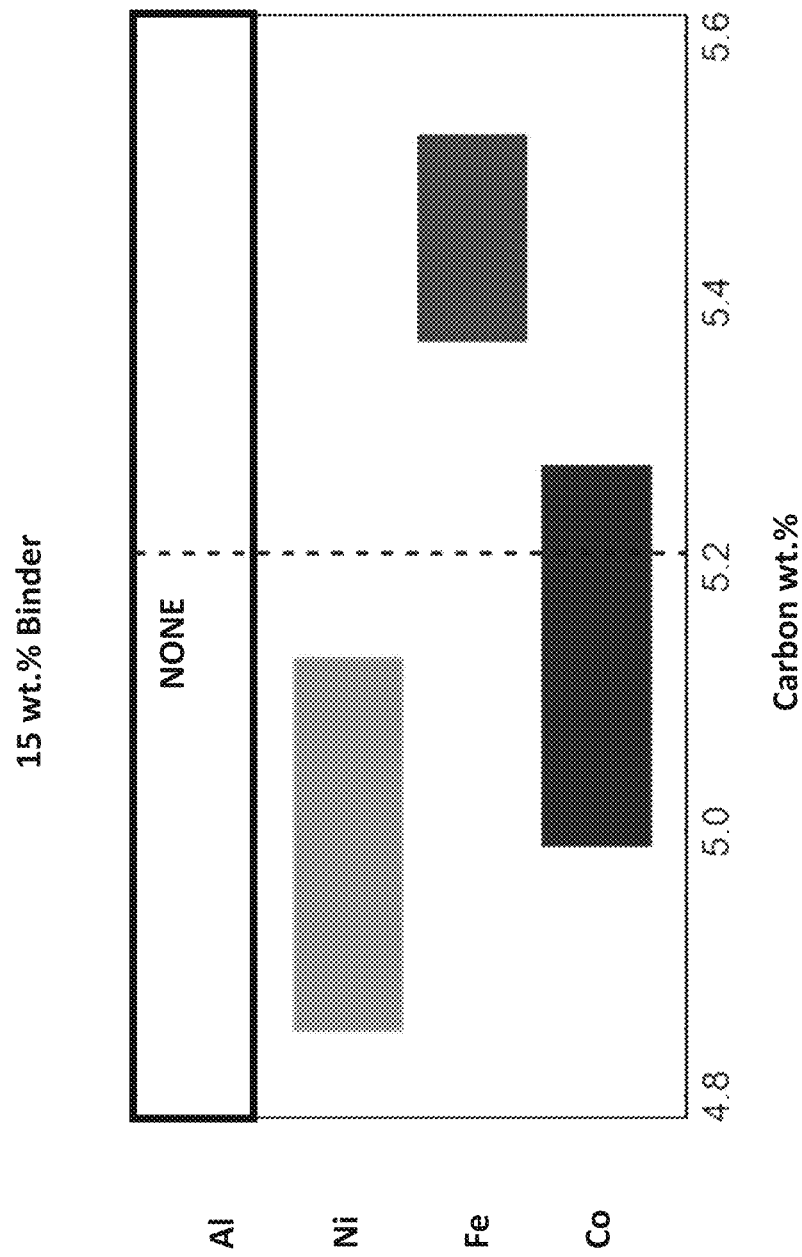
Figure 5A:
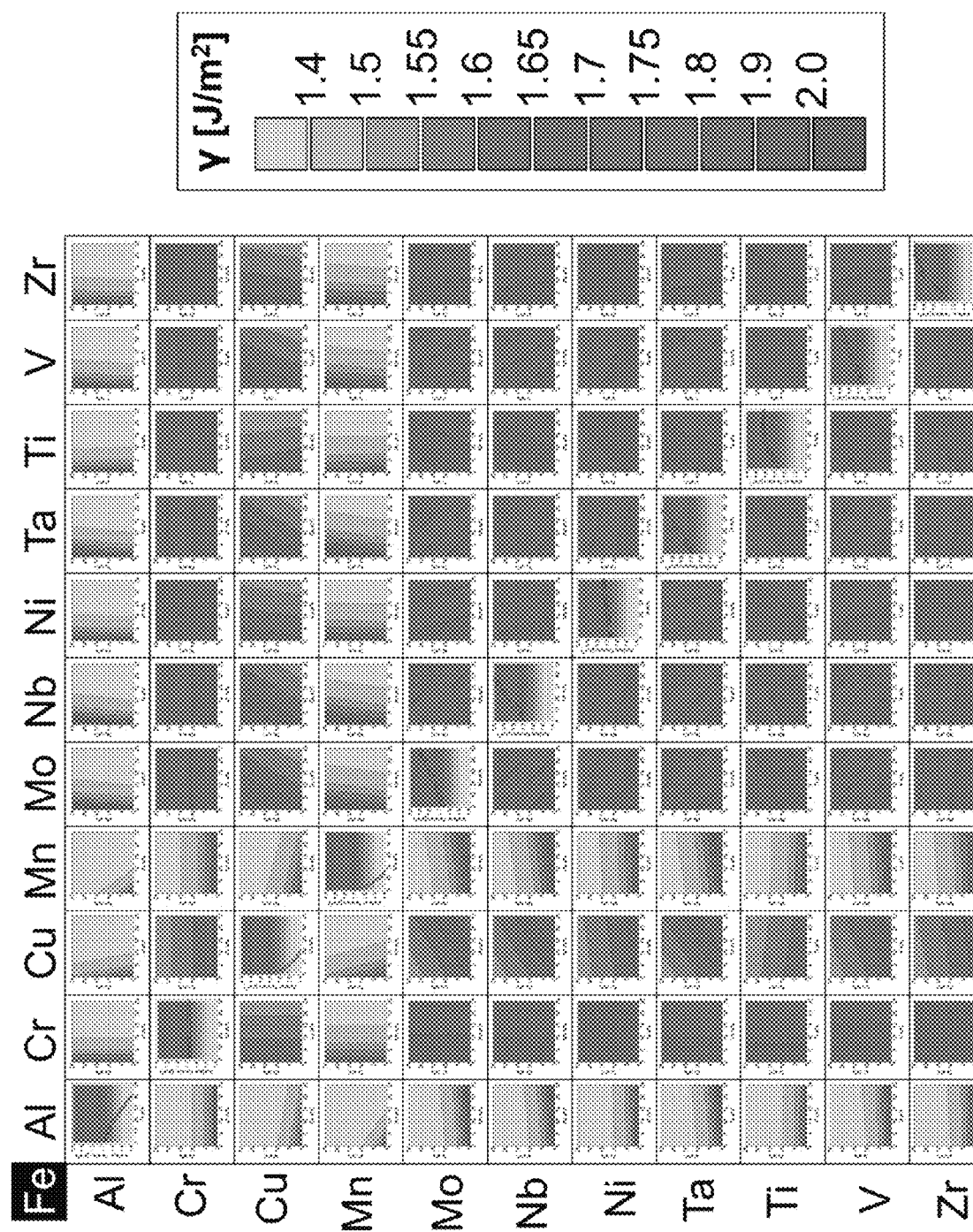
FIG. 5A shows the parameter map for surface tension as a function of alloying content for binary (up to 50 at. %) and ternary (up to 25% for both additions) iron alloys with the contours indicating values of surface tension.
Figure 5C:
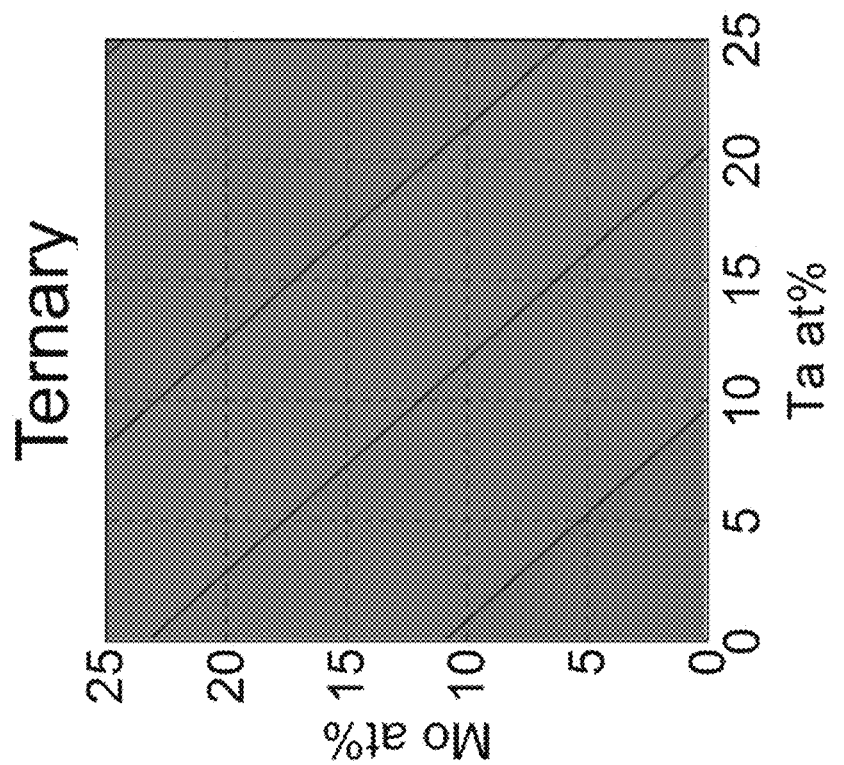
FIGS. 5B-5C show enlarged examples of the binary and ternary alloy plots shown in the parameter map of FIG. 5A.
Figure 5B:
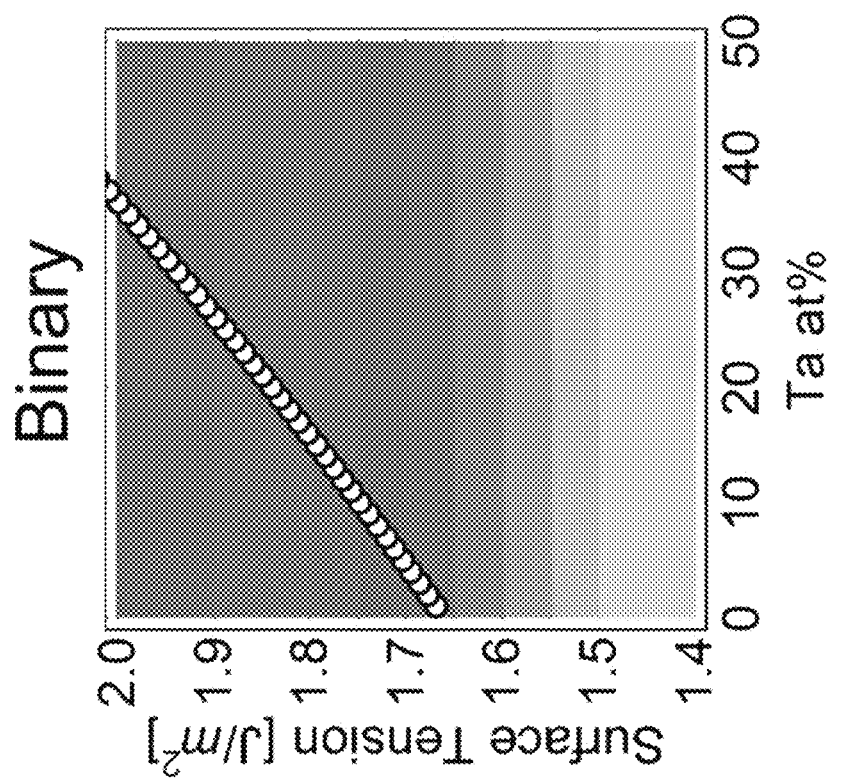

Continuing to thermodynamic modeling considerations, FIGS. 4A-4C show the carbon ranges for WC—Co, WC—Al, WC—Fe, and WC—Ni for several different common binder ratios (5, 10, and 15% binder to 95, 90, 85% WC by weight) calculated using Thermo-Calc. The carbon content existing in the system at the binder ratio is indicated by the dashed line; the carbon range in which binder solidification occurs without precipitation of carbides for cobalt encompasses this composition, meaning the WC—Co can be combined as is without altering the concentration of carbon in the total system. Of the three alternative single element systems, only Fe and Ni have a possible carbon window within which no deleterious carbides form—Al preferentially forms $Al_4C_3$ across a wide range of possible binder ratios. Comparing Fe and Ni, Fe would be preferred as it is easier to add free carbon to a system to reach the desired carbon window, whereas in nickel carbon must be removed from the system. Additions of free carbon can take the facile form of adding carbon black powder or pickup from graphite dies.

Alloying Fe with Ni was found to both shift the available carbon range towards the stoichiometric carbon concentration and widen the successful carbon range window [14-16], lowering the need for precise control of carbon contributions to the system. Since this alloying increases the number of interaction parameters required to model the system and is decidedly non-linear, it is indispensable to narrow the design space. Moving forward with iron-based alloys, we perform rapid screening on binary and ternary systems using the four defined criteria.

3.2. Iron Based Systems

All viscosity, contact angle, and capillary calculations are done at 1500° C. (approximately the melting temperature of cobalt, and the baseline processing temperature).

3.2.1. Wetting

As pure Fe perfectly wets WC, the objective here is to identify which alloying elements may increase the contact angle and in what composition range. In this case, only a few refractory metals used in large compositions increase the contact angle. As the contact angle of the iron alloys investigated here rarely deviates from zero degrees, FIGS. 5A-5C instead compile the plots of liquid metal surface tension for a range of binary and ternary iron based alloys. For ternary alloys, the X and Y axes are alloy composition up to 25 at. %. The colored contours indicate the surface tension as a function a composition. Where two alloys repeat (e.g. Fe—Al—Al) the inset plot is that of the binary system; the X axis is the alloy composition up to 50 at. % and the points represent the surface tension. The background of the binary plot is colored with the same legend as the ternary contour plots for ease of comparison. If the surface tension is above 1.97 $J/m^2$, the liquid metal no longer perfectly wets WC (for reference, the surface tension of cobalt is 1.779

[28]). Although copper as a pure elemental liquid has a much higher contact angle on WC (as seen in FIG. 3A and experimentally in [22]), it does not increase the contact angle when used as an alloying element in an iron alloy; in fact, the surface tension generally decreases with copper additions, as seen in the third row of FIG. 5A. Several alloying elements do raise the surface tension of the liquid metal alloy, but only in a few binary systems at concentrations above 30% —Nb, Ta, and Zr—does the surface tension exceed the value for perfect wetting on WC. As a result, this screening step only eliminates 1.7% of the current iron alloy design space.

3.2.2. Viscosity

Figure 6A:
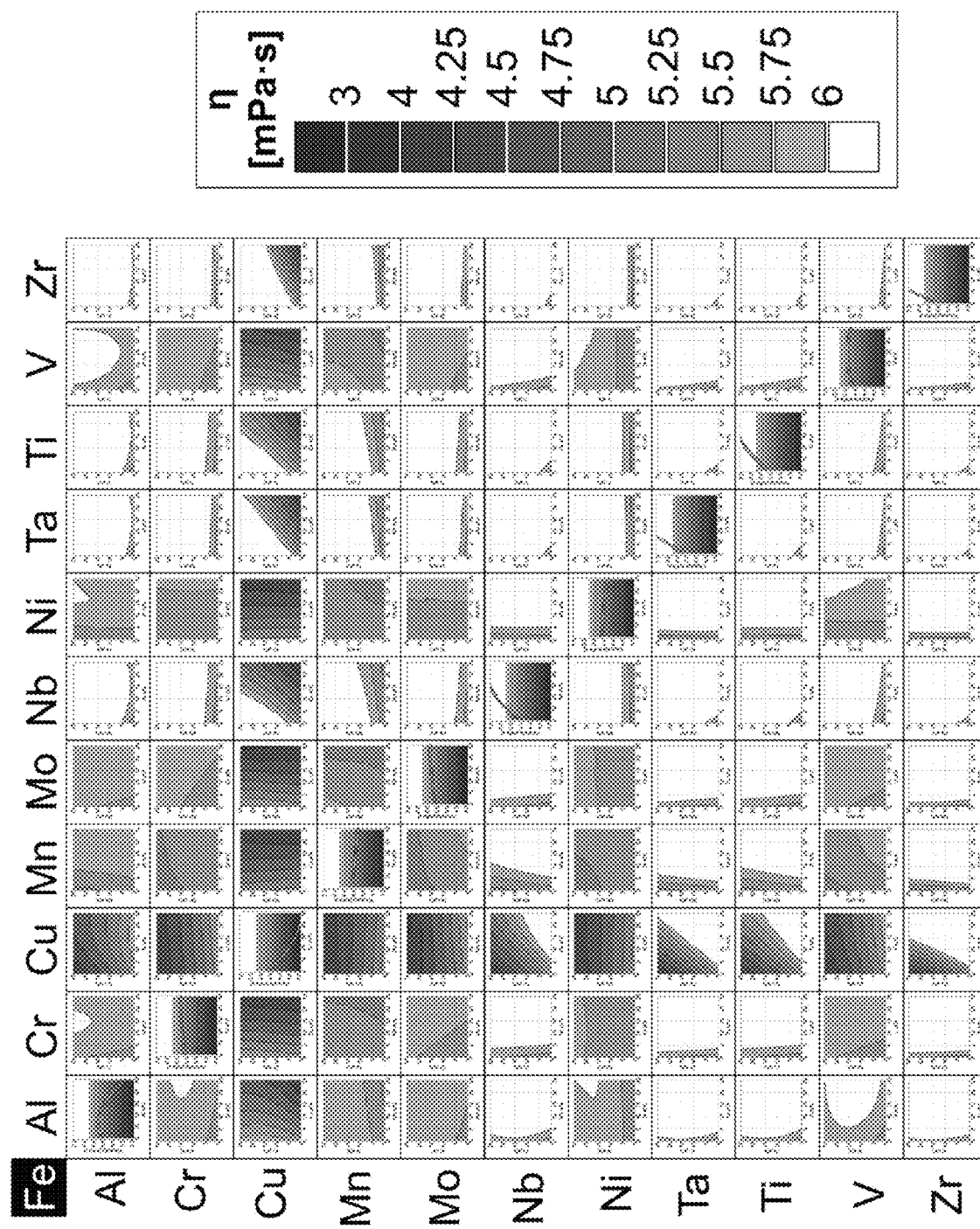
FIG. 6A shows the parameter map for viscosity as a function of alloying content for binary (up to 50 at. %) and ternary (up to 25% for both additions) iron alloys with the contours indicating values of viscosity.
Figure 6C:
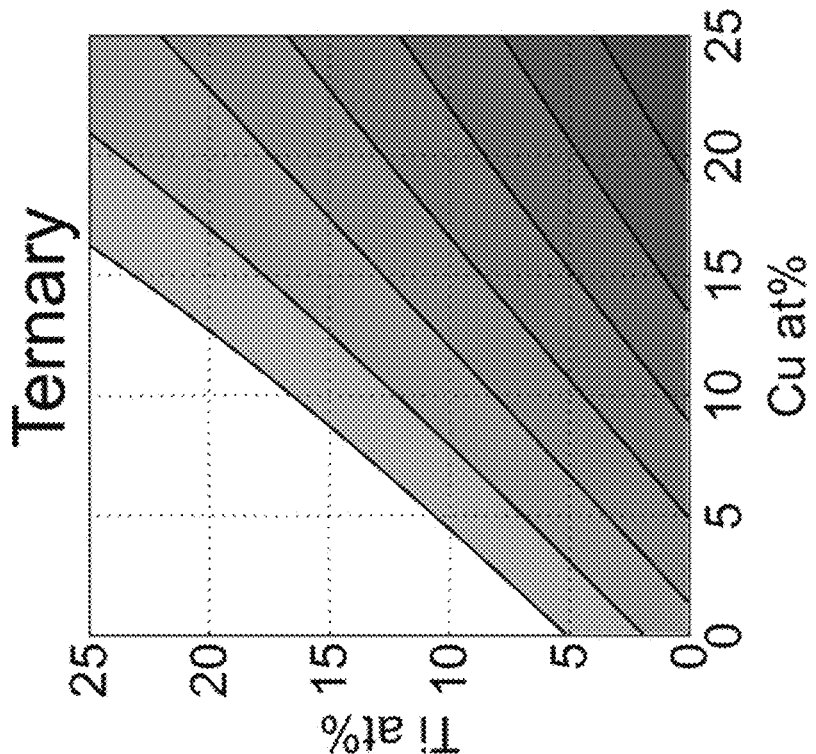
FIGS. 6B-6C show enlarged examples of the binary and ternary alloy plots shown in the parameter map of FIG. 6A.
Figure 6B:
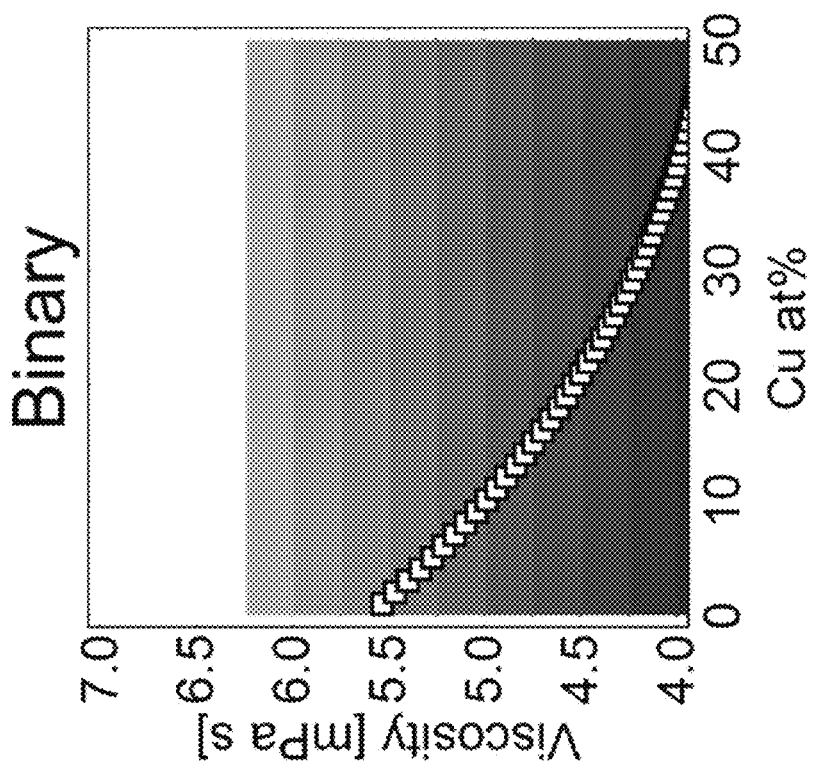
Figure 7A:
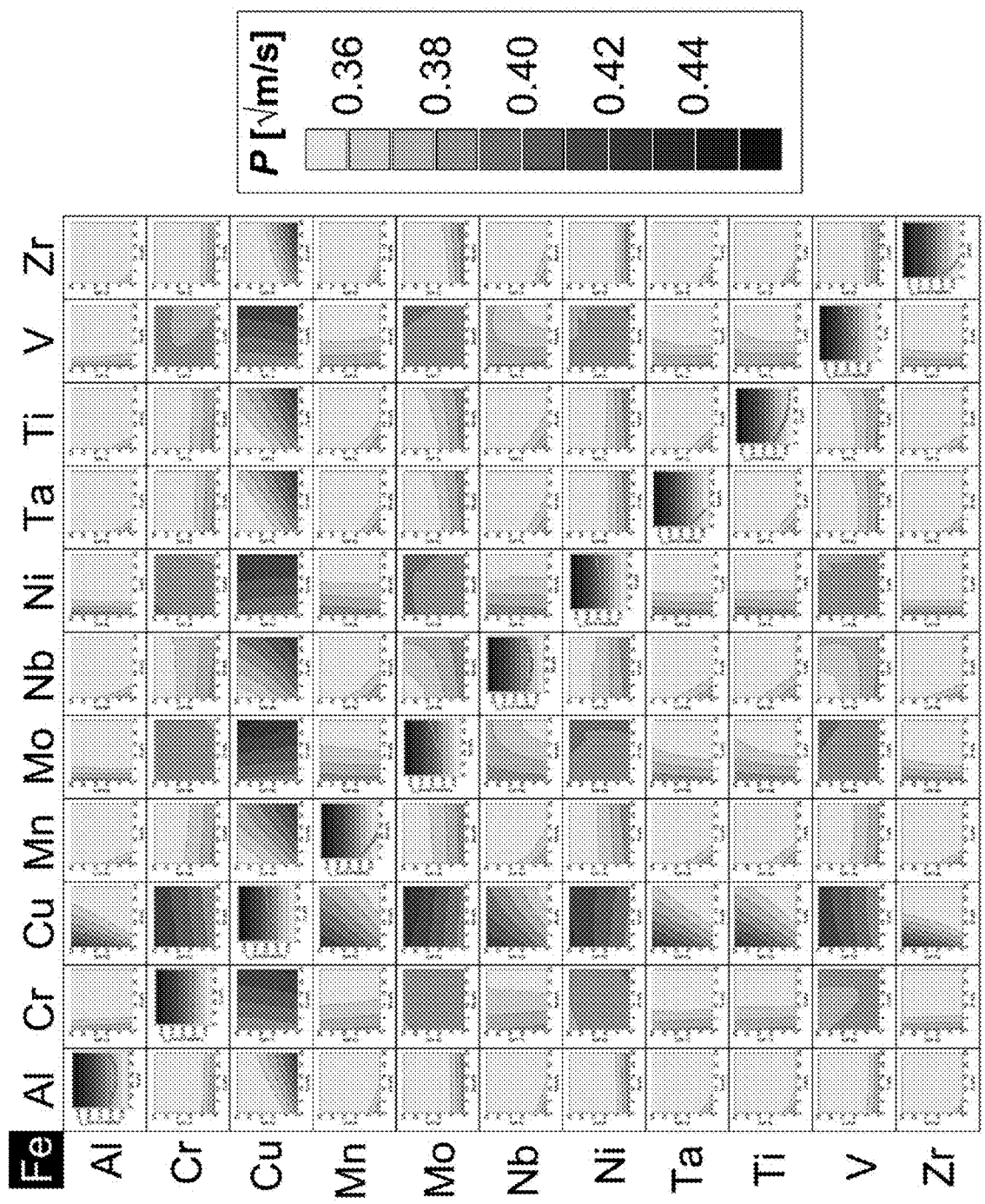
FIG. 7A shows the parameter map for the capillary metric as a function of alloying content for binary (up to 50 at. %) and ternary (up to 25% for both additions) iron alloys with the contours indicating values of the capillary metric.
Figure 7C:
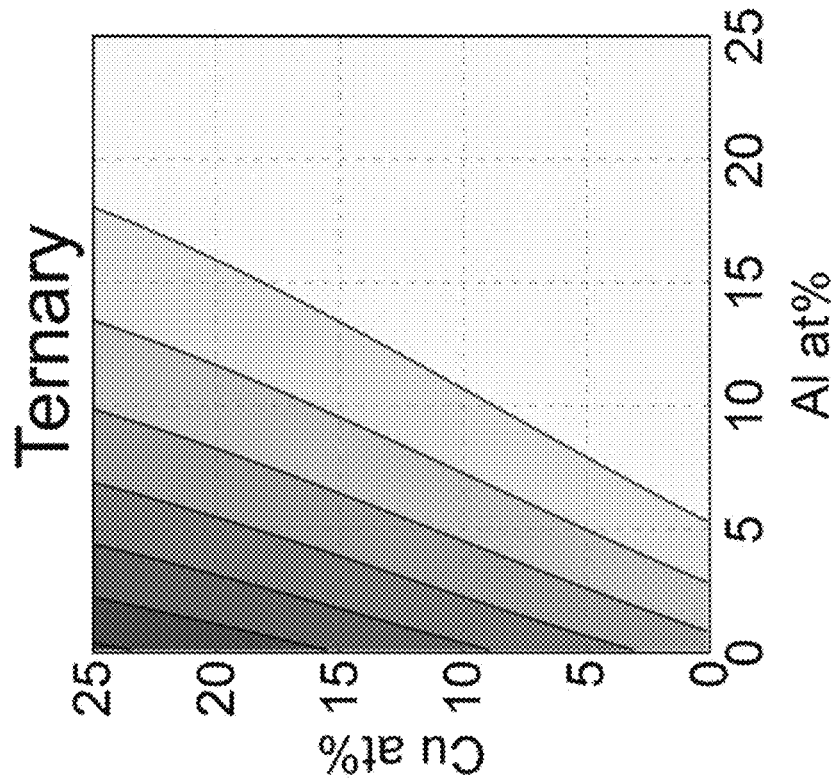
FIGS. 7B-7C show enlarged examples of the binary and ternary alloy plots shown in the parameter map of FIG. 7A.
Figure 7B:
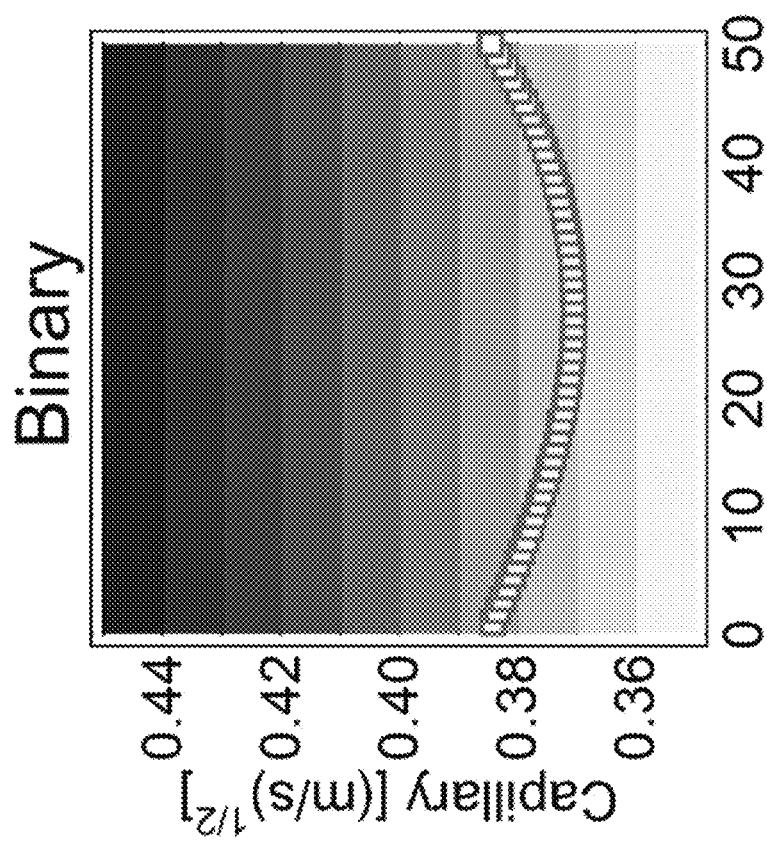
Figure 8A:
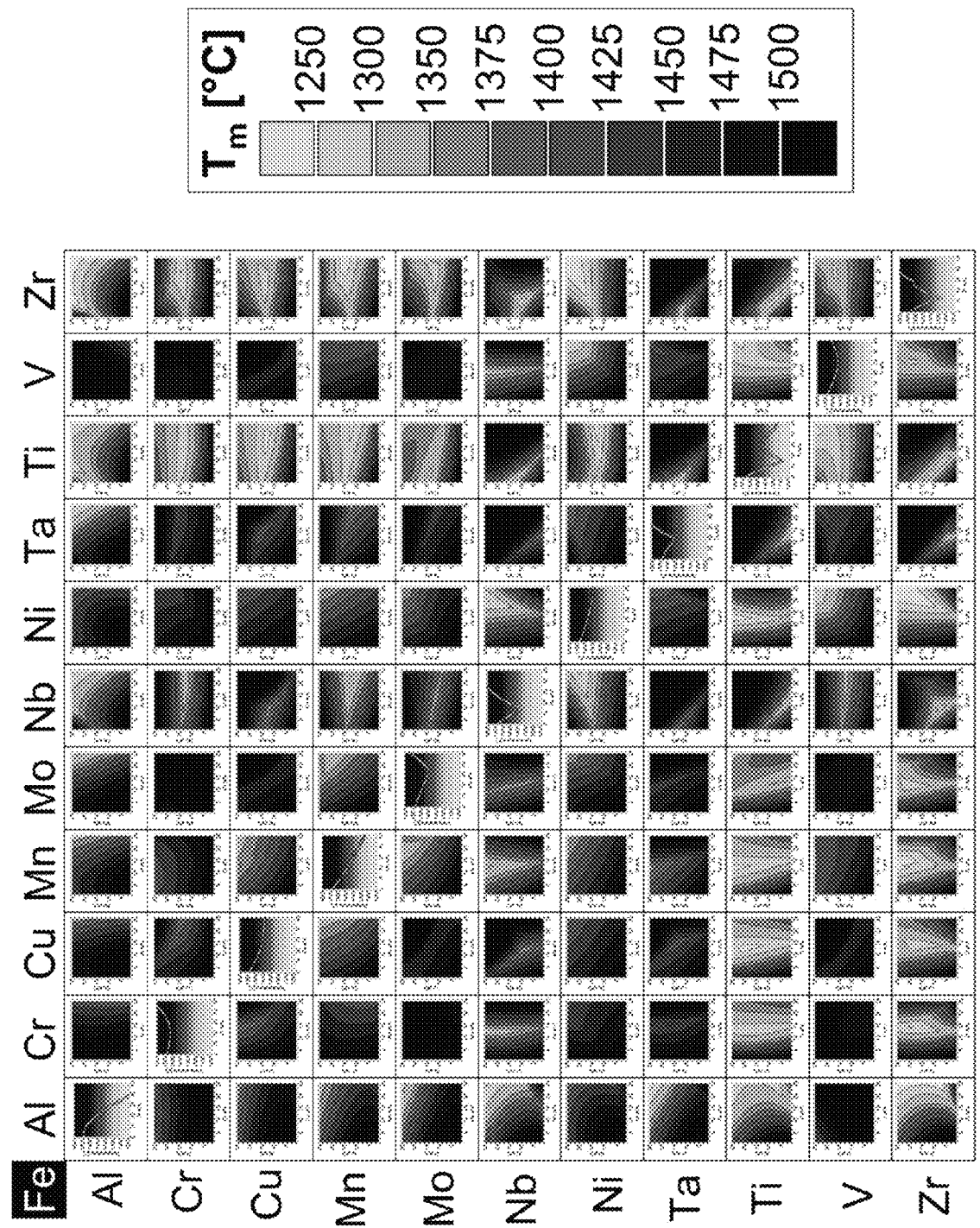
FIG. 8A shows the parameter map for the melting point as a function of alloying content for binary (up to 50 at. %) and ternary (up to 25% for both additions) iron alloys with the contours indicating values of the melting point.
Figure 8C:
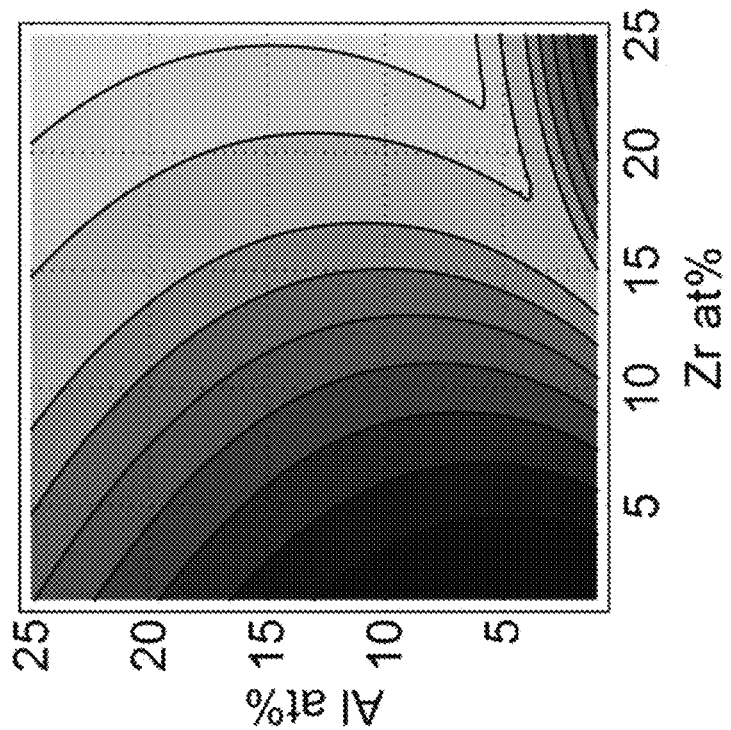
FIGS. 8B-8C show enlarged examples of the binary and ternary alloy plots shown in the parameter map of FIG. 8A.
Figure 8B:
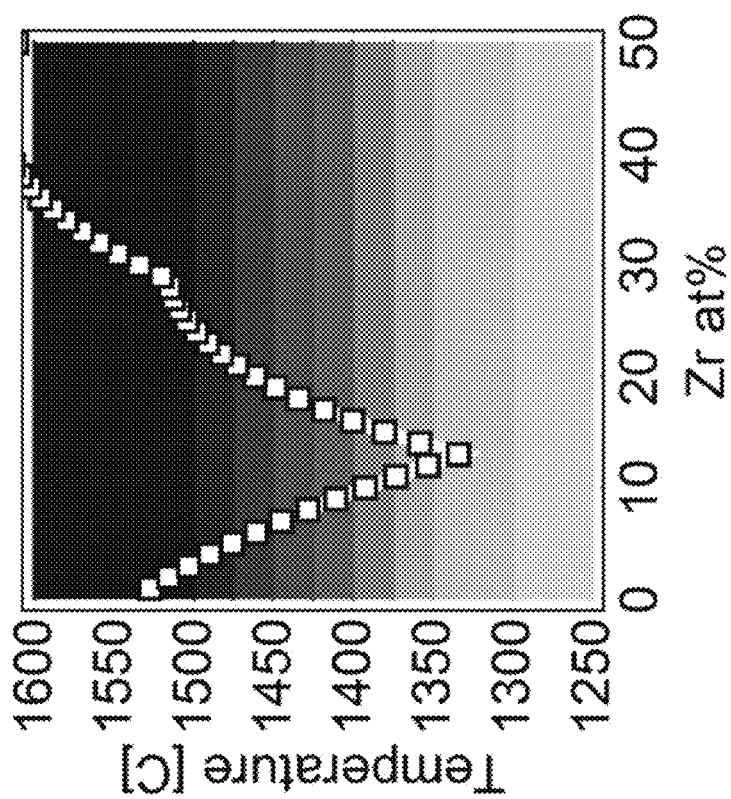

The viscosity of binary and ternary iron alloys as a function of composition is shown in FIGS. 6A-6C; the contours are scaled such that there is a stark change at 6 mPa·s, which is 10% higher viscosity than liquid cobalt.

Referencing FIG. 3B, only Ta has a significantly higher pure element viscosity than Fe, with Cr and Mo about the same and the rest lower; however, as is clear in FIGS. 6A-6B, alloying results in significant changes in viscosity, in many cases raising the viscosity sharply with only small amounts of secondary and tertiary elements. Despite having the lowest pure element viscosity, Al as an alloying element does not appreciably lower the viscosity of iron based alloys. In contrast, Cu lowers the viscosity significantly, more so than many other elements which have similar viscosities lower than iron (e.g. Ti at 4.42 vs. copper's 4.38 mPa·s). Considering Eq. (7) and the influence of alloy cohesion energy on viscosity, the Fe—Al enthalpy of mixing is strongly negative, as are most binary couples (see Table 4) as these systems readily form intermetallics. Conversely, the Fe—Cu system has a strongly positive enthalpy, and therefore increasing compositions of copper lowers the viscosity. Iron alloys including Cr, Mo, and Ni have weakly negative enthalpies and Fe—Mn has a weakly positive enthalpy, so the change in the viscosity as a function of alloy content is not large.

Quite a few systems and compositions ranges are largely disqualified based on high viscosity, as can been seen by the many predominantly white regions in FIG. 6A. This is contrary to the analysis of wetting behavior, which kept the majority of binary systems and all of the ternary systems in play. This metric eliminates 57% of the ternary alloy space and 24% of the binary alloy space (for 51% of the total alloy space).

3.2.3. Capillary Behavior

Alloys with high viscosity generally do not have good values for capillarity, but if the surface tension is lowered considerably the capillarity metric may still be viable; however, what is more likely is an additional elimination of alloy systems through the combination of viscosity and surface tension. Cobalt has a capillary metric of ~0.4, and 10% less value of 0.36 is the benchmark used here as minimum acceptable criterion. According to the capillarity metric $$\left(\frac{\gamma \cos\theta}{2\eta}\right)$$

and further discussion runner discussion in [26], a 10% reduction the capillary metric translates to a 23% increase in time taken for liquid binder to flow through a capillary of the same radius and length. Capillarity further reduces the composition space (see FIGS. 7A-7B)—eliminating an additional 12.5% in ternary and 7% in binary (for a total of 11.6%), despite heavily depending on previous metrics such as viscosity.

3.2.4. Melting Temperature

Melting temperatures are calculated using the TCFE9 database in Thermo-Calc [39]; it should be noted that for some ternary alloy combinations, the free energy functions are extrapolated from dilute alloy experimental data. Several elements in iron show significant melting point depression—Zr, Ti, Nb—allowing for complete melting of the binder at lower processing temperature than Co (see FIGS. 8A-8B). As the melting temperature of pure iron is higher than 1500° C.—more binary alloys will be disqualified than ternary as there is less opportunity for a change in melting point. In fact, fully 29.3% of the binary alloy space is disqualified from consideration, whereas no ternary alloys are excluded based on their melting temperature that were not already eliminated based on the previous three criteria.

3.2.5. Down Selection/Screening

A predetermined threshold to be met was assigned to each of the four criteria above in order to match or exceed the baseline cermet of liquid cobalt and WC. They are as follows: wetting—perfect wetting of liquid binder on WC (e.g. contact angle of zero), melting—melting temperature <1500° C., viscosity–<6 mPa·s (cobalt+10%), capillary metric of 0.36 √m/s (cobalt—10%). The alloy regions in which each criterion are satisfied are indicated by the appropriate color as indicated in the legend of FIGS. 9A-9C. When the metrics overlap, distinct colors are formed so that the alloy can be evaluated on any number of combinations, as desired. Meeting all criteria results in a dark green. The overlay plot (FIGS. 9A-9C) is independent of the binder/WC ratio and eliminates the need to perform the thermodynamic calculations in the ratio design space for many of the binary and ternary iron alloy possibilities examined here.

We have systematically reduced the candidate alloys to 27% of the original design space (and eliminated 22 alloy options entirely from consideration). The viscosity and capillarity are the most effective metrics in reducing the iron systems; however, other base metals (e.g. nickel) may have different conclusions. For low alloy contents (i.e. <5%) and binary systems, melting temperature plays more of a role—small or singular alloy content does not yet significantly depress the melting temperature. Viscosity of pure iron is within the range, but many alloying elements raise it (e.g. Nb, Ta, Ti, Zr) significantly within a few percent of alloying addition; in the full alloy space, the effect of viscosity is more binary—either yes (has full coverage) or no (almost no coverage).

3.3. Thermodynamic Modeling

Now that the design space is significantly reduced through the primary screening process, the next step is detailed thermodynamic studies; some brief examples are shown here to demonstrate the process of secondary screening: Fe—Cu—V, Fe—Ni—Zr, and Fe—Ni—Cr.

Starting with Fe—Cu—V, we look at the alloy space in which the processing criteria are met. For each point (meshing out the available space) in FIGS. 9A-9C and FIGS. 22A-22C, the pseudo binary phase diagram of WC—Fe—Cu—V is calculated at 10% binder/90% WC ratio. Increasing vanadium content increases the width of the carbon range but also pushes it farther from the stoichiometric ratio, necessitating adding more free carbon to the system. This is an effect of the V preferring to form VC, which is actually a desirable carbide additive to WC—Co [2, 40] as it acts as a grain refiner. The grain growth inhibitors that are effective in the WC—Co system have also been found to be effective in Fe and Ni binders [41]. In this way, we are precipitating the desired additive organically and consistently within the binder phase rather than adding a separate component (e.g. VC powder) to the mixing process. This may be an improved method for inclusion of this grain refiner, in opposition to the current pre-mixing processes which often have difficulties with homogenous distribution [42, 43]. Similarly, in the Fe—Ni—Zr system, a carbon range requiring addition of free carbon exists wherein a small weight fraction of ZrC is precipitated; this carbide has also been experimentally shown to maintain WC grain size through the sintering process [44].

The formation of these carbides, predicted as thermodynamically stable in the ternary binder-WC system, highlights the importance of the secondary thermodynamic screening for the down-selected systems. As carbon diffuses through the liquid binder and forms VC in the Fe—Cu—V binder system, the composition of the binder liquid would be depleted in vanadium, lowering the melting temperature. Additionally, diffusion of W or C into the binder liquid in certain combinations of Fe—Cu—V compositions can promote a two phase liquid region, wherein both an iron-rich and copper-rich liquid occur. The solubility of W in the various compositions of the Fe—Cu—V systems approaches 10 at. % in many compositional variations, and 5 at. % in many of the Fe—Ni—Zr compositions.

Figure 23:
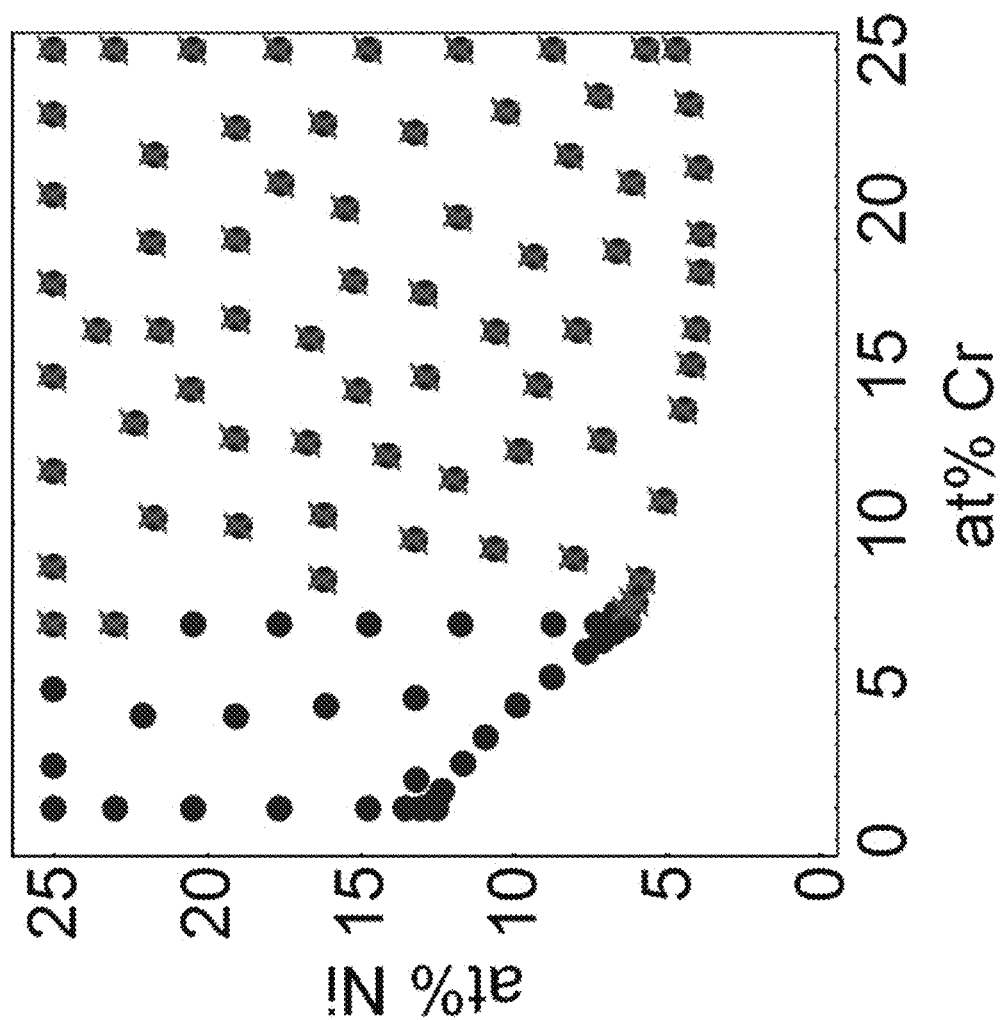
FIG. 23 shows the Fe—Ni—Cr mesh of region of interest with meshed points to cover the region of interest indicated in blue. These points are the compositions used for thermodynamic modeling of the carbon range and possible binder composition candidates. Red "X"s indicate deleterious Cr-carbides in the carbon window (and therefore a rejected composition).

In both the Fe—Cu—V and Fe—Ni—Zr systems, the entirety of the limited design space has an available carbon range (of varying widths, location, and grain refiner carbide content). Alternatively, very few acceptable carbon ranges exist in the Fe—Ni—Cr system; for the >100 compositional points within the acceptable design space (see FIG. 23), the solidification region that avoids graphite and $M_6C$ mostly contains multiple Cr carbides only one of which is used for grain refinement ($Cr_3C_2$). This favorable carbide only appears in conjunction with other, deleterious, carbides and only in <4% of the tested systems. An acceptable window for processing only occurs when the Cr composition is <6% of the binder alloy.

The embodiments herein provide a new, rapid method for predicting the processability of new binder cermets through liquid phase sintering. The method is applied to the problem of replacing the toxic cobalt binder in the WC—Co cermet system which is the dominant material system used in cutting tools. This approach of down selection through identified metrics reduced 66 binary and ternary alloy possibilities to 44 and then further reduced the compositional space to 27% of the initial total available space. In actuality, the number of potential alloys given the available binary/ternary composition space is orders of magnitude larger. From that reduced space, three systems and their compositional ranges are identified as suitable candidates for future experimental efforts. While the example problem is that of WC—Co, the criteria and methodology identified can be applied to other cermet systems, tailoring the binder material to different applications which require distinct properties.

Some of the equations and properties appearing herein are discussed in the paper by H. M. Lu and Q. Jiang, Surface tension and its temperature coefficient for liquid metals, J. Phys. Chem. B, 109(32) (2005) 15463-15468 [28], the paper by J. Butler, The thermodynamics of the surfaces of solutions, Proceedings of the Royal Society of London. Series A, Containing Papers of a Mathematical and Physical Character, 135, 1932, pp. 348-375 [29], the paper by J. Brillo and I. Egry, Surface tension of nickel, copper, iron and their binary alloys, J. Mater. Sci. 40 (2005) 2213-2216 [30], and the paper by X. J. Liu, et al., Experimental determination and thermodynamic calculation of the phase equilibria and surface tension in the Sn—Ag—In system, J. Electron. Mater. 31 (2002) 1139-1151 [31], which are all incorporated by reference herein in their entirety.

The documents cited below in the section titled "References" are all incorporated by reference herein in their entirety.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

REFERENCES

[1] X. Li, Y. Liu, W. Wei, M. Du, K. Li, J. Zhou, K. Fu, Influence of NbC and VC on microstructures and mechanical properties of WC—Co functionally graded cemented carbides, Mater. Des. 90 (2016) 562-567.

[2] S. Lay, S. Hamar-Thibault, A. Lackner, Location of VC in VC, Cr3C2 codoped WC—Co cermets by HREM and EELS, Int. J. Refract. Met. Hard Mater. 20 (2002) 61-69.

[3] A. Nieto, L. Jiang, J. Kim, D.-E. Kim, J. M. Schoenung, Synthesis and multi scale tribological behavior of WC—Co/nanodiamond nanocomposites, Sci. Rep. 7 (2017).

[4] S. Yin, E. Ekoi, T. Lupton, D. Dowling, R. Lupoi, Cold spraying of WC—Co—Ni coatings using porousWC-17Co powders: formation mechanism, microstructure characterization and tribological performance, Mater. Des. 126 (2017) 305-313.

[5] A. Rajabi, M. J. Ghazali, A. R. Daud, Chemical composition, microstructure and sintering temperature modifications on mechanical properties of TiC-based cermet—a review, Mater. Des. 67 (2015) 95-106.

[6] L. Leyssens, B. Vinck, C. Van Der Straeten, F. Wuyts, L. Maes, Cobalt toxicity in humans—a review of the potential sources and systemic health effects, Toxicology 387 (2017) (2017) 43-56.

[7] Report on Carcinogens. Fourteenth Edition, U.S. Department of Health and Human Services, Public Health Service, Research Triangle Park, N C, 2016.

[8] European Chemicals Agency (Ed.), CLH Report for Cobalt, European Chemicals Agency, Netherlands, 2017.

[9] Proposed Cobalt Reclassification Raises Concerns for Metal Powder Users. Powder Metallurgy Review, http://www.pm-review.com/proposed-cobalt-reclassification-raises-concerns-metal-powder-users/2017.

[10] C. Hanyaloglu, B. Aksakal, J. D. Bolton, Production and indentation analysis of WC/Fe—Mn as an alternative to cobalt-bonded hard metals, Mater. Charact. 47 (2001) 315-322.

[11] C. M. Fernandes, A. M. R. Senos, M. T. Vieira, J. M. Antunes, Mechanical characterization of composites prepared from WC powders coated with Ni rich binders, Int. J. Refract. Met. Hard Mater. 26 (2008) 491-498.

[12] C. M. Fernandes, A. M. R. Senos, M. T. Vieira, Versatility of the sputtering technique in the processing of WC—Fe—Ni—Cr composites, Surf. Coat. Technol. 206 (2012) 4915-4921.

[13] A. F. Guillermet, Thermodynamic properties of the Co—W—C system, Metall. Trans. A. 20 (1989) 935-956.

[14] Guillermet, A. F., *The Co—Fe—Ni—W—C Phase Diagram: a Thermodynamic Description and Calculated Sections for (Co—Fe—Ni) Bonded Cemented WC Tools*, Z. Metallkd., 1989, 80(2): p. 83-94.

[15] A. Guillermet, F. An, Assessment of the Fe—Ni—W—C phase diagram, Z. Metallkd. 78 (1987) 165-171.

[16] C. M. Fernandes, A. M. R. Senos, Cemented carbide phase diagrams: a review, Int. J. Refract. Met. Hard Mater. 29 (2011) 405-418.

[17] R. Subramanian, J. H. Schneibel, FeAl—TiC and FeAl—WC composites—melt infiltration processing, microstructure and mechanical properties, Mater. Sci. Eng. A 244 (1998) 103-112.

[18] S. Huang, O. Van der Biest, J. Vleugels, Pulsed electric current sintered Fe3Al bonded WC composites, Int. J. Refract. Met. Hard Mater. 27 (2009) 1019-1023.

[19] P. Alvaredo, S. A. Tsipas, E. Gordo, Influence of carbon content on the sinterability of an FeCr matrix cermet reinforced with TiCN, Int. J. Refract. Met. Hard Mater. 36 (2013) 283-288.

[20] P. Zhou, Y. Peng, C. Buchegger, Y. Du, W. Lengauer, Experimental investigation and thermodynamic assessment of the C—Co—Fe—Ni—W system, Int. J. Refract. Met. Hard Mater. 54 (2016) 60-69.

[21] W. D. Schubert, M. Fugger, B. Wittmann, R. Useldinger, Aspects of sintering of cemented carbides with Fe-based binders, Int. J. Refract. Met. Hard Mater. 49 (2015) 110-123.

[22] V. L. Silva, C. M. Fernandes, A. M. R. Senos, Copper wettability on tungsten carbide surfaces, Ceram. Int. 42 (2016) 1191-1196.

[23] R. Zhou, Y. Jiang, D. Lu, The effect of volume fraction of WC particles on erosion resistance of WC reinforced iron matrix surface composites, Wear 255 (2003) 134-138.

[24] L. Ramqvist, Wetting of metallic carbides by liquid copper, nickel, cobalt and iron, Int. J. Powder Met. (1965) 1.

[25] H. R. de Macedo, A. G. P. da Silva, D. M. A. de *Melo*, The spreading of cobalt, nickel and iron on tungsten carbide and the first stage of hard metal sintering, Mater. Lett. 57 (2003) 3924-3932.

[26] E. W. Washburn, The dynamics of capillary flow, Phys. Rev. 17 (1921) 273-283.

[27] G. Kaptay, Modelling interfacial energies in metallic systems, Materials Science Forum, Trans Tech Publ 2005, pp. 1-10.

[28] H. M. Lu, Q. Jiang, Surface tension and its temperature coefficient for liquid metals, J. Phys. Chem. B, 109(32) (2005) 15463-15468.

[29] J. Butler, The thermodynamics of the surfaces of solutions, Proceedings of the Royal Society of London. Series A, Containing Papers of a Mathematical and Physical Character, 135, 1932, pp. 348-375.

[30] J. Brillo, I. Egry, Surface tension of nickel, copper, iron and their binary alloys, J. Mater. Sci. 40 (2005) 2213-2216.

[31] X. J. Liu, et al., Experimental determination and thermodynamic calculation of the phase equilibria and surface tension in the Sn—Ag—In system, J. Electron. Mater. 31 (2002) 1139-1151.

[32] B. J. Keene, Review of data for the surface tension of iron and its binary alloys, Int. Mater. Rev. 33 (1988) 1-37.

[33] L. Y. Kozlov, L. Romanov, N. Petrov, Izv. vysch. uch. zav, Chernaya Metallurgiya (1983) 3.

[34] I. Budai, M. Z. Benkö, G. Kaptay, Comparison of different theoretical models to experimental data on viscosity of binary liquid alloys, Materials Science Forum, Trans Tech Publ 2007, pp. 489-496.

[35] W. Chen, L. Zhang, Y. Du, B. Huang, Viscosity and diffusivity in melts: from unary to multicomponent systems, Philos. Mag. 94 (2014) 1552-1577.

[36] H. Bakker, Enthalpies in Alloys: Miedema's Semi-Empirical Model, Materials Science Foundations, 1998, Enfield, N.H.: Trans Tech Publications.

[37] L. Kaufman, J. Ågren, CALPHAD, first and second generation—birth of the materials genome, Scr. Mater. 70 (2014) 3-6.

[38] B. Uhrenius, K. Forsen, B. O. Haglund, I. Andersson, Phase-equilibria and phase diagrams in carbide systems, J. Phase Equilib. 16 (1995) 430-440.

[39] J.-O. Andersson, T. Helander, L. Hoglund, P. Shi, B. Sundman, Thermo-Calc & DICTRA, computational tools for materials science, Calphad 26 (2002) 273-312.

[40] S. A. Johansson, G. Wahnström, First-principles derived complexion diagrams for phase boundaries in doped cemented carbides, Curr. Opinion Solid State Mater. Sci. 20 (2016) 299-307.

[41] B. Wittmann, W.-D. Schubert, B. Lux, WC grain growth and grain growth inhibition in nickel and iron binder hard metals, Int. J. Refract. Met. Hard Mater. 20 (2002) 51-60.

[42] L. Wan, L. Yang, X. Zeng, X. Lai, L. Zhao, Synthesis of Cr-doped APT in the evaporation and crystallization process and its effect on properties of WC—Co cemented carbide alloy, Int. J. Refract. Met. Hard Mater. 64 (2017) 248-254.

[43] R. Furushima, K. Katou, K. Shimojima, H. Hosokawa, A. Matsumoto, Control of WC grain sizes and mechanical properties in WC—FeAl composite fabricated from vacuum sintering technique, Int. J. Refract. Met. Hard Mater. 50 (2015) 16-22.

[44] J. Pittari, et al., investigation into sintering of "green" tungsten carbide bodies with iron-based binders, in: C. Blais, J. Hamiltion (Eds.), 2016 International Conference on Powder Metallurgy & Particulate Materials, Metal Powder Industries Federation 2016, pp. 532-538.

[45] Reeber, R. R. and K. Wang, *Thermophysical Properties of α-Tungsten Carbide*. Journal of the American Ceramic Society, 1999. 82(1): p. 129-135.

[46] Markström, A., K. Frisk, and B. Sundman, *A revised thermodynamic description of the Co-WC system*. Journal of phase equilibria and diffusion, 2005. 26(2): p. 152-160.

[47] Ohtani, H., M. Yamano, and M. Hasebe, *Thermodynamic analysis of the Co—Al—C and Ni—Al—C systems by incorporating ab initio energetic calculations into the CALPHAD approach*. Calphad, 2004. 28(2): p. 177-190.

[48] Lida, T. and R. Guthrie, *Performance of a Modified Skapski Model for the Surface Tension of Liquid Metallic Elements at Their Melting-Point Temperatures*. Metallurgical and Materials Transactions B, 2009. 40(6): p. 967-978.

[49] Lida, T., et al., *Accurate predictions for the viscosities of several liquid transition metals, plus barium and strontium*. Metallurgical and materials transactions B, 2006. 37(3): p. 403-412.

[50] Cui, Y. F., et al., *Thermodynamic assessment of Co—Al—W system and solidification of Co-enriched ternary alloys*. Journal of Materials Science, 2011. 46(8): p. 2611-2621.

[51] Kaufman, L., et al., *Thermodynamics of the Cr—Ta-W system by combining the Ab Initio and CALPHAD methods*. Calphad, 2001. 25(3): p. 419-433.

[52] Khvan, A. V., B. Hallstedt, and K. Chang, *Thermodynamic assessment of Cr—Nb—C and Mn—Nb—C systems*. Calphad, 2012. 39: p. 54-61.

[53] Shubhank, K. and Y.-B. Kang, *Critical evaluation and thermodynamic optimization of Fe—Cu, Cu—C, Fe—C binary systems and Fe—Cu—C ternary system*. Calphad, 2014. 45: p. 127-137.

[54] Djurovic, D., et al., *Thermodynamic assessment of the Mn—C system*. Calphad, 2010. 34(3): p. 279-285.

[55] Bratberg, J. and K. Frisk, *A thermodynamic analysis of the Mo-V and Mo—V-C system*. Calphad, 2002. 26(3): p. 459-476.

[56] Paradis, P. F., T. Ishikawa, and N. Koike, Non-contact measurements of the surface tension and viscosity of molybdenum using an electrostatic levitation furnace. International Journal of Refractory Metals and Hard Materials, 2007. 25(1): p. 95-100.

[57] Lee, B. J., Thermodynamic assessment of the Fe—Nb—Ti—CN system. Metallurgical and Materials Transactions A, 2001. 32(10): p. 2423-2439.

[58] Frisk, K. and A. Fernandez Guillermet, Gibbs energy coupling of the phase diagram and thermochemistry in the tantalum-carbon system, Journal of Alloys and Compounds, 1996, 238(1-2): p. 167-179.

[59] Kwang Lee, S. and D. Nyung Lee, Calculation of phase diagrams using partial phase diagram data, Calphad, 10(1): p. 61-76.

[60] Paradis, P.-F., T. Ishikawa, and S. Yoda, Non-Contact Measurements of Surface Tension and Viscosity of Niobium, Zirconium, and Titanium Using an Electrostatic Levitation Furnace. International Journal of Thermophysics, 2002. 23(3): p. 825-842.

[61] Okada, J. T., et al., Surface tension and viscosity of molten vanadium measured with an electrostatic levitation furnace, The Journal of Chemical Thermodynamics, 2010, 42(7): p. 856-859.

[62] Bratberg, J. and B. Jansson, Thermodynamic evaluation of the C—Co—W—Hf—Zr system for cemented carbides applications, Journal of Phase Equilibria and Diffusion, 2006, 27(3): p. 213-219.

[63] Fernandez Guillermet, A., Analysis of thermochemical properties and phase stability in the zirconium-carbon system, Journal of Alloys and Compounds, 1995, 217(1): p. 69-89.

What is claimed is:

1. A method for forming a composition comprising a second phase of a metal, metal alloy, at least one ceramic or mixtures thereof in a first phase comprising a binder matrix of a metallic binder, the method comprising the steps of:

providing the second phase made of a desired material selected from the group consisting of a metal, a metal alloy, at least one ceramic or mixtures thereof, wherein the second phase comprises a non-continuous spatial arrangement wherein there are spaces interspersed among spatial regions occupied by the second phase;

selecting a metallic binder material for the metallic binder by a screening process comprising the steps of:

delineating a design space comprising at least one of a list of elements and a list of element combinations and the ranges for proportions of the elements in each combination that are potential materials for use in the metallic binder, wherein each potential material at least has a capillary metric and a viscosity in the liquid state, and each potential material has a melting temperature;

calculating at least the viscosity, the capillary metric, and determining the melting point using a computerized thermodynamic model for a plurality of the potential materials;

selecting one or more of the plurality of the potential materials that have viscosities that are within a predetermined viscosity range, that have capillary metrics that are within a predetermined capillary metric range, and that have melting points that are within a predetermined melting point range to a first set of screened potential materials; and selecting the metallic binder material from the first set of screened potential materials;

providing the metallic binder material;

melting the metallic binder material to form a liquid binder in order to allow the liquid binder to at least in part fill the spaces between the regions occupied by the second phase; and allowing the liquid binder to solidify.

2. The method according to claim 1, wherein each potential material has a contact angle with respect to the second phase and a surface tension and wherein the screening process further comprises the step of:

calculating one of the surface tension and the contact angle to determine the wetting characteristics with respect to the second phase for the plurality of the potential materials, wherein the one or more of the plurality of the potential materials selected to the first set of screened potential materials are also selected such that each has one of its surface tension and its contact angle with the second phase lying within a corresponding one of a predetermined surface tension range and a predetermined contact angle range.

3. The method according to claim 2, wherein screening process comprises the steps of:

compiling a list of metal elements that are potential materials for use in the metallic binder, wherein each of the metal elements has a contact angle with respect to the second phase, a surface tension, a capillary metric, and a viscosity in the liquid state, and each of the metal elements has a melting temperature;

calculating one of the surface tension and the contact angle to determine the wetting characteristics of each of the metal elements with respect to the second phase;

selecting metal elements that each have one of their surface tension and their contact angle with the second phase lying within the corresponding one of the predetermined surface tension range and the predetermined contact angle range to a first plurality of screened elements;

calculating the viscosity of each metal element in the first plurality of screened elements;

selecting metallic elements that have viscosities that are within the predetermined viscosity range to a second plurality of screened elements;

calculating the capillary metric of each element in the second plurality of screened elements;

selecting metallic elements that have capillary metrics that are within the predetermined capillary metric range to a third plurality of screened elements;

determining the melting point of each element in the third plurality of screened elements using a computerized thermodynamic model;

selecting metallic elements that have melting points that are within the predetermined melting point range to the first set of screened potential materials; and selecting the metallic binder material from among the first set of screened potential materials.

4. The method according to claim 2, wherein screening process comprises the steps of:

compiling a list of binary combinations of metal elements that are potential materials for use in the metallic binder along with ranges for the relative amounts of each metal element in the combinations to form a design space of binary metal compositions that are potentially suitable material for use in the metallic binder, wherein each binary metal composition has a contact angle with respect to the second phase, a surface tension, a capillary metric, and a viscosity in the liquid state, and each binary metal composition has a melting temperature;

calculating one of the surface tension and the contact angle with respect to the second phase of a plurality of binary metal compositions within the ranges for the relative amounts for each of the binary combinations of metal elements to determine the wetting characteristics thereof;

selecting binary metal compositions that each have one of their surface tension and their contact angle with the second phase lying within the corresponding one of the predetermined surface tension range and the predetermined contact angle range to a first plurality of screened binary metal compositions;

calculating the viscosity of each binary metal composition in the first plurality of screened binary metal compositions;

selecting binary metal compositions that have viscosities that are within the predetermined viscosity range to a second plurality of screened binary metal compositions;

calculating the capillary metric of each binary metal composition in the second plurality of screened binary metal compositions;

selecting metallic binary metal compositions that have capillary metrics that are within the predetermined capillary metric range to a third plurality of screened binary metal compositions;

determining the melting point of each binary metal composition in the third plurality of screened binary metal compositions using a computerized thermodynamic model;

selecting binary metal compositions that have melting points that are within the predetermined melting point range to the first set of screened potential materials; and selecting the metallic binder material from among the first set of screened potential materials.

5. The method according to claim 2, wherein screening process comprises the steps of:

compiling a list of ternary combinations of metal elements that are potential materials for use in the metallic binder along with ranges for the relative amounts of each metal element in the combinations to form a design space of ternary metal compositions that are potentially suitable material for use in the metallic binder, wherein each ternary metal composition has a contact angle with respect to the second phase, a surface tension, a capillary metric, and a viscosity in the liquid state, and each ternary metal composition has a melting temperature;

calculating one of the surface tension and the contact angle with respect to the second phase of a plurality of ternary metal compositions within the ranges for the relative amounts for each of the ternary combinations of metal elements to determine the wetting characteristics thereof;

selecting ternary metal compositions that each have one of their surface tension and their contact angle with the second phase lying within the corresponding one of the predetermined surface tension range and the predetermined contact angle range to a first plurality of screened ternary metal compositions;

calculating the viscosity of each ternary metal composition in the first plurality of screened ternary metal compositions;

selecting ternary metal compositions that have viscosities that are within the predetermined viscosity range to a second plurality of screened ternary metal compositions;

calculating the capillary metric of each ternary metal composition in the second plurality of screened ternary metal compositions;

selecting metallic ternary metal compositions that have capillary metrics that are within the predetermined capillary metric range to a third plurality of screened ternary metal compositions;

determining the melting point of each ternary metal composition in the third plurality of screened ternary metal compositions using a computerized thermodynamic model;

selecting ternary metal compositions that have melting points that are within the predetermined melting point range to the first set of screened potential materials; and selecting the metallic binder material from among the first set of screened potential materials.

6. The method according to claim 2, wherein screening process comprises the steps of: compiling a list of metal elements that are potential materials for use in the metallic binder, wherein each of the metal elements has a contact angle with respect to the second phase, a surface tension, a capillary metric, and a viscosity in the liquid state, and each of the metal elements has a melting temperature;

calculating one of the surface tension and the contact angle to determine the wetting characteristics of each of the metal elements with respect to the second phase;

calculating the viscosity of each of the metal elements;

calculating the capillary metric of each of the metal elements;

determining the melting point of each of the metal elements using a computerized thermodynamic model;

selecting the metal elements that each have one of their surface tension and their contact angle with the second phase lying within the corresponding one of the predetermined surface tension range and the predetermined contact angle range, that have viscosities that are within the predetermined viscosity range, that have capillary metrics that are within the predetermined capillary metric range; and that have melting points that are within the predetermined melting point range to the first set of screened potential materials; and selecting the metallic binder material from among the first set of screened potential materials.

7. The method according to claim 2, wherein screening process comprises the steps of:

compiling a list of binary combinations of metal elements that are potential materials for use in the metallic binder along with ranges for the relative amounts of each metal element in the combinations to form a design space of binary metal compositions that are potentially suitable material for use in the metallic binder, wherein each binary metal composition has a contact angle with respect to the second phase, a surface tension, a capillary metric, and a viscosity in the liquid state, and each binary metal composition has a melting temperature;

calculating one of the surface tension and the contact angle with respect to the second phase of a plurality of binary metal compositions within the ranges for the relative amounts for each of the binary combinations of metal elements to determine the wetting characteristics thereof;

calculating the viscosity of each of the plurality of binary metal compositions within the ranges for the relative amounts for each of the binary combinations of metal elements;

calculating the capillary metric of each of the plurality of binary metal compositions within the ranges for the relative amounts for each of the binary combinations of metal elements;

determining the melting point of each of the plurality of binary metal compositions within the ranges for the relative amounts for each of the binary combinations of metal elements using a computerized thermodynamic model;

selecting binary metal compositions, from the plurality of binary metal compositions within the ranges for the relative amounts for each of the binary combinations of metal elements, that each have one of their surface tension and their contact angle with the second phase lying within the corresponding one of the predetermined surface tension range and the predetermined contact angle range, that have viscosities that are within the predetermined viscosity range, that have capillary metrics that are within the predetermined capillary metric range, and that have melting points that are within the predetermined melting point range to the first set of screened potential materials; and selecting the metallic binder material from among the first set of screened potential materials.

8. The method according to claim 7, wherein screening process comprises the steps of: compiling a list of ternary combinations of metal elements that are potential materials for use in the metallic binder along with ranges for the relative amounts of each metal element in the combinations to form a design space of ternary metal compositions that are potentially suitable material for use in the metallic binder, wherein each ternary metal composition has a contact angle with respect to the second phase, a surface tension, a capillary metric, and a viscosity in the liquid state, and each ternary metal composition has a melting temperature;

calculating one of the surface tension and the contact angle with respect to the second phase of a plurality of ternary metal compositions within the ranges for the relative amounts for each of the ternary combinations of metal elements to determine the wetting characteristics thereof;

calculating the viscosity of each of the plurality of ternary metal compositions within the ranges for the relative amounts for each of the ternary combinations of metal elements;

calculating the capillary metric of each of the plurality of ternary metal compositions within the ranges for the relative amounts for each of the ternary combinations of metal elements;

determining the melting point of each of the plurality of ternary metal compositions within the ranges for the relative amounts for each of the ternary combinations of metal elements using a computerized thermodynamic model;

selecting ternary metal compositions, from the plurality of ternary metal compositions within the ranges for the relative amounts for each of the ternary combinations of metal elements, that each have one of their surface tension and their contact angle with the second phase lying within the corresponding one of the predetermined surface tension range and the predetermined contact angle range, that have viscosities that are within the predetermined viscosity range, that have capillary metrics that are within the predetermined capillary metric range, and that have melting points that are within the predetermined melting point range to the first set of screened potential materials; and selecting the metallic binder material from among the first set of screened potential materials.

9. The method according to claim 8, wherein each binary metal composition comprises a primary metal element and a secondary metal element; wherein each ternary metal composition comprises a primary metal element, a secondary metal element, and a tertiary metal element; wherein the method further comprises the steps of:

providing a visual atlas comprising a plurality of diagrams, each of the plurality of diagrams being a graph, a first subset of the plurality of diagrams being directed to the binary metal compositions, a second subset of the plurality of diagrams being directed to the ternary metal compositions, each diagram in the first subset corresponding to a corresponding binary combination of metal elements and having an axis with indicia indicating the proportion of the secondary metal element in the binary metal compositions of the corresponding binary combination of metal elements, the balance comprising the primary metal element, and at least one colored or shaded area on each diagram in the first subset in the form of an area colored or shaded according to a color or shading key or code to indicate the range of the proportion of the secondary metal element for which the binary metal compositions of the corresponding binary combination of metal elements at least have one of viscosities that are within the predetermined viscosity range, capillary metrics that are within the predetermined capillary metric range, and melting points that are within the predetermined melting point range when the binary metal compositions of the corresponding binary combination of metal elements at least have the one of viscosities that are within the predetermined viscosity range, capillary metrics that are within the predetermined capillary metric range, and melting points that are within the predetermined melting point range, each diagram in the second subset corresponding to a corresponding ternary combination of metal elements and having a first axis with indicia indicating the proportion of the secondary metal element in the ternary metal compositions of the corresponding binary combination of metal elements and having a second axis with indicia indicating the proportion of the tertiary metal element in the ternary metal compositions of the corresponding ternary combination of metal elements, the balance of the total of the proportions of the secondary and tertiary metal elements comprising the primary metal element, and at least one colored or shaded area on each diagram in the second subset in the form of an area colored or shaded according to a color or shading key or code to indicate the range of the proportions of the secondary metal element and the tertiary metal element for which the ternary metal compositions of the corresponding ternary combination of metal elements at least have one of viscosities that are within the predetermined viscosity range, capillary metrics that are within the predetermined capillary metric range, and melting points that are within the predetermined melting point range when the ternary metal compositions of the corresponding ternary combination of metal elements at least have the one of viscosities that are within the predetermined viscosity range, capillary metrics that are within the predetermined capillary metric range, and melting points that are within the predetermined melting point range; and selecting the metallic binder material from among the binary metal compositions and the ternary metal compositions falling within the colored or shaded areas of diagrams in the first subset of the plurality of diagrams and the second subset of the plurality of diagrams, respectively.

10. The method according to claim 9, wherein the colored or shaded area in the diagrams in the first subset is colored or shaded according to the color or shading key or code to indicate the range of the proportion of the secondary metal element for which the binary metal compositions of the corresponding binary combination of metal elements at least have viscosities that are within the predetermined viscosity range, have capillary metrics that are within the predetermined capillary metric range, and have melting points that are within the predetermined melting point range when the binary metal compositions of the corresponding binary combination of metal elements at least have viscosities that are within the predetermined viscosity range, have capillary metrics that are within the predetermined capillary metric range, and have melting points that are within the predetermined melting point range, and wherein the colored or shaded area in the diagrams in the second subset is colored or shaded according to the color or shading key or code to indicate the range of the proportions of the secondary metal element and the tertiary metal element for which the ternary metal compositions of the corresponding ternary combination of metal elements at least have viscosities that are within the predetermined viscosity range, have capillary metrics that are within the predetermined capillary metric range, and have melting points that are within the predetermined melting point range when the ternary metal compositions of the corresponding ternary combination of metal elements at least have viscosities that are within the predetermined viscosity range, have capillary metrics that are within the predetermined capillary metric range, and have melting points that are within the predetermined melting point range.

11. The method according to claim 10, wherein the binary metal compositions and the ternary metal compositions falling within the colored or shaded areas of diagrams in the first subset of the plurality of diagrams and the second subset of the plurality of diagrams also have one of their surface tension and their contact angle with the second phase lying within the corresponding one of the predetermined surface tension range and the predetermined contact angle range.

12. The method according to claim 11, further comprising the steps of:
using thermodynamic computer modeling to determine, for a plurality of the binary metal compositions and the ternary metal compositions falling within the colored or shaded areas of diagrams in the first subset of the plurality of diagrams and the second subset of the plurality of diagrams, the existence of one or more values or ranges for carbon content in the binary metal composition or the ternary metal composition such that at or within such values or ranges for carbon content no deleterious phases are formed as the binary metal composition or the ternary metal composition solidifies from a liquid state; and selecting the metallic binder material from among the binary metal compositions and the ternary metal compositions that have values or ranges for carbon content such that no deleterious phases are formed as the binary metal composition or the ternary metal composition solidifies from a liquid state.

13. The method according to claim 8, wherein each binary metal composition comprises a primary metal element and a secondary metal element; wherein each ternary metal composition comprises a primary metal element, a secondary metal element, and a tertiary metal element; wherein the method further comprises the steps of:
providing a visual parameter map for depicting a parameter as a function of metal composition, the visual parameter map comprising a plurality of diagrams, each of the plurality of diagrams being a graph, a first subset of the plurality of diagrams being directed to the binary metal compositions, a second subset of the plurality of diagrams being directed to the ternary metal compositions, each diagram in the first subset corresponding to a corresponding binary combination of metal elements and having an axis with indicia indicating the proportion of the secondary metal element in the binary metal compositions of the corresponding binary combination of metal elements, the balance comprising the primary metal element, and each diagram in the first subset having a plurality of regions in the form of areas that are each colored or shaded with a unique corresponding color or shading according to a color or shading key or code such that the colored or shaded areas of the diagrams in the first subset are distinguished from one another by their unique color or shading, each color or shading corresponding to a range of values of the parameter depicted by the map in accordance with the color or shading key or code such that the range of values corresponding to each color does not overlap any of the ranges for the other colors in the key or code, each diagram in the second subset corresponding to a corresponding ternary combination of metal elements and having a first axis with indicia indicating the proportion of the secondary metal element in the ternary metal compositions of the corresponding binary combination of metal elements and having a second axis with indicia indicating the proportion of the tertiary metal element in the ternary metal compositions of the corresponding ternary combination of metal elements, the balance of the total of the proportions of the secondary and tertiary metal elements comprising the primary metal element, and each diagram in the second subset having a plurality of regions in the form of areas that are each colored or shaded with a unique corresponding color or shading according to the color or shading key or code such that the colored or shaded areas of the diagrams in the second subset are distinguished from one another by their unique color or shading, each color or shading corresponding to a range of values of the parameter depicted by the map in accordance with the color or shading key or code such that the range of values corresponding to each color does not overlap any of the ranges for the other colors in the key or code, wherein the visual parameter map provides a visual display of the binary metal compositions and the ternary metal compositions that have values for the depicted parameter that fall within a predetermined range of acceptable values for the depicted parameter.

14. The method according to claim 13, wherein the parameter depicted by the parameter map is selected from group consisting of the contact angle with the second phase, the surface tension, the viscosity, the capillary metric, and the melting point.

15. The method according to claim 2, wherein screening process comprises the steps of:
compiling a list of ternary combinations of metal elements that are potential materials for use in the metallic binder along with ranges for the relative amounts of each metal element in the combinations to form a design space of ternary metal compositions that are potentially suitable material for use in the metallic binder, wherein each ternary metal composition has a contact angle with respect to the second phase, a surface tension, a capillary metric, and a viscosity in the liquid state, and each ternary metal composition has a melting temperature;
calculating one of the surface tension and the contact angle with respect to the second phase of a plurality of ternary metal compositions within the ranges for the relative amounts for each of the ternary combinations of metal elements to determine the wetting characteristics thereof;
calculating the viscosity of each of the plurality of ternary metal compositions within the ranges for the relative amounts for each of the ternary combinations of metal elements;
calculating the capillary metric of each of the plurality of ternary metal compositions within the ranges for the relative amounts for each of the ternary combinations of metal elements;
determining the melting point of each of the plurality of ternary metal compositions within the ranges for the relative amounts for each of the ternary combinations of metal elements using a computerized thermodynamic model;
selecting ternary metal compositions, from the plurality of ternary metal compositions within the ranges for the relative amounts for each of the ternary combinations of metal elements, that each have one of their surface tension and their contact angle with the second phase lying within the corresponding one of the predetermined surface tension range and the predetermined contact angle range, that have viscosities that are within the predetermined viscosity range, that have capillary metrics that are within the predetermined capillary metric range, and that have melting points that are within the predetermined melting point range to the first set of screened potential materials; and selecting the metallic binder material from among the first set of screened potential materials.

16. In an apparatus selected from a computer, a computer system, and a data storage device, a computer-implemented, rapid method for screening candidate metallic material for use as a binder in a sintering process for manufacturing articles including material comprising a second phase of a metal, metal alloy, at least one ceramic or mixtures thereof in a binder matrix of a metallic binder, the method comprising:
providing a list of elements to be considered for use in potential materials for use in the metallic binder to a computer executing the method;
providing a computer model including equations and data for calculating at least one of the surface tension and the contact angle to determine the wetting characteristics with respect to the second phase, the viscosity, and the capillary metric for a plurality of the potential materials and for implementing a computerized thermodynamic model for determining the melting point for the plurality of the potential materials;
delineating a design space comprising at least one of the list of elements and a list of element combinations and the ranges for proportions of the elements in each combination that are potential materials for use in the metallic binder, wherein each potential material at least has a capillary metric and a viscosity in the liquid state, and each potential material has a melting temperature;
calculating at least one of the surface tension and the contact angle to determine the wetting characteristics with respect to the second phase, the viscosity, the capillary metric, and determining the melting point using the computerized thermodynamic model for the plurality of the potential materials; and
selecting one or more of the plurality of the potential materials that have at least one of its surface tension and its contact angle with the second phase lying within a corresponding one of a predetermined surface tension range and a predetermined contact angle range, that have viscosities that are within a predetermined viscosity range, that have capillary metrics that are within a predetermined capillary metric range, and that have melting points that are within a predetermined melting point range to a first set of screened potential materials so that a user can select the metallic binder material from the first set of screened potential materials.

17. A method for forming a composition comprising a second phase of a metal, metal alloy, at least one ceramic or mixtures thereof in a binder matrix of a metallic binder, and a beneficial, supplementary metal carbide that is a carbide of a metal element, wherein the binder matrix of the metallic binder constitutes a first phase at least in part, and wherein the supplementary metal carbide is different from the second phase, the method comprising the steps of:
providing the second phase made of a desired material selected from the metal, metal alloy, at least one ceramic or mixtures thereof, wherein the second phase comprises a non-continuous spatial arrangement wherein there are spaces interspersed among spatial regions occupied by the second phase;
selecting a metallic binder material for the metallic binder that includes the metal element of the supplementary metal carbide;
providing the metallic binder material;
melting the metallic binder material to form a liquid binder in order to allow the liquid binder to at least in part fill the spaces between the regions of the second phase, wherein a mixture formed at least in part from the second phase and the liquid binder, and which is being processed according to the method to form the composition comprising the second phase in the binder matrix of the metallic binder, contains an amount of carbon either from adding free carbon or from the second phase if it is a carbide; and allowing the liquid binder to solidify to form the binder matrix of the metallic binder, wherein the metal element of the supplementary metal carbide and at least some of the carbon together form an amount of the supplementary metal carbide such that addition of the supplementary metal carbide as a separate component is not required.

18. The method of according to claim 17, wherein the second phase is a ceramic and the supplementary metal carbide is selected from the group consisting of vanadium carbide (VC), zirconium carbide (ZrC), and chrome carbide.

19. The method of according to claim 18, wherein the second phase is tungsten carbide (WC).

20. The method of according to claim 17, further comprising the step of providing free carbon as a component of a mixture including the second phase and the metallic binder material.

\* \* \* \* \*